US011038841B2

(12) United States Patent
Palnati et al.

(10) Patent No.: US 11,038,841 B2
(45) Date of Patent: Jun. 15, 2021

(54) METHODS OF AND SYSTEMS OF SERVICE CAPABILITIES EXPOSURE FUNCTION (SCEF) BASED INTERNET-OF-THINGS (IOT) COMMUNICATIONS

(71) Applicant: MICROSOFT TECHNOLOGY LICENSING, LLC, Redmond, WA (US)

(72) Inventors: Prasasth Palnati, Westford, MA (US); Anand Krishnamurthy, Acton, MA (US); Srinivas Kappla, Nashua, NH (US); Deepak Garg, Nashua, NH (US); Santos Kumar Das, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/973,322

(22) Filed: May 7, 2018

(65) Prior Publication Data
US 2018/0324671 A1 Nov. 8, 2018

Related U.S. Application Data

(60) Provisional application No. 62/502,070, filed on May 5, 2017.

(51) Int. Cl.
*H04L 29/06* (2006.01)
*H04W 40/30* (2009.01)
(Continued)

(52) U.S. Cl.
CPC .......... *H04L 63/0209* (2013.01); *G06F 9/547* (2013.01); *H04L 61/1511* (2013.01);
(Continued)

(58) Field of Classification Search
CPC .................................................. H04W 40/30
See application file for complete search history.

(56) References Cited

U.S. PATENT DOCUMENTS 7,346,840 B1   3/2008  Ravishankar et al.
7,466,694 B2  12/2008  Xu et al.
            (Continued)

FOREIGN PATENT DOCUMENTS

CN     101093590 A    12/2007
CN     102390184 A     3/2012
            (Continued)

OTHER PUBLICATIONS

US 10,505,788 B1, 12/2019, Mills et al. (withdrawn)
(Continued)

*Primary Examiner* — Kevin M Cunningham
(74) *Attorney, Agent, or Firm* — Ray Quinney & Nebeker, P.C.; Thomas M. Hardman; Sunah K. Lee

(57) ABSTRACT

Systems and methods are disclosed for an augmented Service Capability Exposure Function (A-SCEF). The A-SCEF may receive upstream or downstream traffic and direct or process that traffic in accordance with policy profiles. The policy profiles may be associated with various entities that may have interrelationships. The policy profiles may allow a network operator to better control multiple entities on the network while simplifying use of the network for the customers, such as those associated with a large number of internet of things (IOT) devices.

20 Claims, 26 Drawing Sheets

(51) Int. Cl.

| | | |
|---|---|---|
| *H04W 8/04* | (2009.01) | |
| *H04W 8/26* | (2009.01) | |
| *H04W 28/02* | (2009.01) | |
| *H04W 4/14* | (2009.01) | |
| *G06F 9/54* | (2006.01) | |
| *H04W 52/02* | (2009.01) | |
| *H04L 29/12* | (2006.01) | |
| *H04W 12/069* | (2021.01) | |
| *H04W 12/086* | (2021.01) | |
| *H04W 88/16* | (2009.01) | |
| *H04W 80/12* | (2009.01) | |
| *H04W 88/14* | (2009.01) | |

(52) U.S. Cl.
CPC ...... *H04L 63/0823* (2013.01); *H04L 63/0876* (2013.01); *H04L 63/20* (2013.01); *H04W 4/14* (2013.01); *H04W 8/04* (2013.01); *H04W 8/26* (2013.01); *H04W 12/069* (2021.01); *H04W 12/086* (2021.01); *H04W 28/0268* (2013.01); *H04W 40/30* (2013.01); *H04W 52/0229* (2013.01); *H04L 63/168* (2013.01); *H04W 80/12* (2013.01); *H04W 88/14* (2013.01); *H04W 88/16* (2013.01)

(56) References Cited

U.S. PATENT DOCUMENTS

| | | |
|---|---|---|
| 7,734,746 B2 | 6/2010 | Ng et al. |
| 8,428,610 B2 | 4/2013 | Chowdhury et al. |
| 8,477,730 B2 | 7/2013 | Rajagopalan et al. |
| 8,509,200 B2 | 8/2013 | Li et al. |
| 8,522,241 B1 | 8/2013 | Vohra et al. |
| 8,565,070 B2 | 10/2013 | Harper et al. |
| 8,787,875 B2 | 7/2014 | Ahmed et al. |
| 8,855,051 B2 | 10/2014 | Suh et al. |
| 8,995,262 B2 | 3/2015 | Chowdhury et al. |
| 9,013,993 B2 | 4/2015 | Logan et al. |
| 9,185,595 B2 | 11/2015 | Qu |
| 9,294,981 B2 | 3/2016 | Rajagopalan et al. |
| 9,300,623 B1 | 3/2016 | Earl et al. |
| 9,578,541 B2 | 2/2017 | Seenappa et al. |
| 9,961,624 B1 | 5/2018 | Zait |
| 9,985,875 B1 | 5/2018 | Srinath et al. |
| 10,484,844 B2 | 11/2019 | Sudarsan et al. |
| 10,536,326 B2 | 1/2020 | Mils et al. |
| 10,616,100 B2 | 4/2020 | Garg et al. |
| 2002/0007468 A1 | 1/2002 | Kampe et al. |
| 2002/0023048 A1 | 2/2002 | Buhannic et al. |
| 2002/0062388 A1 | 5/2002 | Ogier et al. |
| 2003/0171114 A1 | 9/2003 | Hastings |
| 2003/0187982 A1 | 10/2003 | Petit |
| 2004/0131023 A1 | 7/2004 | Auterinen |
| 2004/0181538 A1 | 9/2004 | Lo et al. |
| 2004/0193763 A1 | 9/2004 | Iizuka et al. |
| 2004/0267758 A1 | 12/2004 | Katsurashima |
| 2005/0120240 A1* | 6/2005 | Kiwimagi .......... G06F 21/33 726/4 |
| 2005/0136832 A1 | 6/2005 | Spreizer |
| 2006/0008063 A1 | 1/2006 | Harnesk et al. |
| 2006/0013191 A1 | 1/2006 | Kavanagh |
| 2006/0114832 A1 | 6/2006 | Hamilton et al. |
| 2006/0168655 A1 | 7/2006 | Grandmaitre et al. |
| 2006/0195607 A1 | 8/2006 | Naseh et al. |
| 2006/0288404 A1* | 12/2006 | Kirshnan .......... G06F 8/656 726/5 |
| 2006/0294238 A1 | 12/2006 | Naik et al. |
| 2007/0101377 A1 | 5/2007 | Six et al. |
| 2007/0168058 A1 | 7/2007 | Kephart et al. |
| 2007/0297400 A1 | 12/2007 | Cameron et al. |
| 2008/0014961 A1 | 1/2008 | Lipps et al. |
| 2008/0077465 A1 | 3/2008 | Schimpf et al. |
| 2008/0162984 A1 | 7/2008 | Kalra et al. |
| 2008/0240082 A1 | 10/2008 | Feldman et al. |
| 2009/0042537 A1 | 2/2009 | Gelbman et al. |
| 2009/0109845 A1 | 4/2009 | Andreasen et al. |
| 2009/0124284 A1 | 5/2009 | Scherzer et al. |
| 2009/0300173 A1 | 12/2009 | Bakman et al. |
| 2010/0035587 A1 | 2/2010 | Bennett |
| 2010/0050172 A1 | 2/2010 | Ferris |
| 2010/0066804 A1 | 3/2010 | Shoemake et al. |
| 2010/0128708 A1 | 5/2010 | Liu et al. |
| 2010/0188975 A1 | 7/2010 | Raleigh |
| 2010/0238840 A1 | 9/2010 | Lu et al. |
| 2010/0250751 A1 | 9/2010 | Leggette et al. |
| 2010/0281151 A1 | 11/2010 | Ramankutty et al. |
| 2010/0317331 A1 | 12/2010 | Miller |
| 2011/0075675 A1 | 3/2011 | Koodli et al. |
| 2011/0131338 A1 | 6/2011 | Hu |
| 2011/0211583 A1 | 9/2011 | Seetharaman et al. |
| 2011/0235505 A1 | 9/2011 | Eswara et al. |
| 2011/0258433 A1 | 10/2011 | Pulini et al. |
| 2011/0269499 A1 | 11/2011 | Vikberg et al. |
| 2011/0296232 A1 | 12/2011 | Izawa |
| 2011/0299386 A1 | 12/2011 | Negoto et al. |
| 2012/0023360 A1 | 1/2012 | Chang et al. |
| 2012/0030349 A1 | 2/2012 | Sugai |
| 2012/0084449 A1 | 4/2012 | Delos Reyes et al. |
| 2012/0106349 A1 | 5/2012 | Adjakple et al. |
| 2012/0131647 A1* | 5/2012 | Lan .................. H04L 63/0407 726/4 |
| 2012/0143923 A1 | 6/2012 | Whitney et al. |
| 2012/0144226 A1 | 6/2012 | Yang et al. |
| 2012/0177005 A1 | 7/2012 | Liang et al. |
| 2012/0190331 A1 | 7/2012 | Ahmed et al. |
| 2012/0207104 A1 | 8/2012 | Liang et al. |
| 2012/0236708 A1 | 9/2012 | Kompella et al. |
| 2012/0282937 A1 | 11/2012 | He et al. |
| 2013/0007286 A1 | 1/2013 | Mehta et al. |
| 2013/0010756 A1 | 1/2013 | Liang et al. |
| 2013/0054789 A1 | 2/2013 | Bajamahal |
| 2013/0094395 A1 | 4/2013 | Lopez et al. |
| 2013/0100815 A1 | 4/2013 | Kakadia et al. |
| 2013/0121298 A1 | 5/2013 | Rune et al. |
| 2013/0173804 A1 | 7/2013 | Murthy et al. |
| 2013/0188555 A1 | 7/2013 | Olsson et al. |
| 2013/0212205 A1 | 8/2013 | Flockhart et al. |
| 2013/0231080 A1 | 9/2013 | Cheuk et al. |
| 2013/0286821 A1 | 10/2013 | Liu |
| 2013/0308604 A1 | 11/2013 | Jiang et al. |
| 2014/0047282 A1 | 2/2014 | Deb et al. |
| 2014/0098671 A1 | 4/2014 | Raleigh et al. |
| 2014/0133464 A1 | 5/2014 | Li et al. |
| 2014/0148165 A1 | 5/2014 | Serravalle et al. |
| 2014/0160938 A1 | 6/2014 | Qu |
| 2014/0221025 A1 | 8/2014 | Chandramouli et al. |
| 2014/0241174 A1 | 8/2014 | Harris et al. |
| 2014/0359041 A1 | 12/2014 | Bai |
| 2015/0018131 A1 | 1/2015 | Siefker |
| 2015/0050924 A1 | 2/2015 | Gotou |
| 2015/0181431 A1 | 6/2015 | Zheng et al. |
| 2015/0201364 A1 | 7/2015 | Yamada et al. |
| 2015/0215768 A1 | 7/2015 | Dong et al. |
| 2015/0237539 A1 | 8/2015 | Guo |
| 2015/0271255 A1 | 9/2015 | Mackay et al. |
| 2015/0280927 A1 | 10/2015 | Liang et al. |
| 2015/0281466 A1 | 10/2015 | Guo et al. |
| 2015/0334615 A1 | 11/2015 | Zhang et al. |
| 2016/0028607 A1 | 1/2016 | Weill et al. |
| 2016/0029047 A1 | 1/2016 | Spidella et al. |
| 2016/0029278 A1 | 1/2016 | Poikonen et al. |
| 2016/0135143 A1* | 5/2016 | Won .................. H04W 72/005 370/312 |
| 2016/0270142 A1 | 9/2016 | Olsson et al. |
| 2016/0285923 A1 | 9/2016 | Kodaypak |
| 2016/0286295 A1 | 9/2016 | Ryu et al. |
| 2016/0337841 A1 | 11/2016 | Won et al. |
| 2016/0353325 A1 | 12/2016 | Poikonen |
| 2017/0054595 A1 | 2/2017 | Zhang et al. |
| 2017/0127324 A1 | 5/2017 | Liang et al. |
| 2017/0142762 A1 | 5/2017 | Kedalagudde et al. |
| 2017/0206115 A1 | 7/2017 | Shimojou et al. |
| 2017/0257810 A1 | 9/2017 | Gandhi |

(56) References Cited

U.S. PATENT DOCUMENTS

| | | | |
|---|---|---|---|
| 2017/0318450 A1 | 11/2017 | Salkintzis | |
| 2017/0332421 A1 | 11/2017 | Sternberg et al. | |
| 2018/0049156 A1* | 2/2018 | Laha | H04W 4/06 |
| 2018/0077714 A1* | 3/2018 | Kodaypak | H04W 76/00 |
| 2018/0109929 A1* | 4/2018 | Ly | H04W 4/38 |
| 2018/0139797 A1* | 5/2018 | Chun | H04W 60/04 |
| 2018/0192234 A1* | 7/2018 | Mohamed | H04L 67/18 |
| 2018/0241793 A1 | 8/2018 | Dellosa | |
| 2018/0248711 A1* | 8/2018 | McCann | H04L 12/2807 |
| 2018/0270710 A1* | 9/2018 | Hua | H04W 28/10 |
| 2018/0279115 A1 | 9/2018 | Tanna | |
| 2018/0332636 A1* | 11/2018 | Lu | H04W 76/10 |
| 2018/0343601 A1 | 11/2018 | Livanos | |
| 2018/0358337 A1 | 12/2018 | Maki | |
| 2018/0359337 A1 | 12/2018 | Kodaypak et al. | |
| 2018/0368202 A1 | 12/2018 | Landais et al. | |
| 2019/0007899 A1 | 1/2019 | Vrzic et al. | |
| 2019/0028866 A1 | 1/2019 | Baek et al. | |
| 2019/0037441 A1 | 1/2019 | Liu et al. | |
| 2019/0104503 A1 | 4/2019 | Niu et al. | |
| 2019/0116097 A1 | 4/2019 | Shimojou et al. | |
| 2019/0124572 A1 | 4/2019 | Park et al. | |
| 2019/0166644 A1 | 5/2019 | Shaw et al. | |
| 2019/0190784 A1 | 6/2019 | Shimojou et al. | |
| 2019/0215235 A1 | 7/2019 | Chou et al. | |
| 2019/0253962 A1 | 8/2019 | Kiessling et al. | |
| 2019/0261233 A1 | 8/2019 | Duan et al. | |
| 2019/0289622 A1 | 9/2019 | Chatterjee et al. | |
| 2019/0313216 A1 | 10/2019 | Wong et al. | |
| 2019/0313254 A1 | 10/2019 | Zaks | |
| 2019/0320332 A1 | 10/2019 | Halabian et al. | |
| 2020/0022074 A1 | 1/2020 | Shimojou et al. | |
| 2020/0028896 A1 | 1/2020 | Veldanda et al. | |
| 2020/0029273 A1 | 1/2020 | Shimojou et al. | |
| 2020/0077432 A1 | 3/2020 | Xiong et al. | |
| 2020/0089589 A1 | 3/2020 | Chou et al. | |
| 2020/0112861 A1 | 4/2020 | Yao et al. | |
| 2020/0178139 A1 | 6/2020 | Shimojou et al. | |

FOREIGN PATENT DOCUMENTS

| | | |
|---|---|---|
| CN | 102555536 A | 7/2012 |
| CN | 202965525 U | 6/2013 |
| CN | 103404181 A | 11/2013 |
| CN | 203311505 U | 11/2013 |
| CN | 104363572 A | 2/2015 |
| CN | 103348335 B | 7/2016 |
| EP | 1011974 A1 | 6/2000 |
| EP | 1518352 B1 | 8/2007 |
| EP | 2200369 A2 | 6/2010 |
| EP | 2709385 A1 | 3/2014 |
| GB | 2409368 A | 6/2005 |
| JP | 2002-319963 A | 10/2002 |
| JP | 2006-501781 A | 1/2006 |
| JP | 2009-522933 A | 6/2009 |
| JP | 2010-88013 | 4/2010 |
| JP | 2010-141555 A | 6/2010 |
| JP | 2011-508474 A | 3/2011 |
| JP | 2011-259440 A | 12/2011 |
| KR | 10-2010-0070691 A | 6/2010 |
| WO | WO-2004004216 A1 | 1/2004 |
| WO | WO-2007081727 A2 | 7/2007 |
| WO | WO-2009107117 A2 | 9/2009 |
| WO | WO-2010066430 A1 | 6/2010 |
| WO | WO-2013143831 A1 | 10/2013 |
| WO | WO-2013177693 | 12/2013 |
| WO | WO-2016206118 A1 | 12/2016 |
| WO | WO-2017004158 A1 | 1/2017 |
| WO | WO-2017076088 A1 | 5/2017 |
| WO | WO-2017197589 A1 | 11/2017 |
| WO | WO-2018222838 | 12/2018 |
| WO | WO-2020023511 A1 | 1/2020 |

OTHER PUBLICATIONS

International Search Report and Written Opinion issued by the U.S. Patent and Trademark Office as Searching Authority, issued in International Application PCT/US16/69092, dated Mar. 29, 2017 (15 pages).
3GPP TR 23.722 v0.1.1, "3rd Generation Partnership Project; Technical Specification Group Services and System Aspects; Study on Common API Framework for 3GPP Northbound APIs (Release 15)", Valbonne, France, Apr. 2017 (20 pages).
3GPP TS 23.682 v14.3.0, "3rd Generation Partnership Project; Technical Specification Group Services and System Aspects; Architecture enhancements to facilitate communications with packet data networks and applications (Release 14)", Valbonne, France, Mar. 2017 (106 pages).
CISCO Systems, "Deployment Guide: CISCO IOS IPSEC High Availability", 2005, accessed http://www.cisco.com/en/US/technologies/tk583/tk372/technologies_white_paper0900aecd80278edf.pdf, retrieved Jul. 26, 2018 (16 pages).
International Search Report and Written Opinion issued by the European Patent Office as International Searching Authority in International Application No. PCT/US2018/035345, dated Aug. 13, 2018 (19 pages).
International Search Report and Written Opinion issued by the European Patent Office as International Searching Authority in International Application No. PCT/US2018/031423, dated Oct. 9, 2018 (18 pages).
3GPP TR 21.905 v15.0.0 (Mar. 2018), 3rd Generation Partnership Project; Technical Specification Group Services and System Aspects; Vocabulary for 3GPP Specifications (Release 15), Valbonne, France, Mar. 2018 (65 pages).
3GPP TR 21.905 v13.1.0 (Jun. 2016), "3rd Generation Partnership Project; Technical Specification Group Services and System Aspects; Vocabulary for 3GPP Specifications (Release 13)", Valbonne, France, Jun. 2016 (65 pages).
3GPP TS 23.682 v. 15.5.0 (Jun. 2018),"3rd Generation Partnership Project; Technical Specification Group Services and System Aspects; Architecture Enhancements to Facilitate Communications with Packet Data Networks and Applications (Release 15)", Valbonne, France, Jun. 2018 (125 pages).
3GPP TS 23.682 v13.11.0 (Jun. 2018); "3rd Generation Partnership Project; Technical Specification Group Services and System Aspects; Architecture Enhancements to Facilitate Communications with Packet Data Networks and Applications (Release 13)"; Valbonne, France, Jun. 2018 (93 pages).
3GPP TR 23.714 V.14.0.0, "3rd Generation Partnership Project; Technical Specification Group Services and System Aspects; Study on Control and User Plane Separation of EPC Nodes (Release 14)"; Valbonne, France, Jun. 2016 (87 pages).
3GPP TS 23.040 v13.2.0 (Sep. 2016), "3rd Generation Partnership Project; Technical Specification Group Core Network and Terminals; Technical Realization of the Short Message Service (SMS) (Release 13)", Valbonne, France, Sep. 2016 (214 pages).
3GPP TS 23.204 v13.1.0 (Jun. 2016), "3rd Generation Partnership Project; Technical Specification Group Services and Systems Aspects; Support of Short Message Service (SMS) over Generic 3GPP Internet Protocol (IP) Access; Stage 2 (Release 13)", Valbonne, France, Jun. 2016 (59 pages).
3GPP TS 23.214 V14.5.0, "3rd Generation Partnership Project; Technical Specification Group Services and System Aspects; Architecture enhancements for control and user plane separation of EPC nodes; Stage 2 (Release 14)", Valbonne, France, Dec. 2017 (84 pages).
3GPP TS 23.236 v12.0.0 (Jun. 2013); "3rd Generation Partnership Project; Technical Specification Group Services and System Aspects; Intra-domain connection of Radio Access Network (RAN) nodes to multiple Core Network (CN) nodes (Release 12)", 3GPP Organizational Partners, Valbonne, France, Jun. 2013 (40 pages).
3GPP TS 23.236 v13.0.0 (Jun. 2015); "3rd Generation Partnership Project; Technical Specification Group Services and System Aspects; Intra-domain connection of Radio Access Network (RAN) nodes to

(56) References Cited

OTHER PUBLICATIONS multiple Core Network (CN) nodes (Release 13)", 3GPP Organizational Partners, Valbonne, France, Jun. 2015 (41 pages).
3GPP TS 23.401 V13.9.0 (Dec. 2016), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).
3GPP TS 23.401v13.5.0 (Dec. 2015), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne France, Dec. 2015 (337 pages).
3GPP TS 23.682 v13.9.0 (Jun. 2017), "3rd Generation Partnership Project; Technical Specification Group Services and System Aspect; Architecture enhancements to facilitate communications with packet data networks and applications (Release 13)", Valbonne, France, Jun. 2017 (93 pages).
3GPP TS 29.128 v13.3.0 (Dec. 2016), "3rd Generation Partnership Project; Technical Specification Group Core Network and Terminals; Mobility Management Entity (MME) and Serving GPRS Support Node (SGSN) Interfaces for Interworking with Packet Data Networks and Applications (Release 13)", Valbonne, France, Dec. 2016 (47 pages).
3GPP TS 29.338 v13.3.0 (Dec. 2016), "3rd Generation Partnership Project; Technical Specification Group Core Network and Terminals; Diameter Based Protocols to Support Short Message Service (SMS) Capable Mobile Management Entities (MMEs) (Release 13)", Valbonne, France, Dec. 2016 (50 pages).
3GPP, "Universal Mobile Telecommunications System (UMTS); UTRAN Overall Description (3GPP TS 25.401 version 12.0.0 Release 12)", ETSI TS 125 401 v12.0.0 (Oct. 2014); European Telecommunications Standards Institute, Oct. 2014, pp. 1-64 (65 pages—entire document).
Apple, 3GPP Draft, "A solution of network slice instance selection and association", Temporary Document, SA WG2 Meeting #S2-116BIS, S2-165127, Aug. 29-Sep. 2, 2016, Sanya, P.R China, Sep. 2016 (5 pages).
European Extended Search Report issued in EP16882635.2. dated Jul. 17, 2019 (13 pages).
Extended European Search Report issued in European Patent Application No. 12825827.4, dated Mar. 6, 2015 (7 pages).
Extended European Search Report issued in European Patent Application No. 16762501.1, dated Oct. 30, 2018 (11 pages).
Giust, F. et al., "ETSI: MEC Deployments in 4G and Evolution Towards 5G", ETSI White Paper No. 24, First Edition, ISBN No. 979-10-92620-18-4, Feb. 2018 (24 pages).
Horak, R., Excerpt from "Internet Protocols", in Telecommunications and Data Communications Handbook, John Wiley & Sons, pp. 663-664, Aug. 2007 (2 pages).
International Search Report and Written Opinion issued by the European Patent Office as International Searching Authority in International Application No. PCT/US2019/018666, dated Jul. 10, 2019 (26 pages).
International Search Report and Written Opinion issued by the European Patent Office as International Searching Authority, issued in International Application No. PCT/US19/23138, dated May 29, 2019 (16 pages).
International Search Report and Written Opinion issued by the U.S. Patent and Trademark Office as International Searching Authority for International Application No. PCT/US12/21520 dated May 8, 2012 (8 pages).
International Search Report and Written Opinion issued by the U.S. Patent and Trademark Office as International Searching Authority for International Patent Application No. PCT/US16/21744 dated Jun. 9, 2016 (8 pages).
International Search Report and Written Opinion issued by the U.S. Patent and Trademark Office as International Searching Authority, received for PCT Patent Application No. PCT/US12/25577, dated May 21, 2012, 7 pages.
International Search Report and Written Opinion as issued by the U.S. Patent and Trademark office as International Search authority, received for PCT Patent Application No. PCT/US2011/055183, dated Mar. 8, 2012, 9 pages.
International Search Report and Written Report issued by the U.S. Patent and Trademark Office as International Searching Authority, issued in PCT/US17/017913, dated Mar. 13, 2017 (14 pages).
Rodriguez, et al., "A 3GPP System Architecture Evolution Virtualized Experimentation Infrastructure for Mobility Prototyping (Invited Paper)", Proceedings of the 4th International Conference on Testbeds and Research Infrastructure for the Development of Networks & Communities (Tridentcom), Mar. 18, 2008 (10 Pages).
Taniguchi, et al., "Implementation and Evaluation of Cooperative Proxy Caching System for Video Streaming Services", Technical Report of the Institute of Electronics Information and Communication Engineers, IEICE, Japan, vol. 103(650):13-18, Feb. 5, 2004 (6 pages)—English Abstract.
Hakala, H. et al., "Diameter Credit-Control Application, RFC 4006", Network Working Group, Standards Track, http://tools.ietf.org/html/rfc4006, pp. 1-11, 55-57, 69, 71-75, Aug. 2005 (20 pages).
International Search Report and Written Opinion issued by the European Patent Office as International Searching Authority for International Application No. PCT/US19/43037, dated Oct. 29, 2019 (14 pages).

\* cited by examiner

METHODS OF AND SYSTEMS OF SERVICE CAPABILITIES EXPOSURE FUNCTION (SCEF) BASED INTERNET-OF-THINGS (IOT) COMMUNICATIONS

CROSS-REFERENCE TO RELATED APPLICATIONS

This application claims the benefit under 35 U.S.C. § 119(e) to U.S. Provisional Patent Application No. 62/502,070 entitled "METHODS OF AND SYSTEMS OF SERVICE CAPABILITIES EXPOSURE FUNCTION (SCEF) BASED INTERNET-OF-THINGS (IOT) COMMUNICATIONS," filed on May 5, 2017, the content of which is incorporated by reference herein.

FIELD OF INVENTION

The invention generally relates to communications networks and, in particular, to packet data network ("PDN") architectures.

BACKGROUND

The $3^{rd}$ Generation Partnership Project ("3GPP") has defined a Service Capability Exposure Function ("SCEF") in standards document 23.682, "Architecture Enhancements to Facilitate Communications with Packet Data Networks ("PDNs") and Applications." SCEF defines both paths for data to travel and for control plane actions and makes it possible for external Application Servers to communicate with the various network functions without needing to know all of the communications protocols.

SUMMARY

Systems and methods are disclosed herein for implementing eNodeB-specific relative capacity assignment. In some embodiments, an augmented SCEF (A-SCEF) may receive a command message from an application server (AS). The command message may include an external identification tag, an application programming interface (API) instruction associated with the external identification tag, and a security credential. The A-SCEF may then confirm that the security credential is authorized for the external identification tag, and, in response to the confirming, locating in a first electronically searchable catalog on or connected to the A-SCEF at least one network identifier associated with the external identification tag. The at least one network identifier may be different from the external identification tag. The A-SCEF may send a communication to at least one user equipment (UE) associated with the at least one network identifier based on the application programmer interface (API) instruction.

In some embodiments, an A-SCEF may receive a command message from an AS. The command message may include an external identification tag, an API instruction associated with the external identification tag, and a security credential related to an entity associated with the AS. The A-SCEF may confirm that the security credential is authorized for the external identification tag, and in response to the confirming, send a communication to the AS based on the API instruction.

In some embodiments, an A-SCEF may associate a policy profile with at least one AS. The policy profile may govern at least one of network traffic management, billing, and notification. The A-SCEF may then receive a command message from the at least one AS. The command message may contain an external identification tag and an API instruction associated with the external identification tag. The A-SCEF may then locate in an electronically searchable catalog at least one network identifier associated with the external identification tag, and the at least one network identifier is different from the external identification tag. The A-SCEF may then facilitate sending in accordance with the policy profile a communication to at least one UE associated with the at least one network identifier based on the API.

In some embodiments, an A-SCEF may associate a policy profile with at least one AS. The policy profile governs at least one of network traffic management, billing, and notifications. The A-SCEF may then receive a command message from an AS, including an external identification tag, and an API instruction associated with the external identification tag. The A-SCEF may then locate in an electronically searchable catalog at least one network identifier associated with the external identification tag, wherein the at least one network identifier is different from the external identification tag. The A-SCEF may then send at least one communication to the at least one AS, in accordance with the at least one policy profile. That message may include the external identification tag and information based on the API instruction.

In some embodiments, an A-SCEF may associate a policy profile with at least one AS. The policy profile may govern at least one of billing and notifications. The A-SCEF may receive a communication from a UE comprising a network identifier of the UE and data. The A-SCEF may locate in a first electronically searchable catalog at least one external identification tag associated with the network identifier, where the at least one network identifier is different from the external identification tag. The A-SCEF may then locate in a second electronically searchable catalog, at least one policy profile associated with at least one of the network identifier, the external identification tag, or the data. The A-SCEF may then identify at least one AS based on at least one of the external identification tag or the data and then send at least one message to the identified at least one AS, in accordance with the at least one policy profile, the message comprising the external identification tag and information based on the data.

In some embodiments, an A-SCEF may associate a security credential with at least one UE, the security credential authorizing the at least one UE to send data to at least one of an AS, a tenant associated with at least one AS, or an enterprise associated with at least one tenant. The A-SCEF may also receive a communication from the UE comprising a network identifier of the UE and data. The A-SCEF may identify, in a database, an API instruction to send the data to at least one of the AS, the tenant, or the enterprise. The A-SCEF may confirm that the security credential associated with the UE is authorized for the at least one of the AS, the tenant, or the enterprise. In response to the confirming, the A-SCEF may send a communication to the AS, an AS associated with the tenant, or an AS associated with a tenant associated with the enterprise based on the API instruction.

The various embodiments discussed above and herein may be combined in various ways, including replacing and adding steps or elements with additional listed steps or elements.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

For a more complete understanding of various embodiments of the disclosed subject matter, reference is now made to the following descriptions taken in connection with the accompanying drawings, in which.

DETAILED DESCRIPTION

The $3^{rd}$ Generation Partnership Project ("3GPP") has defined a Service Capability Exposure Function ("SCEF") in standards documents 23.682, "Architecture Enhancements to Facilitate Communications with Packet Data Networks ("PDNs") and Applications" and 21.905, "3GPP; Technical Specification Group Services and System Aspects; Vocabulary for 3GPP Specifications," the contents of which are herein incorporated by reference in their entireties. SCEF defines both paths for data to travel and for control plane actions and makes it possible for external Application Servers to communicate with the various network functions without needing to know all of the communications protocols. However, the 23.682 standard (which defines SCEF) is a collection of functionalities and not a product. Although the SCEF functionality is generically defined in the 3GPP standards, interfaces to Application Servers ("AS's") and Service Capability Servers ("SCS's") are considered outside the scope of standardization. As used herein, an AS is generically defined (e.g., can be located in "The Cloud"), and machine-to-machine ("M2M") communication can include an AS attempting to communicate with an application running on a user device (also referred to herein as user equipment ("UE"), e.g., a thermostat). Unless otherwise stated, the interfaces discussed in the present disclosure refer to those defined in existing 3GPP standards.

The present disclosure describes methods and systems for SCEF-based IOT communications that allow a Service Provider (also referred to herein as an "operator") to deploy functionalities for an end-to-end Internet of Things ("IOT") service. As used herein, "SCEF" refers to the functions in the 23.682 document. According to some embodiments set forth herein, an Augmented SCEF-based IOT communications system ("A-SCEF") includes a 3GPP SCEF Extension ("3GPP-SCEF-E") and a Device Gateway ("DG"). As discussed in greater detail below with reference to FIG. 16, the 3GPP-SCEF-E can comprise a SCEF 1602, MTC-IWF 104 and a Machine Type Communication-Authentication, Authorization and Accounting ("MTC-AAA") 108. The DG can be deployable individually or as part of a service platform (e.g., IOT Service Platform ("IOTSP")). In some embodiments, the DG is an expanded version of an SCS.

Figure 12:
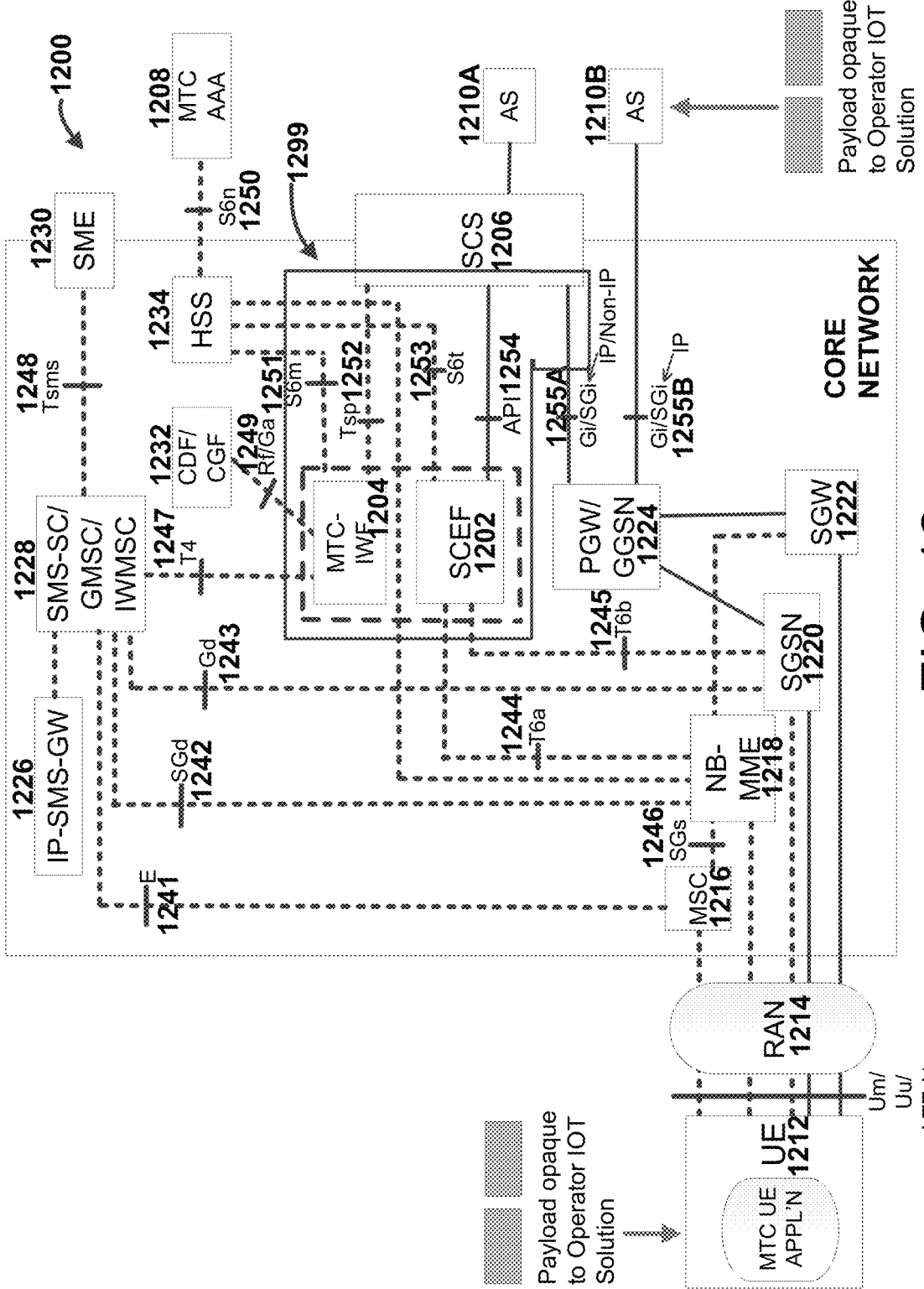
FIG. 12 is a block diagram of a 3GPP Machine-Type Communication ("MTC") reference architecture, in accordance with some embodiments of the disclosed subject matter.
Figure 22:
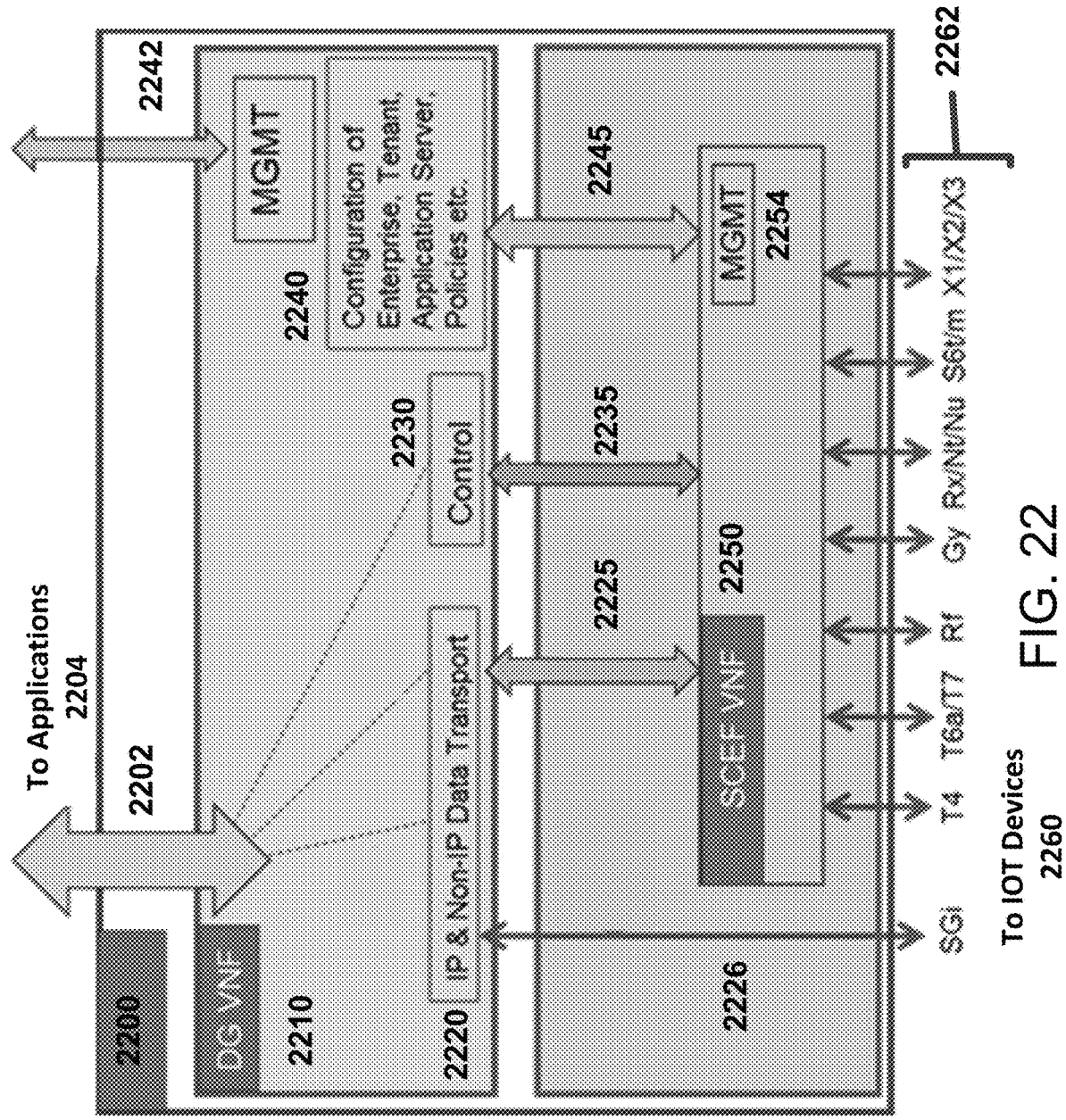
FIG. 22 illustrates the basic connectivity of an A-SCEF, in accordance with some embodiments of the disclosed subject matter.

According to embodiments set forth herein, the A-SCEF provides an interface between the service layer (represented by IOT Platform(s), SCS, AS, etc.) and the 3GPP Core. The A-SCEF hides the intricacies of the 3GPP Core network from IOT Applications that interact with an IOT device (or, UE in 3GPP terms) through the 3GPP Core. As illustrated in FIG. 22, IOT Applications 2204 can interact with IOT devices 2260 through the A-SCEF 2200, which provides an interface to the 3GPP core. Similarly, IOT devices 2260 connected to the 3GPP Core can interact with a IOT Platforms, SCS, and AS through the A-SCEF (Applications 2204). The scope of the A-SCEF 2200 functionality is further illustrated in FIG. 12 with A-SCEF 1299, which depicts the 3GPP architectural model. The A-SCEF 1299 functionality and connectivity is indicated by the boxed area 1299. As illustrated by the boxed area, the A-SCEF 1299 combines the functionality defined in 3GPP for the SCEF 1202, the MTC-IWF 1204, and parts of the SCS 1206. FIG. 12 is described in greater detail below.

Returning to FIG. 22, the basic connectivity of an A-SCEF 2200 is shown, according to an embodiment. A-SCEF 2200 comprises a DG virtual network function (VNF) 2210 and an SCEF VNF 2250, which has functions of a typical 3GPP SCEF (a 3GPP-SCEF-E) unless otherwise noted. As shown in FIG. 22, Communication with applications 2204 is facilitated through APIs exposed northbound through IP & Non-IP data transport block 2220, control block 2230, and Management (MGMT) block 2240. IP & Non-IP data transport block 2220 communicates with the SCEF VNF 2250 via pathway 2225 and to IOT devices 2260 via the SGi pathway (without routing through a typical 3GPP SCEF). Control block 2230 communicates via pathway 2234 to SCEF VNF 2250 via pathway 2235 and MGMT block 2240 communicates with the MGMT block via pathway 2245. The SCEF communicates over various connectivity pathways 2226 to the IOT devices 2260. According to an embodiment, IP and Non-IP Transport block 2220 coordinates transfer of data via the SGi pathway or to SCEF 2250 for transportation via 3GPP-defined pathways, among others. Control block 2230 passes control information (e.g., turn off, send data, subscribe, etc.) from DG VNF 2210 to SCEF VNF 2250. MGMT block 2250 passes MGMT information, such as policy and provisioning information received and stored in DG VNF 2210 to SCEF VNF 2250's MGMT block 2254.

One of the major considerations for operators looking to provide an end-to-end IOT solution is the ease with which the applications for myriads of IoT devices can be developed and stay relevant and useful as technologies change and evolve. One of the options is that Operators may deploy an IoT platform that exposes APIs like oneM2M, LWM2M, private protocols, etc.—in this scenario, the IoT platform has to invoke the A-SCEF APIs to access 3GPP network capabilities. As an alternative, the Operators can expose the A-SCEF APIs to the Application developers directly. APIs (type 1) supported by the A-SCEF offer a better level of abstraction that shield the application from in-depth knowledge of the 3GPP APIs (called Type 2 APIs). The API calls are a combination of Type 1 and Type 2 API calls as dictated by the Operator's call model. These API calls support both Data delivery (NIDD-via-T6a or NIDD-via-SGi as examples) and Control functions (MONTE functions as example). Note that the Data delivery APIs are appropriate for devices that adhere to the Mobile Autonomous Reporting (MAR) model—MAR Call Model. The Control functions, on the other hand, are appropriate for all types of IoT devices—irrespective of the Data delivery mechanisms. For example, a video surveillance device may stream data at a high rate—the A-SCEF can be used for Control functions and small data transfers (to turn on/off the stream, for example) while the video data is directly streamed to servers without passing through the A-SCEF.

On the North Bound side, the A-SCEF may interact through RESTful HTTP(S) APIs with a combination of IOT Platforms, multiple SCS, multiple Enterprises via AS' that reside in that Enterprise. On the South Bound side, the A-SCEF may interact with MME, PGW, SMS-SC, HSS, PCRF and other 3GPP elements using 3GPP standardized protocols to support the delivery of data (IP/Non-IP, MO/MT), MONTE, Device Triggering and other functionality.

As described in further detail below, the A-SCEF can allow an operator to provide a set of APIs that allows access to several data paths through the 3GPP core. Thus, IOT applications (at, for example, an IOT platform) can be written in a 3GPP-data-path-agnostic manner. One of the major considerations for operators looking to provide an end-to-end IOT solution is the ease with which the applications for myriads of IOT devices can be developed and stay relevant and useful as technologies change and evolve. The A-SCEF provides a robust, scalable solution to this problem.

Below is a list of various aspects that, according to some embodiments, may be included in the A-SCEF:

Provides flexible deployment and placement Options for the Operators. As an example, the 3GPP SCEF function may be placed in local data centers near the MMEs while the APIs are served from a central location. Further deployment options are explained in detail later.

Provides a rich provisioning model that allows the Operator to simplify the Enterprise and Device onboarding and support process. This model allows for multitenancy in order to simultaneously support many Enterprises within the same deployment. Multi-tenancy support also provides for RBAC (Role Based Access Control) on a per-Enterprise basis.

Provides a strong security model. The Enterprise AS' may reside in the internet and thus the north bound interfaces of the A-SCEF have to be extremely robust and promote end-to-end security for the IOT Applications.

Provides support for a single FQDN for the A-SCEF. This simplifies deployments from the Enterprise/Application perspective as Applications can be written to look up the FQDN via DNS and load balance their interaction (so called "Client-side load balancing" allowing each AS/client to choose which path to use in response to a DNS querry).

Provides Operator configurable Policy Driven controls. Policies are provided for the Operator to control behaviors related to Traffic Management (Rate control, prioritization, memory allocation, etc.), Notification (enable asynchronous retrieval by Application, etc.), Billing (Charging support—local or offline processing of CDRs), etc.

Provides charging support by generating CDRs. 3GPP is specifying CDRs for NIDD-via-T6a. In addition, for other cases, like API calls and message-based charging, the A-SCEF reuses and extends 3GPP standard formats to ensure accurate charging for new functionalities.

High Availability (HA), including local (site-level) HA may be supported. Also, support for Geo-Redundant deployments is may be included.

In addition, according to an embodiment, the A-SCEF may expose additional functionalities to northbound entities. For example, an Application invokes the API to "send data to identified device"—the A-SCEF figures out the appropriate data-connectivity path, the right time to send (based on reachability of device, policy definition, device trigger notification, etc.), sends the data, and, if required and enabled, provides a notification to the caller once the data is successfully delivered. Another example is support for store-and-forward of device data controlled by Operator configured policies—this enhances the flexibility of application implementations—some applications may retrieve data at a time of their choosing (e.g., once per day), other applications may receive notifications upon data arrival and then retrieve data right away, etc. As another example, the A-SCEF supports the notion of a Group of devices, a single API call for the Group from the North Bound translates into several calls on the South Bound with appropriate controls per Operator defined policies (for example, a single API could be invoked to send data to all members of the Group; A-SCEF applies operator defined policies (for example, send at most 10 copies at any time, send data to group members only at 2 am, etc.) and carries out the actions). Each example alone or in combination greatly simplifies the process of device management and communications for northbound applications.

In some embodiments, the A-SCEF provides support for various forms of data path connectivity to northbound interfaces. For example, these interfaces may include: RESTful API (to/from IOT platform, enterprise, AS); Management and Provisioning RESTFUL API (to/from EMS); 23.682 control APIs for MONTE, Config of NIDD, etc.; and/or 23.682 APIs for transfer of NIDD over T6a.

In some embodiments, the A-SCEF provides support for various forms of data path connectivity within the 3GPP Core and monitoring actions to northbound interfaces. For example, the A-SCEF may provide access through protocols specified in 3GPP Specification 23.682 such as NIDD-via-T6a and MT-SMS-via-T4. The A-SCEF may also provide support for additional data paths that are not specified. For example, the A-SCEF may provide data connectivity with the following options: IP-via-SGi (e.g., to/from PGW) for TCP connectivity to IOT device, IP-via-SGi (e.g., to/from PGW) for UDP connectivity to IOT device, non-IP-via-SGi using UDP tunnel (e.g., to/from PGW) to IOT device. Also called as NIDD-via-SGi, and/or MO & MT SMS support using SGd or GD interface.

According to some embodiments, the A-SCEF gives the operator control over setting policies. Policies are provided for the Operator to control behaviors related to Traffic Management (Rate control, prioritization, memory allocation, etc.), Notification (enable asynchronous retrieval by Application, etc.), Billing (Charging support—local or offline processing of CDRs), etc. Accordingly, the A-SCEF may create classes that may be assigned to entities (as discussed in greater detail below) that sets forth how traffic, notifications, and billing are to operate for all communications or devices associated with those entities. This gives the operator control over the network while simplifying the communication process for clients.

Figure 21:
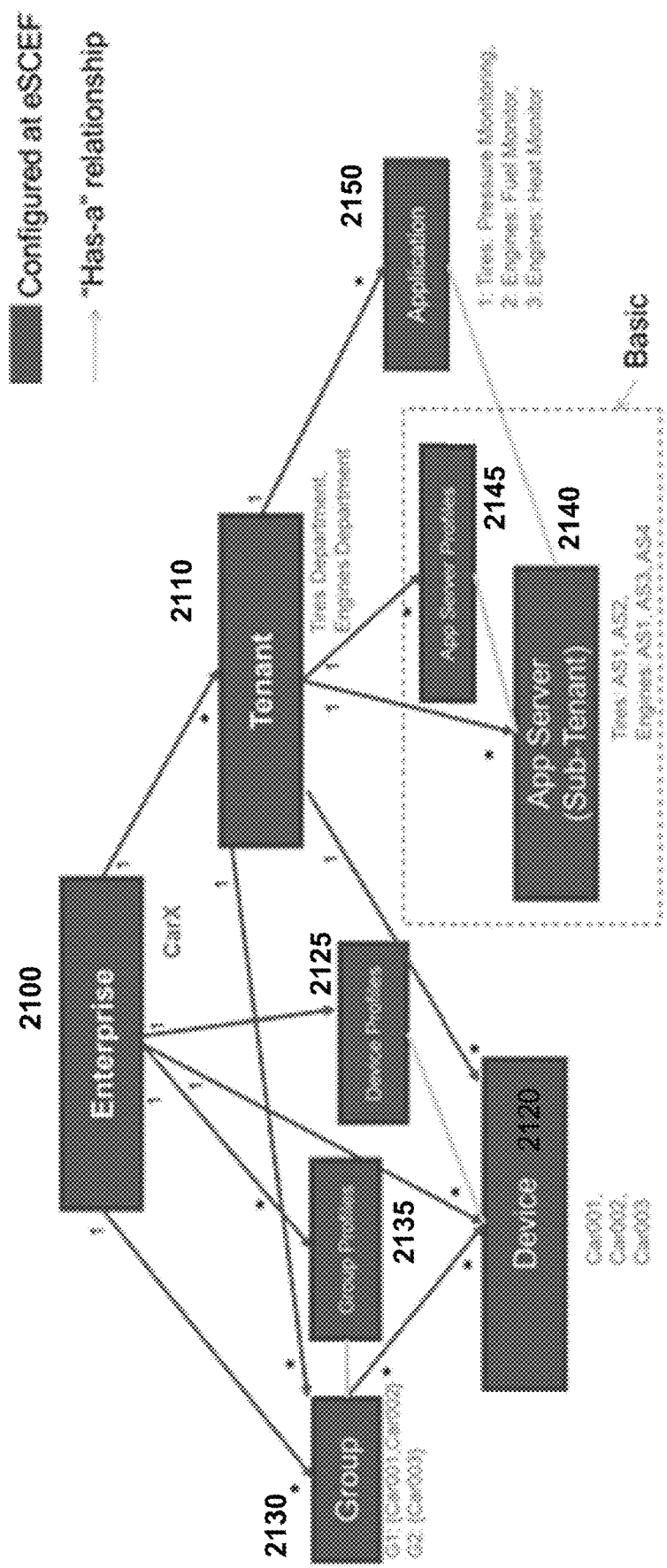
FIG. 21 illustrates a hierarchy of various entities and their associated profiles, in accordance with some embodiments of the disclosed subject matter.

According to some embodiments, the A-SCEF may service different entities for which policies may be assigned. Provisioning and policy setting may be accomplished via the MGMT blocks 2250 and 2254 of FIG. 22. FIG. 21 shows a hierarchy of various entities and their associated profiles. Such entities and profiles may be set via provisioning. For example, these may be entered by an operator or set using the MGMT systems. Enterprise 2100 may be associated with, for example, a company like CarX, a motor vehicle manufacturing company that includes IOT devices on the network. CarX may have multiple subgroups that operate different kinds of IOT devices, such as the tires department and the engines department. These are referred to as Tenant(s) 2110. Each tenant 2110 may operate numerous devices 2120 such as cars 001-003. Devices 2120 may be various types of IOT devices that operate on the network. Devices 2120 may be organized into groups 2130 for ease of access. Groups are a grouping of devices 2120 that may be accessed using a single identifier and may belong to either the enterprise 2100 as a whole, or a tenant 2110 of the enterprise 2110. Each tenant may possess at least one app server 2140 for communicating with devices 2120 over the network. Each tenant 2110 may have multiple application servers 2140.

According to an embodiment, each device 2120, group 2130, and application server 2140 may have an associated device profile 2125, group profile 2135, and application server profile 2145. Furthermore, enterprises and tenants may also have profile (not shown). The profiles 2125, 2135, and 2145 may define two sets of characteristics: associations and policies. According to an embodiment, associations, which may be provisioned at any point, associate, for example, devices with groups, devices/group with tenants, devices/groups with enterprises, tenants with enterprises, and/or application servers with tenants. Accordingly, associations may take the form of, for example, security tokens, or connections stored in a database that authorize access and connection over the network.

According to some embodiments, profiles 2125, 2135, and 2145 may also define policies. Policies are provisioned by the operator of the network, and define network characteristics for the associated devices, groups, application servers, tenants, and enterprises (e.g., "entities"). This offers network operators a high degree of control with simplicity for controlling and managing network functions, while allowing them to provide various levels of service for their customers. Policies may include, but are not limited to, traffic management, billing, and notification policies. According to an embodiment, traffic management policies may govern the rate at which communications sent to or from associated entities. According to an embodiment, traffic management policies may govern priority of communications sent to or from associated entities as relates to other communications on the network. According to an embodiment, traffic management policies may govern preferred pathways for communications to or from associated entities. According to an embodiment, traffic management policies may govern whether or not communications may be stored prior to sending, and if so, how much storage is available, for how long, and for how many communications, for associated entities. According to an embodiment, traffic management policies may govern how many communications may be sent and to whom, for communications to or from associated entities. According to an embodiment, traffic management policies may govern scheduling of communications to or from associated entities. According to an embodiment, billing policies may govern when, how, how much, how often, and to whom billing occurs or communications to or from associated entities. According to an embodiment, notification policies may govern to whom, how often, and when notifications are sent to entities.

According to an embodiment, an A-SCEF may support multiple enterprises 2100. According to an embodiment, multiple enterprises may be supported by as single A-SCEF or a plurality of A-SCEFs. Thus, the A-SCEF(s) must have a way to distinguish between different traffic and requests associated with different enterprises. Entity profiles and policy profiles assist in this process. For example, entity profiles simplify security access. If another enterprise other than CarX seeks to send a message to car001, they will be denied based on the profiles of either the car or the enterprise. Furthermore, entity profiles make it easier for the various departments of CarX to communicate with cars. For example, each group may have a single group external identifier that is used to communicate with the entire group. The department may further provision new cars in the groups without having to keep or update their own lists. The network operator may keep track of which devices are online or activated and control communications to devices or groups so as to simplify the applications on the application server side.

According to an embodiment, policy profiles associated with various entities ease network management by the operator without burdening the tasks of those using the network. These policies may be set via provisioning. Associating policies, such as traffic management, billing, and notifications discussed above, with entities discussed above allows for the network operator to easily manage network operations for a large number of enterprises. It further offers the network operator flexibility in plans available to customers. For example, the engines department of CarX may only need occasional updates on the mileage accumulated by each Car, and therefore may have lower priority and more restricted traffic management and notification policies (and therefore cheaper or different billing policies). However, the tires department may desire quick notifications for blowouts in order to provide assistance to drivers, thus necessitating higher priority traffic management and notification policies. The engines department may further want to send updates to large numbers of cars (e.g., hundreds of thousands of cars). Rather than sending each update individually, it may instead notify the A-SCEF that an update should be sent to all cars in a particular group, and the A-SCEF may schedule and handle the sending such updates while ensuring that network load and characteristics are taken into account (e.g., not overburdening the network). The network operator may offer different policies to different enterprises. Policies and associations may be provisioned via an API call from an application server, according to an embodiment. According to another embodiment, policies and associations may be preset by the operator prior to connection of, for example, application servers and/or devices.

Figure 23A:
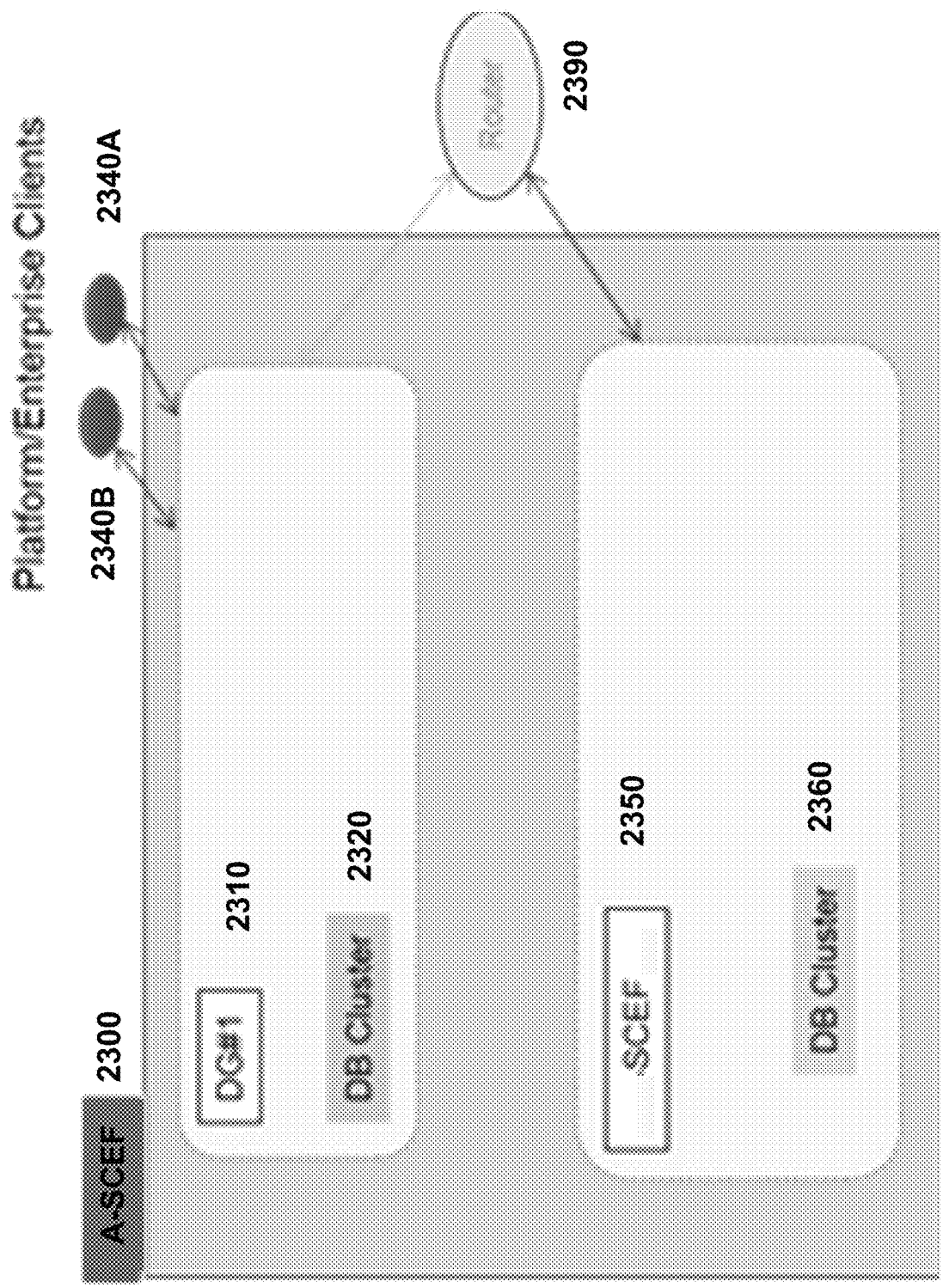
FIGS. 23A-23D illustrate various deployments of A-SCEF(s), in accordance with some embodiments of the disclosed subject matter.

FIGS. 23A-23D show various deployments of A-SCEF(s) in various ratios, according to some embodiments. As shown in FIG. 23A, a basic deployment of an A-SCEF 2300 may comprise a DG 2310 and an SCEF 2350. The SCEF may perform the functions of an SCEF per 3GPP standards. In this deployment, there is a 1:1 ratio of DG 2310 to SCEF 2350 installed in a single data center. Each may take the form of a VNF, according to an embodiment. This is effectively the smallest deployment—so, can be considered the basic deployment. For this deployment, all the fault, configuration, accounting, performance, security (FCAPS) are aggregated to present a single view of the A-SCEF to the management. The external "router" 2390 is shown for cases where communication between the DG 2310 and SCEF 2360 uses IP connectivity in the data center. Where the DG 2310 and SCEF 2360 are each VNFs, the VNFs supports local HA, and, in particular, the DB Clusters 2320 and 2360 within each VNF supports local HA. Platform/Enterprise clients 2340A and 2340B may communicate with the DG 2310, and devices may communicate up through the SCEF 2360.

Figure 23B:
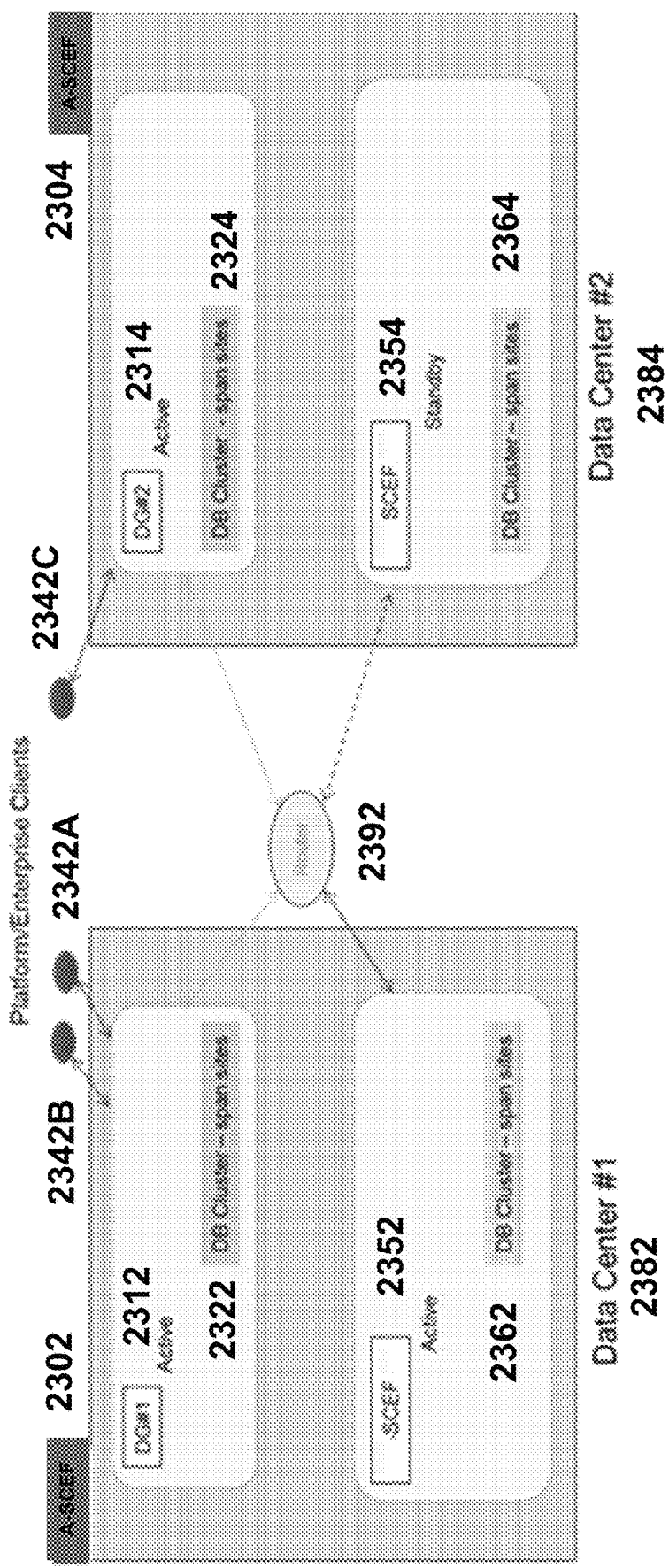

According to some embodiments, the system may be georedundant in a 1:1 ratio. As shown in FIG. 23B, two A-SCEFs 2302 and 2304 are in two separate data centers 2382 and 2384, with router 2392 routing between them (e.g., georedundant clusters). Each A-SCEF 2312 has a DG 2312 or 2314 with DB clusters 2322 or 2324 and an SCEF 2352 or 2354 with DB clusters 2362 or 2364, respectively. Both DGs 2312, 2314 may be active simultaneously. The direction of traffic from clients 2342A-2342B is under DNS control, though communication to both may be implemented by a single shared FQDN. This helps simplify the design of the Application Server (Platform/Enterprise Clients 2342A-2342C) and provides a mechanism to favor locality. The georedundant 1:1 configuration shown in FIG. 23B may be in an Active-Active state. In an Active-Active state, each DG 2312, 2314 may be active on each A-SCEF 2302, 2304. However, while SCEF 2352 is also in an active state, the SCEF 2354 is in a standby state. Thus, while the SCEF function is geographically distributed and shared by the two data centers 2382, 2384, at any point only one DB cluster 2362 2364 will see transactions. Local HA is supported by having 2 VMs each with 3 nodes in the VM. The router 2392 routes between the active SCEF and the DGs 2312, 2314. The SCEF geo-redundancy makes use of the path costs for the Router to pick the currently Active SCEF. In the event where SCEF 2352 becomes unavailable, SCEF 2354 may become active.

Figure 23C:
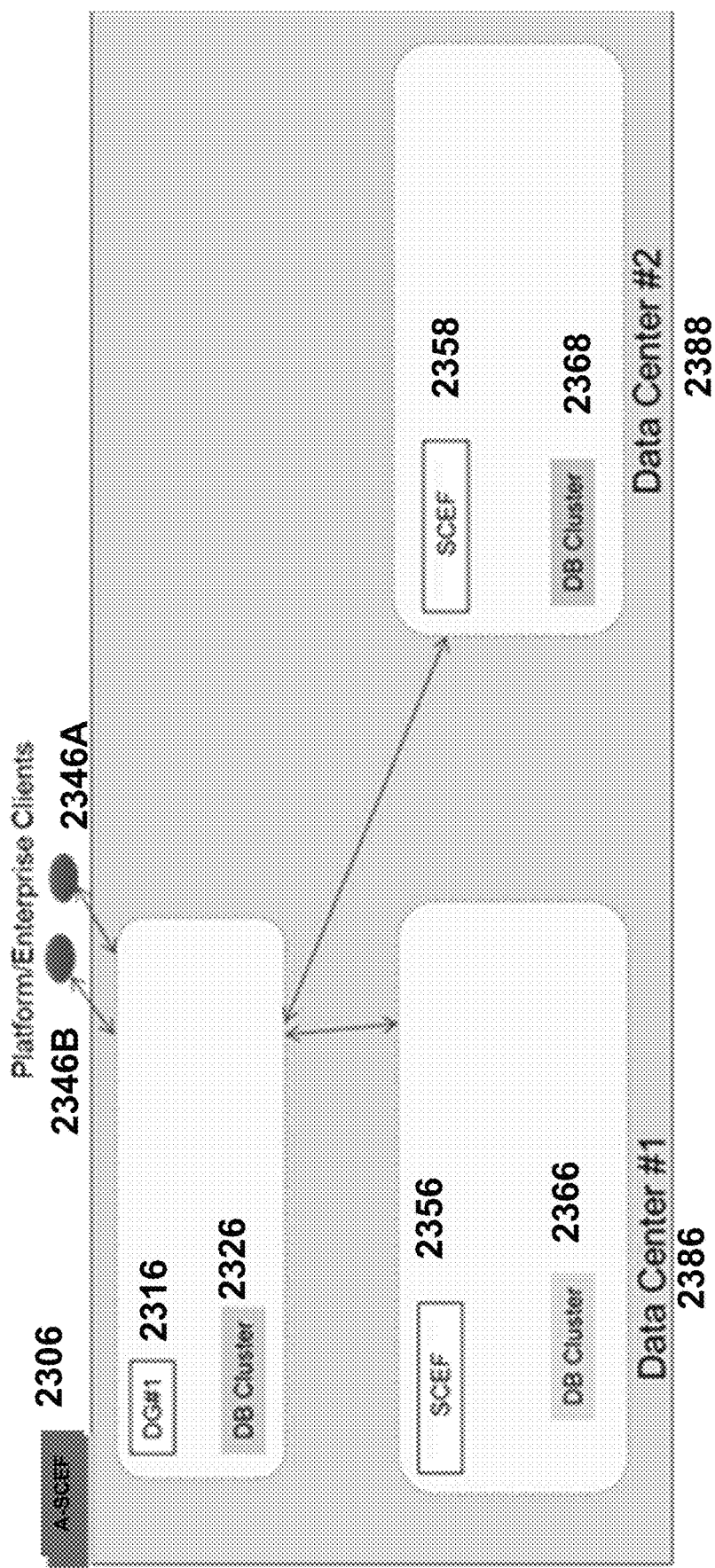

As shown in FIG. 23C, the A-SCEF may take a 1:N local configuration, according to some embodiments. As shown in FIG. 23C, A-SCEF 2306 with N=2 comprises DG 2316 with DB cluster 2326, SCEF 2356 with DB cluster 2366, and SCEF 2358 with DB cluster 2368. This may be installed across many data centers, such as data centers 2386 and 2388. This deployment pattern is useful when the MMEs and HSS are located in different data centers (e.g., one data center per country). For this deployment, each VNF is managed by itself—even though shown as one A-SCEF, the FCAPS are per VNF. The single DG VNF 2316 presents the North Bound interface to the Enterprise/Platform 2346A, 2346B while the two SCEFs 2356, 2358 have different set of MMEs each. Thus, for example, if NIDD via T6a is required in order to communicate with a particular device downstream (not shown), the appropriate SCEF must be selected (by the DG 2316). The DB-clusters 2326, 2386, 2388 are all local clusters with HA. The two bidirectional arrows between the DG 2316 and the two SCEF VNFs 2356, 2358 represents that these communication paths are assumed to be available in the operator's network.

Figure 23D:
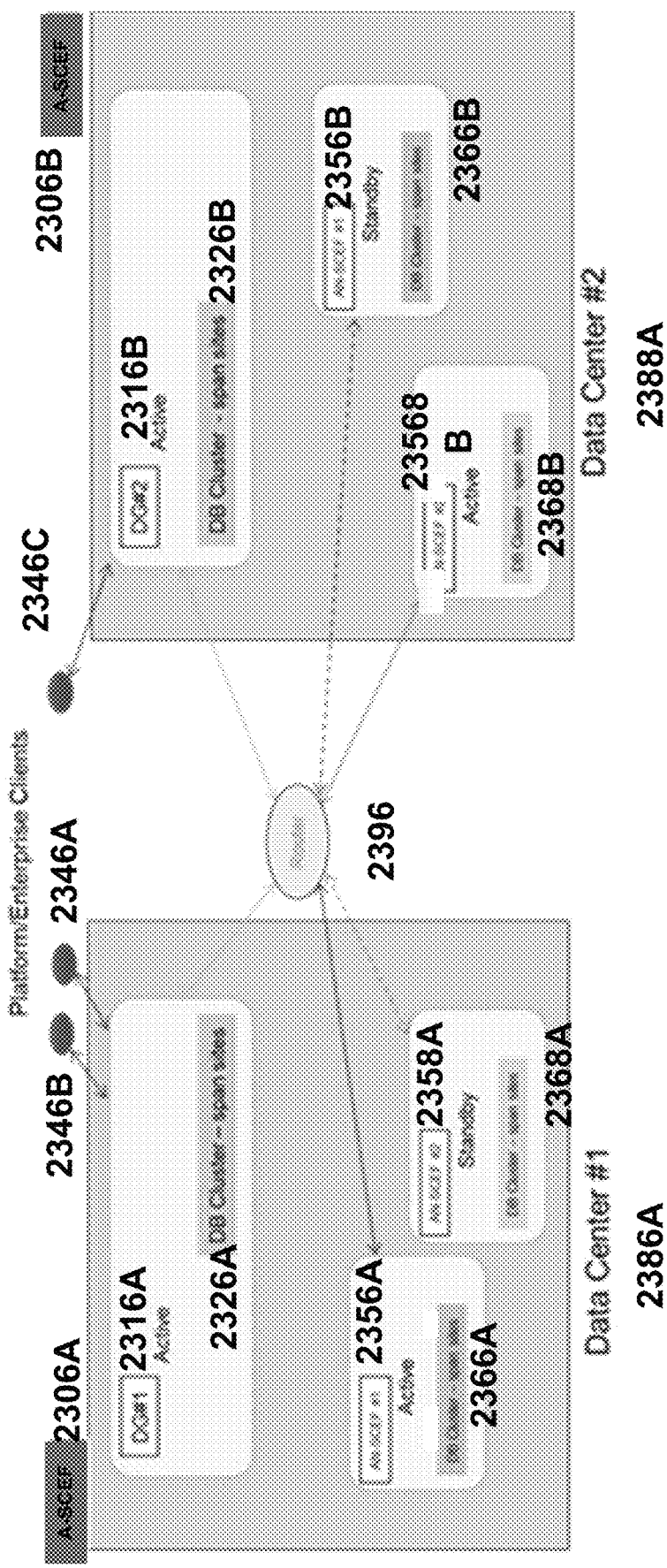

As shown in FIG. 23D, the 1:N local configuration may be included as a georedundant 1:N configuration. As shown in FIG. 23D, each A-SCEF 2306A, 2306B may take a 1:N local configuration, according to some embodiments. A-SCEF 2306A with N=2 comprises DG 2316A with DB cluster 2326A, SCEF 2356A with DB cluster 2366A, and SCEF 2358A with DB cluster 2368A. A-SCEF 2306B with N=2 comprises DG 2316B with DB cluster 2326B, SCEF 2356B with DB cluster 2366B, and SCEF 2358B with DB cluster 2368B. Each A-SCEF 2306A, 2306B has an active SCEF 2356A, 2356B and an inactive SCEF 2358A, 2358B similar to FIG. 23C. The two DG VNFs 2316A, 2316B present the North Bound interface to the Enterprise/Platform 2346A-2346B (in an Active/Active mode) while the two Active SCEFs 2356A, 2356B have different set of MMEs each. Thus, for example, if NIDD via T6a is required in order to communicate with a particular device, the appropriate SCEF must be selected (by the DG). The DB-clusters 2326A, 2356B, 2366A, 2366B, 2368A, 2368B are geo-distributed clusters. The bidirectional arrows represent the communication paths that are assumed to be available in the operator's network; the dashed arrows represent the standby-traffic that would become the main path upon a geo red switchover. Note that other generic deployments like M:N-Local (e.g., with M DGs and N local SCEFs as discussed herein) and M:N-Geo (e.g., with M DGs and N SCEFs implementing geographic redundancy as discussed herein) are possible.

According to an embodiment, the DG may assist with two classes of functionalities: data delivery and control functions. In southbound data delivery, the DG receives either data from an upstream device, such as an IOT Platform, SCS, or AS, and determines an appropriate action. The data may be associated with an external identification tag (also called external identifier and external ID) associated with a UE (such as an IOT device) to which the data is to be delivered. The DG allows the AS to use this external identification tag regardless of which connection pathway will ultimately be used to connect to the UE. This greatly simplifies the process on the north side.

According to an embodiment, the DG may coordinate more complicated tasks. For example, the DG may be aware of the various communication capabilities of each UE or group of UEs (e.g., whether the UE is enabled for some or all of the connectivity pathways discussed above, such as SMS via T4, etc.). Upon receiving a northbound request to communicate with a UE (or UEs), the DG may determine which connectivity pathways are enabled for that UE(s). If more than one connectivity pathway is enabled, the DG may implement a decision scheme for determining which connectivity pathway to use, set, for example, based on policies from the operator associated with the UEs, AS, or other entities. For example, the DG may look for active pathways, as opposed to inactive pathways. As another example, the operator may have provisioned a hierarchy of connectivity pathways for a UE, UE group, and/or for all UEs. For example, IP-via-SGi for UDP connectivity enabled IOT devices may be preferred to non-IP-via-SGi. This may be based on operator preferences or set to be automatically adjusted based on preset conditions, such as time of day or location of device. This may take the form of a selection hierarchy with preset rules for selecting connectivity pathways. According to an embodiment, the connectivity pathway is selected based on traffic data for some or all of the connectivity pathways. Traffic data may include load information on particular pathways, priority information, latency, or other traffic. The traffic data may be current (e.g., based on recent reports or an amalgamation of recent reports for a period of time) or historical (e.g., based on historical trends for particular pathways at particular times). For example, SMS may be preferred for IOT devices from 2 am-4 am based on historical data indicating that SMS connectivity pathways are less loaded during those hours of the night. Accordingly, a system operator may provision rules for directing traffic without effecting the methods of communications between the DG and the upstream application. The DG determines which connectivity pathways are enabled and open, and then selects the connectivity pathway without input from upstream. The DG then instructs the SCEF to communicate with the UE based on the desired connectivity pathway. This includes identifying a network identifier used on that connectivity pathway to communicate with the UE. For example, if the selected pathway is IP-via-SGi, or other pathways discussed above.

According to some embodiments, the A-SCEF may receive southbound data from UEs. The DG may be provisioned to handle such southbound data based on particular policies set forth by an operator, such as store-and-forward functions. An operator may allow three classes of store and forward functions: disabled, push, and active pull. In a push store and forward function, the A-SCEF may receive communications comprising data from the UEs and may identify an upstream application (such as an AS) to which that data should be sent based on provisioning (e.g., to which upstream AS data should be reported) or information in the communication(s) and the data is included in the notification to the AS. In an active-pull function, the AS is notified of the arrival of data only—the AS retrieves the data at a later time of its choosing.

Embodiments set forth herein address multiple challenges to IOT implementation. Features of such embodiments include:

Partitioning of Functionality Between 3GPP-SCEF-E and Device Gateway

By separately defining the functionality that each of the 3GPP-SCEF-E and the DG provide, a partitioning of their combined functionalities can be achieved that increases resource efficiency. For example, in some implementations, the 3GPP-SCEF-E is not configured to accommodate IP-based traffic transport, and instead this functionality is included in the DG. As another example, in some implementations the 3GPP-SCEF-E does not define all the application program interfaces ("APIs"), and instead the APIs (e.g., Representational State Transfer ("REST")-based APIs) can be defined for interaction of external functions with the combination of functionality of the 3GPP-SCEF-E and the DG. As another example, the scaling specifications of the 3GPP-SCEF-E and/or DG, as well as other deployment considerations (e.g., defining trust domains: where the 3GPP-SCEF-E may reside in a Service Provider's trusted network, the DG may not) are defined.

Exemplary architectures described herein divide the functionality between two system components—the DG for non-3GPP API-based access, and the 3GPP-SCEF-E for 3GPP functions—and define a secure, proprietary, or standardized protocol for communication between the two. In some embodiments, the DG provides store-and-forward capabilities and supports policy-based selection of transport mechanism (e.g., internet protocol ("IP") via PDN gateway ("PGW"), IP via (S)Gi, Non-IP via PGW, Non-IP via SCEF, short message service ("SMS")), while the 3GPP-SCEF-E provides the 3GPP defined functionalities. Further, the DG may support functionality based on the 3GPP-SCEF-E functions. As an example, the DG may set up monitoring notifications and use the notifications from the 3GPP-SCEF-E to determine store-and-forward actions based on one or more policies. An M:N relationship for the number of DGs and 3GPP-SCEF-Es can be supported. The DG(s) and 3GPP-SCEF-E(s) can be independently sized (e.g., scaled in/out as virtual machines/containers) to support whatever system parameters an operator may have in a flexible way as the number of devices supported goes up. The use of a secure protocol fortifies the implementation and prevents security attacks on the 3GPP functions.

Management of Traffic Passing Via the "A-SCEF"

Without proper management of the traffic, the "A-SCEF" can overload the 3GPP nodes and/or allow one subscriber (which may be referred to as user equipment "UE" or device) or one Application Server ("AS") to swamp out the others. As an example, if an AS submits data for a particular UE by invoking the APIs at a very fast rate, it might not be possible for other AS's to submit traffic for other UEs at the same time. This requires policy-defined rate controls to be supported (as an example: accept up to 5 packets per second from any AS; accept up to 1 packet per second for any UE, etc.).

Visibility into the traffic (e.g., including support for charging/billing by counting bytes, messages, etc.; Lawful Intercept support by filtering information for a particular UE via configuration; performance and capacity metrics that capture how the traffic is impacting the functions of the A-SCEF) is desirable, since otherwise the Service Provider cannot extract full value from the service provided by A-SCEF.

According to embodiments set forth herein, a set of policy-based functional components is defined within a DG and a 3GPP-SCEF-E that work together to provide substantial flexibility to the Service Provider. Policies can govern the scheduling, policing, and/or shaping of traffic on a per-subscriber (e.g., UE or device) basis, and on a per-3GPP network element basis, to avoid overload and congestion scenarios, for example as discussed in the "Tx Traffic Management" and "Rx Traffic Management" sections below. These policy-based functional components can give an operator increased visibility and control over the traffic management, billing, and lawful intercept, and provide a comprehensive, deployable solution.

External ID Generation

The SCEF functionality set forth in 23.682 defines the format of an External-ID but does not define how it is created/allocated. Embodiments set forth herein provide a scalable solution, via a specific form of the External ID that allows AS's to direct traffic to the appropriate DG for a particular IOT device in question. This allows the DG implementations to scale horizontally, and also provides better redundancy.

The relevant text from the 23.682 3GPP standard is reproduced here for reference: External Identifier shall be globally unique. It shall have the following components:

Domain Identifier: identifies a domain that is under the control of a Mobile Network Operator (MNO). The Domain Identifier is used to identify where services provided by the operator network can be accessed (e.g., Machine Type Communication Inter Working Function ("MTC-IWF") provided services). An operator may use different domain identifiers to provide access to different services.

Local Identifier: Identifier used to derive or obtain the IMSI. The Local Identifier shall be unique within the applicable domain. It is managed by the Mobile Network Operator.

In some embodiments, to generate an External ID in the format "username@realm," the following configurations and terms are defined. The objective is for the "realm" portion of the External ID to be resolvable via the Domain Name System ("DNS"). This ID is referred to herein as "Generic ID." The following is one exemplary way of implementing the External ID generation, however the fields and their meanings can be customized to meet any Service Provider requirements.

Realm=<mapped-enterprise-name>_<operator-configured-#>.mno.com
   <operator-configured-#>: (8-byte string) One per DG; globally unique across DGs
Username=<# from pool per realm>_<device type ID>
Example:
  (Config): Enterprise Name: Acme
  (Config): Mapped Enterprise Name: customerA
  (Config): Operator configured # at DG: 10001
  (Config): Username Pool: [device000000001, device999999999]
  (Config): Operator mapped enterprise name: Acme-corporate
  (Config): Operator defined device type ID: Thermostatv1
Result:
  Realm: customerA_10001.mno.com
  Username: device000000757_Thermostatv1
  External ID:
    device000000757_Thermostatv1@customerA_10001.mno.com During the "Device Provisioning" process, the requester (e.g., a particular AS, or, some other appropriate server) invokes the appropriate North Bound ("NB") API to provision the device with the DG. In this process, the requester provides the international mobile subscriber identity ("IMSI") and mobile subscriber integrated services digital network number ("MSISDN") as inputs, and receives the External ID generated by the DG (in the format: username@realm) as output. The DG can create the mapping in the home subscriber server ("HSS"). The "realm" is determined based on service-provider configuration on a per-requester basis. The "username" portion is allocated from a pool configured by the service provider. The "username" is unique only per realm and can be reused across realms. Note that, as an alternative, an NB API can be provided that only allocates the External ID. In that case, creating the mapping in the HSS is left to a different entity.

The generated External ID (and its mapping to the IMSI and MSISDN) is stored at the HSS in a persistent manner. Optionally, the same information is cached at the 3GPP-SCEF-E to optimize future lookups (reducing HSS queries).

Once provisioned, subsequent registrations will return the previously allocated External ID. However, the NB API will support an override option to allow a new External ID to be allocated (and release the current allocation). This can be useful, for example, when the "realm" for the device changes for some reason.

A separate NB API will support the Release procedure for an External ID. If the DG has access to changing the corresponding HSS entry, it will be updated to remove the External ID.

By embedding the DG ID in the realm, the appropriate DG can be looked up via DNS. The operator thus has the flexibility to launch multiple DG instances in parallel (in some implementations, one DG per enterprise customer) and scale the solution horizontally.

Augmented SCEF Implementation

Embodiments described herein focus on the SCEF functionality required to support communication for NB-IOT devices. Non-IP communication via SCEF or PGW has also been standardized in 3GPP specifications.

High Level Architecture

Figure 1:
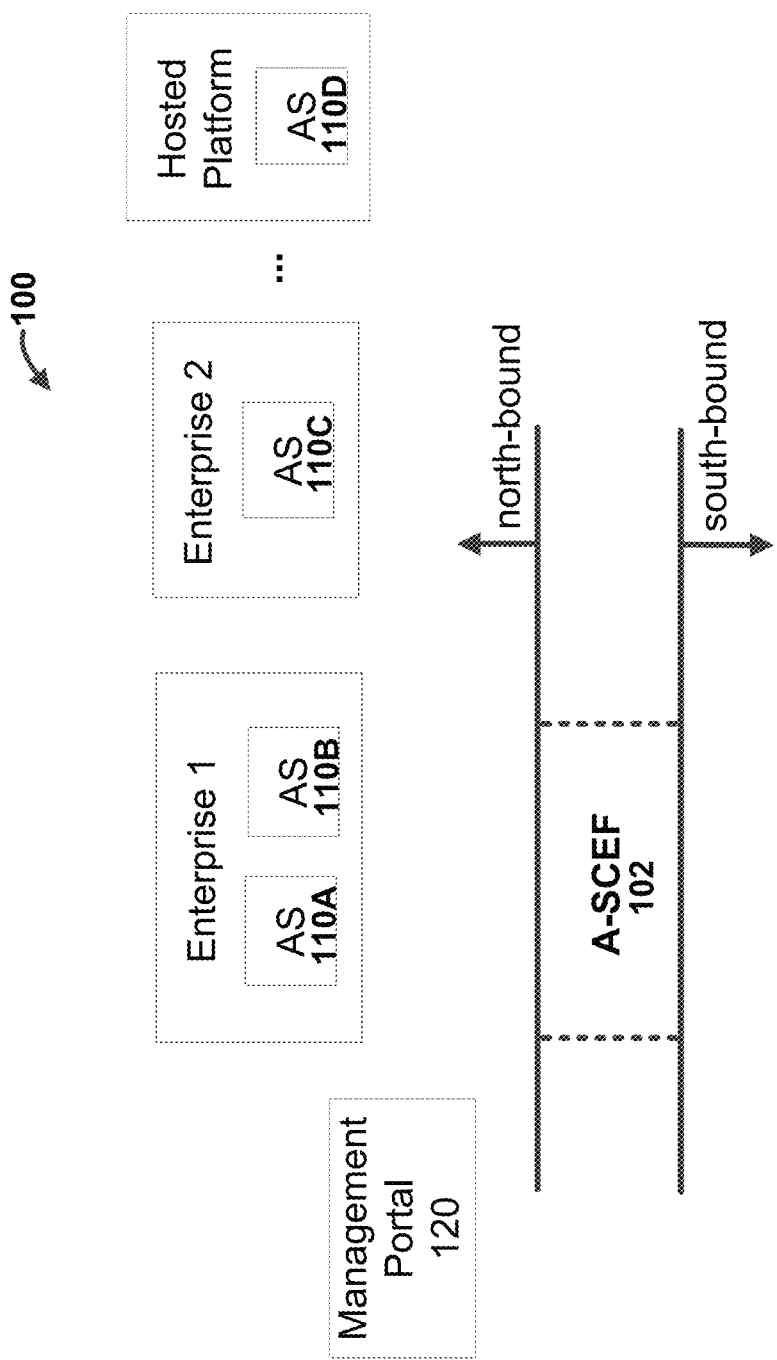
FIG. 1 is a block diagram showing north-bound and south-bound interfaces relative to a SCEF, in accordance with some embodiments of the disclosed subject matter.

FIG. 1 pictorially shows the meaning of north-bound and south-bound interfaces relative to an Augmented SCEF ("A-SCEF") (102) within an IOT communications system 100. As shown in FIG. 1, the IOT communications system 100 includes a Management Portal 120, AS's 110A and 110B (associated with Enterprise 1), AS 110C (associated with Enterprise 2), and AS 110D (associated with a Hosted Platform), all disposed north of the A-SCEF 102. As used herein, an Enterprise is an entity that owns and interacts with one or more NBIOT devices. Each Enterprise can have one or more AS's to communicate with one or more IOT devices. The SCEF (as per 3GPP Specification 23.682) provides a "means to securely expose the services and capabilities provided by 3GPP network interfaces." As used herein, the term "north-bound" refers to the A-SCEF's interfaces with the Application Servers (AS), and the term "south-bound" refers to the A-SCEF's interfaces with 3GPP network elements. The A-SCEF functionality interfaces on the north-bound side with one or more AS's, and, with one or more 3GPP network elements on the south-bound side. The north-bound interfaces are outside the 3GPP scope, while the south-bound interfaces are within the 3GPP scope (as are UEs).

Figure 2:
FIG. 2 illustrates a "Direct Model" implementation of a SCEF-based IOT communications system, in accordance with some embodiments of the disclosed subject matter.

FIG. 2 shows one possible deployment model (referred to herein as the "Direct Model") in which the operating assumption for the A-SCEF 202 is that some portion of the A-SCEF 202 will interact with AS nodes that reside in an untrusted domain (e.g., the north-bound APIs are invoked over the internet), and in which the Enterprise AS interacts directly with the A-SCEF using north-bound API over the internet. Also shown is an operator (e.g., AT&T) hosted platform 210D wherein any operator-trusted AS communicates with the NBIOT devices. As mentioned earlier, the IOTSP is an example of one such platform. As shown in FIG. 2, AS's 210A and 210B (associated with Enterprise 1) and AS 210C (associated with Enterprise 2) are within the "untrusted domain," and the Management Portal 220 and the AS 210D (associated with the Hosted Platform) are within the "trusted domain." The A-SCEF 202 resides partially within the trusted domain and partially within the untrusted domain and interacts with elements of both domains.

Figure 3:
FIG. 3 illustrates an "Indirect Model" implementation of a SCEF-based IOT communications system, in accordance with some embodiments of the disclosed subject matter.

FIG. 3 shows another possible deployment model (referred to herein as the "Indirect Model") in which the A-SCEF 302 resides totally in the trusted domain (behind a security gateway 330) and only interacts with elements completely inside the trust domain. In the Indirect deployment model, the security requirements for the A-SCEF 302 can be relaxed, as compared to the Direct model. As shown in FIG. 3, AS's 310A and 310B (associated with Enterprise 1) and AS 310C (associated with Enterprise 2) are within the "untrusted domain," and the Management Portal 320 and the AS 310D (associated with the Hosted Platform) are within the "trusted domain."

In some implementations, the AS and the UE/device (e.g., the NB-IoT device) enforce end-to-end security protocols and achieve privacy, encryption, and authorized access. As a result, the "message" from the AS to/from the device is not necessarily readable by the SCEF—it can simply be an opaque sequence of bytes. The SCEF implementation does not implement any retries of messages; the application layer (AS to NBIOT device) can implement robust transport protocols.

In the discussion that follows, the A-SCEF is discussed as a standalone function in the Direct deployment model, since that is a more generic use case, however the present disclosure is not limited to such an implementation.

Figure 4:
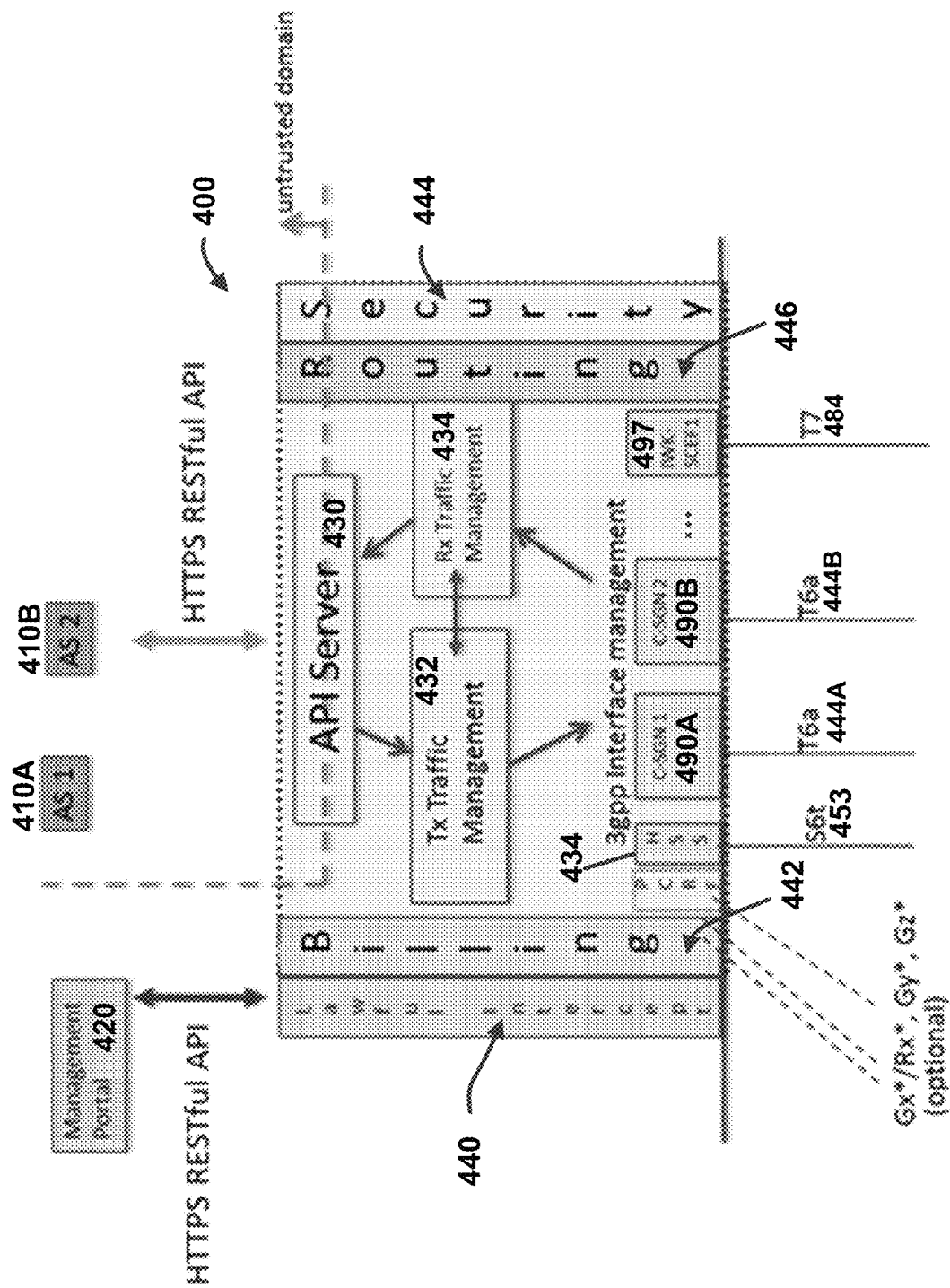
FIG. 4 is a block diagram showing components of a SCEF-based IOT Communications System, in accordance with some embodiments of the disclosed subject matter.

FIG. 4 is a block diagram showing components of an A-SCEF-based IOT Communications System (400), in accordance with some embodiments of the disclosed subject matter. IOT Communications System 400 comprises a plurality of components, including a "Lawful Intercept" module 440, a Billing module 442, an API server 430, a Transmit ("Tx") Traffic Management module 432 operably coupled to a Receive ("Rx") Traffic Management module 434, a Policy and Charging Rules Function ("PCRF") module, an HSS interaction module (434), a C-SGN 1 interaction module (490A), C-SGN 2 interaction module (490B), IWK-SCEF1 interaction module (497), a Routing module 446, and a Security module 444, each of which is further described below. Note that this is not an exhaustive list of interaction modules—there may be interactions with PGW for example. In some embodiments, all interactions on the north-bound interfaces (e.g., with AS1 (410A) and AS2 (410B)) are via secure (https) RESTful API (to one or more AS, and/or to a Management Portal 420). IOT Communications System 400 can also interface with a Management Portal 420 via a secure (https) RESTful API. Note that although FIG. 4 shows the Management Portal 420 to be located inside the trust domain, it could be located outside the trust domain in some implementations; it has its own set of north-bound APIs. Some interactions on the south-bound interfaces in FIG. 4 (S6t (453), T6a (444A), T6a (444B), and T7 (484)) are per definition in the 3GPP specifications. Gy* and Gz* are shown as optional interfaces that are modified versions of Gy and Gz that allow message-based billing on a per Enterprise (and/or per device) basis. Gx* is also shown as an optional interface for interaction with PCRF if required for some use cases—this could be the Rx* interface as well. The south-bound interfaces can also include support for IP and Non-IP traffic over an SGi interface. The dashed line represents the trusted-untrusted domain boundary.

The main building blocks of the IOT Communications System 400. shown in FIG. 4 are:

Security 444:

The A-SCEF (e.g., the DG and the 3GPP-SCEF-E) enforces secure access on the north-bound side. Depending upon the deployment scenario (e.g., all-trusted or not), this enforcement can be done by the DG. Certificate handling and key generation are part of this function. HTTPS access using Transport Layer Security ("TLS") is used on the north-bound interfaces. Mutual TLS-based authentication of the Enterprise AS and the SCEF API Server can be used.

Routing 446:

The A-SCEF allows multiple isolated network contexts to be configured and managed on the north-bound and the south-bound sides.

Billing:

The A-SCEF provides access to message-based billing records (patterned after Gy & Gz) that are accessible either via Gy & Gz, or, via north-bound API (in a file, for example).

Lawful Intercept 440:

The A-SCEF provides the operator with tools and configuration required for the Lawful Intercept feature.

API Server 430:

The A-SCEF provides support for the https RESTful API (using JSON) on the north-bound side.

Tx Traffic Management 432:

The A-SCEF provides support for buffered, prioritized, rate-controlled transmission of messages received over the north-bound API to the Cellular Internet of Things Serving Gateway Node ("CIoT Serving Gateway Node," or "C-SGN") of interest on the south-bound side.

Rx Traffic Management 434:

The A-SCEF provides support for buffered and prioritized notification to AS of messages received over the south-bound interfaces.

Management Portal 420:

The A-SCEF supports a graphical user interface ("GUI") based Management Portal that can be used by the operator to interact with the SCEF (e.g., via HTTPS RESTful API) in order to configure services and collect metrics, billing information, etc.

Further details are provided in the sections that follow.

South-Bound Scope:

South-bound interfaces supported by the systems and methods described herein include: the T6a/T6ai south-bound interface to C-SGN (MME) (see, e.g., T6a interface (444A) with C-SGN 1 (490A) and T6a interface (444B) with C-SGN 2 (490B) of FIG. 4), the S6t south-bound interface to the HSS (see, e.g., S6t interface (453) with HSS 434 in FIG. 4), the T7 south-bound interface to IWK-SCEF (see, e.g., T7 interface (484) with IWK-SCEF1 in FIG. 4), and the SGi interface to PGW.

Illustrative Call Flows:

FIGS. 5-9 show some of the high level call flows for some key activities.

Once an operator signs up an Enterprise as a customer, the operator can provision the A-SCEF via the Management Portal with the appropriate certificate, security keys, and profiles for Traffic Management, Billing and CDR generation. At any point in time after that, the AS can use the north-bound APIs to register one of the devices and continue adding additional devices as needed.

Device Registration by AS

Figure 5:
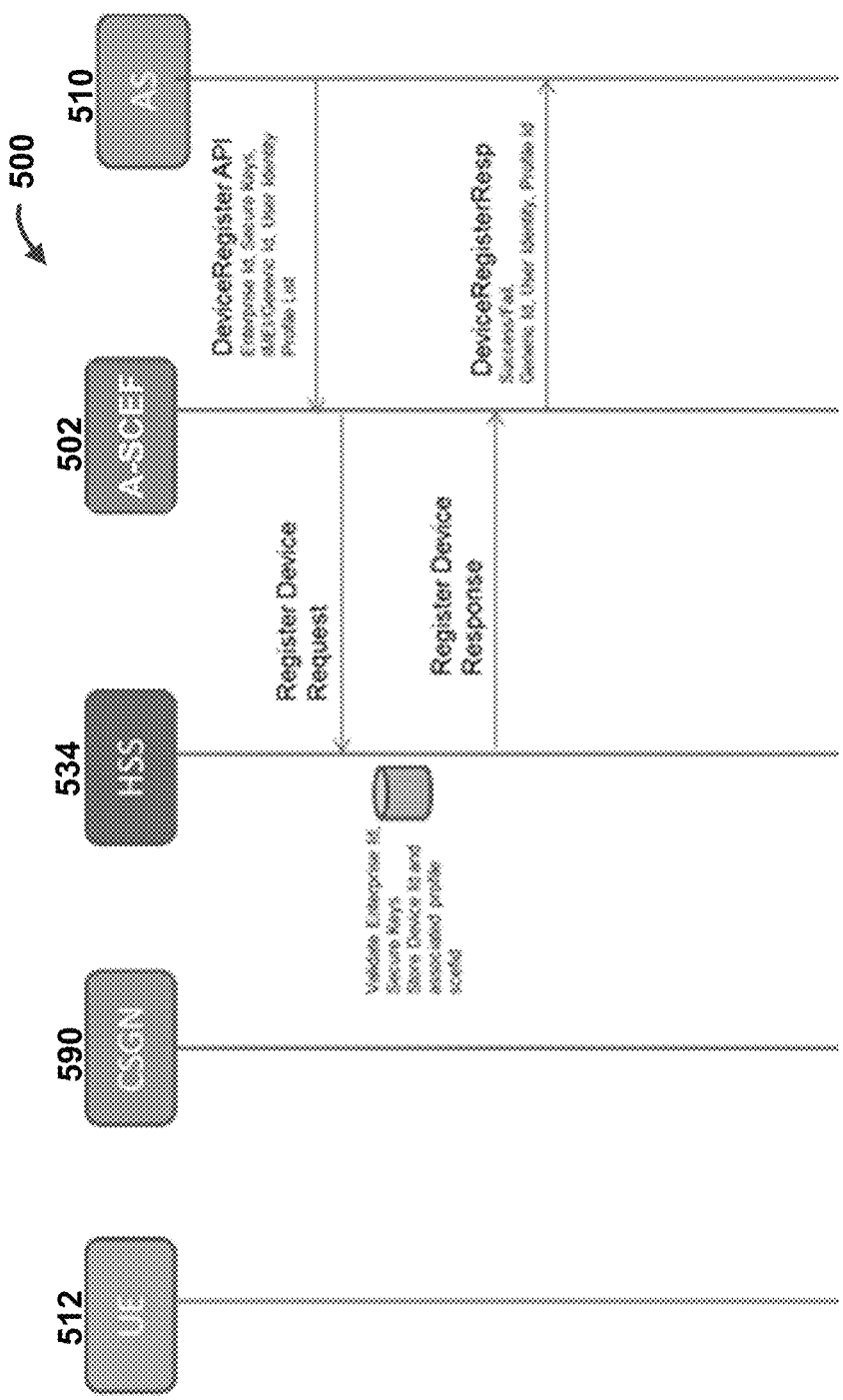
FIG. 5 illustrates an exemplary call flow between an Application Server ("AS") and a home subscriber server ("HSS"), in accordance with some embodiments of the disclosed subject matter.

FIG. 5 illustrates an exemplary call flow between an Application Server ("AS") 510 and a home subscriber server ("HSS") 534, in accordance with some embodiments of the disclosed subject matter. The example call flow (500) of FIG. 5 shows that the AS 510 calls the Device Register API (e.g., including an Enterprise ID, Secure Keys, IMEI/Generic ID, and/or User Identity Profile List) and provides the mutually-agreed upon device ID (International Mobile Station Equipment Identities ("IMEI"), International Mobile Subscriber Identity ("IMSI"), Mobile Station International Integrated Services Digital Network Number ("MSISDN"), or other) along with the desired traffic management profile. After authentication, the SCEF 502 sends "Register Device Request" to HSS 534, and the mapping of the Generic ID (<enterprise id, device id>) to the appropriate IMEI/IMSI is maintained at the HSS 534. The HSS 534 can validate the Enterprise ID and/or Secure Keys, and store the Device ID, associated profile and/or SCEFID. The HSS 534 then sends a "Register Device Response" back to the SCEF 502. If successful, the Generic ID is returned to the AS (via a "Device Register Response" indicating Success/Fail, Generic ID, User Identity and/or Profile ID), and all future traffic sent by the AS to that NBIOT device can, in turn, use the Generic ID to correctly identify the device. Note that, in FIG. 5, the SCEF ID is assumed to be stored in the user profile on HSS.

Figure 6:
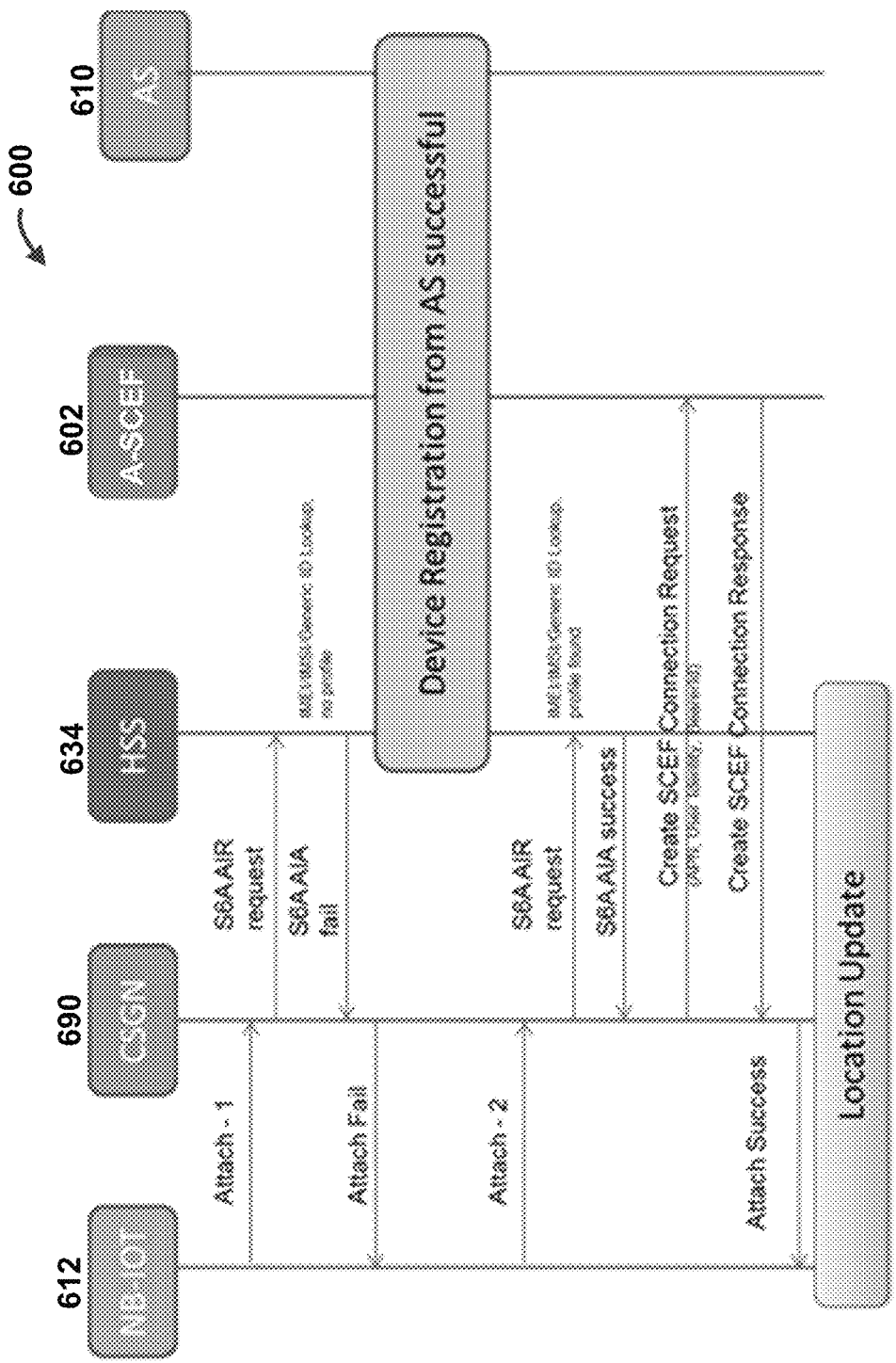
FIG. 6 illustrates a device attachment flow, in accordance with some embodiments of the disclosed subject matter.

NBIOT Device Attach:

FIG. 6 illustrates a device attachment flow, in accordance with some embodiments of the disclosed subject matter. As shown in FIG. 6, NB-IOT 612 initiates "Attach" procedure to CSGN 690, which in turn forwards an "S6A Attach Initiate Request (AIR)" request to HSS 634. The HSS 634 performs an IMEI/IMSI Generic ID Lookup, and no profile is found, so the HSS 634 sends an "S6A Attach Initiate Answer (AIA) fail" message back to the CSGN 690. CSGN 690 then sends an "Attach Fail" message back to the NB-IOT 612 device. Next, NB-IOT 612 sends a second "Attach" request to CSGN 690, which again in turn forwards an "S6A AIR" request to HSS 634. The HSS 634 performs an IMEI/IMSI Generic ID Lookup, and a profile is found, so the HSS 634 sends an "S6A AIA success" message back to the CSGN 690. Once the device (NB-IOT 612) has been registered, if it initiates an Attach then after successful lookup at the HSS, the T6a Connection is established for the device to the A-SCEF identified by the HSS lookup. CSGN 690 sends a "Create SCEF Connection Request" (e.g., including one or more of APN, User Identity, and BearerID) to SCEF 602, and SCEF 602 sends a "Create SCEF Connection Response" back to CSGN 690, and an "Attach Success" message is returned to NB-IOT 612. The CSGN identification is stored in the HSS entry so that the A-SCEF can identify the right CSGN to contact.

Figure 7:
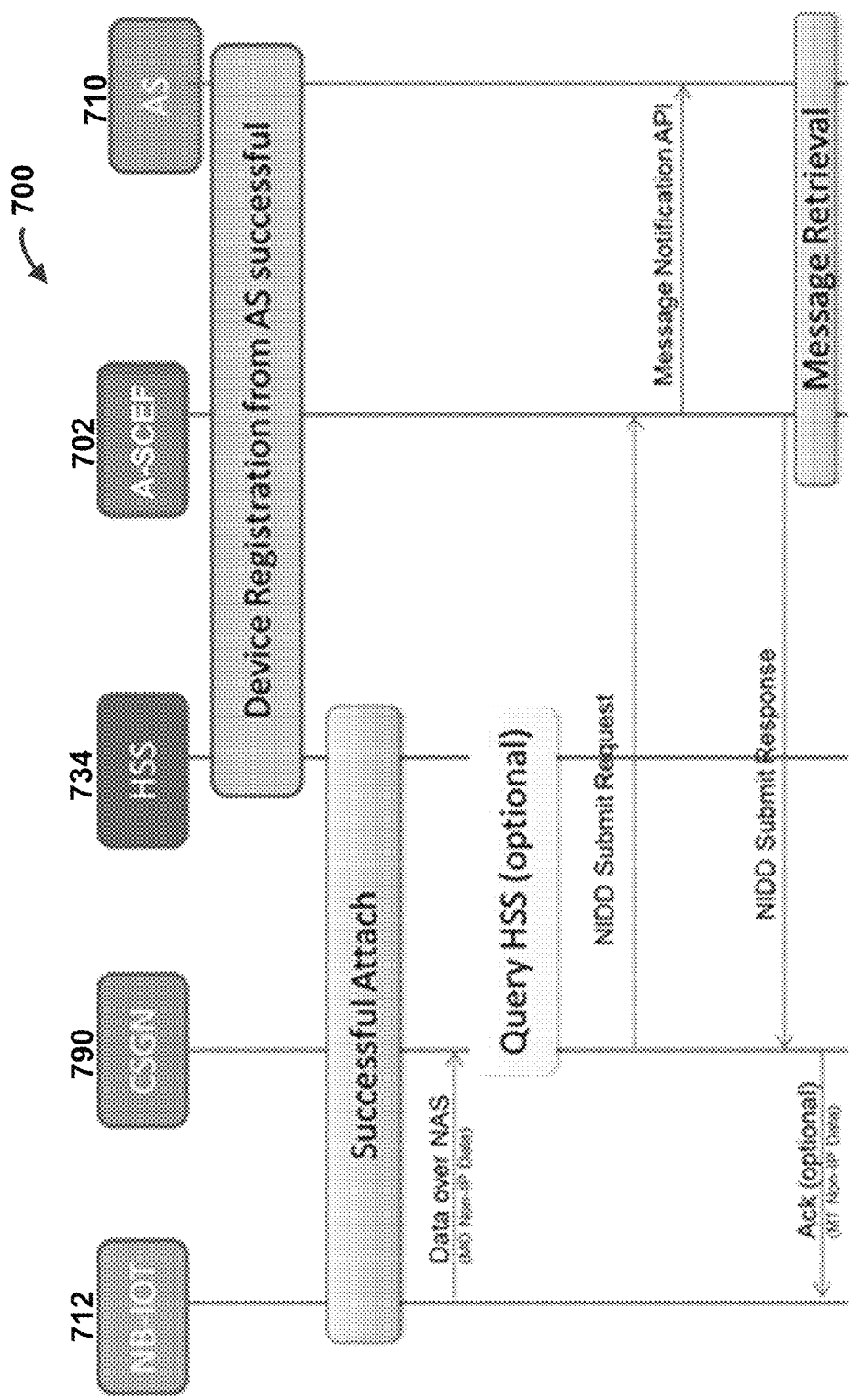
FIG. 7 illustrates a device-originated data call flow, in accordance with some embodiments of the disclosed subject matter.

Mobile Originated Data (Device to AS):

FIG. 7 illustrates a device-originated data call flow, in accordance with some embodiments of the disclosed subject matter. Successful registration of the AS 710 with the HSS 734 is assumed, and the NB-IOT device 712 is assumed to have been successfully configured at the HSS 734 and attached to A-SCEF 702. As shown in FIG. 7, NB-IOT 712 sends data over NAS (e.g., MO Non-IP data) to CSGN 790. Optionally, the CSGN 790 can perform a query on HSS 734. CSGN 790 then sends an "NIDD Submit Request" to A-SCEF 702, and A-SCEF 702 sends a Message Notification API to AS 710 to inform the AS 710 that the message has been received. An alternative is to support the Polling mode wherein the AS checks in periodically to retrieve any outstanding deliveries. A-SCEF 702 then sends an "NIDD Submit Response" to CSGN 790, and an optional acknowledge message (e.g., including MT Non-IP Data) to NB-IOT 712.

Figure 8:
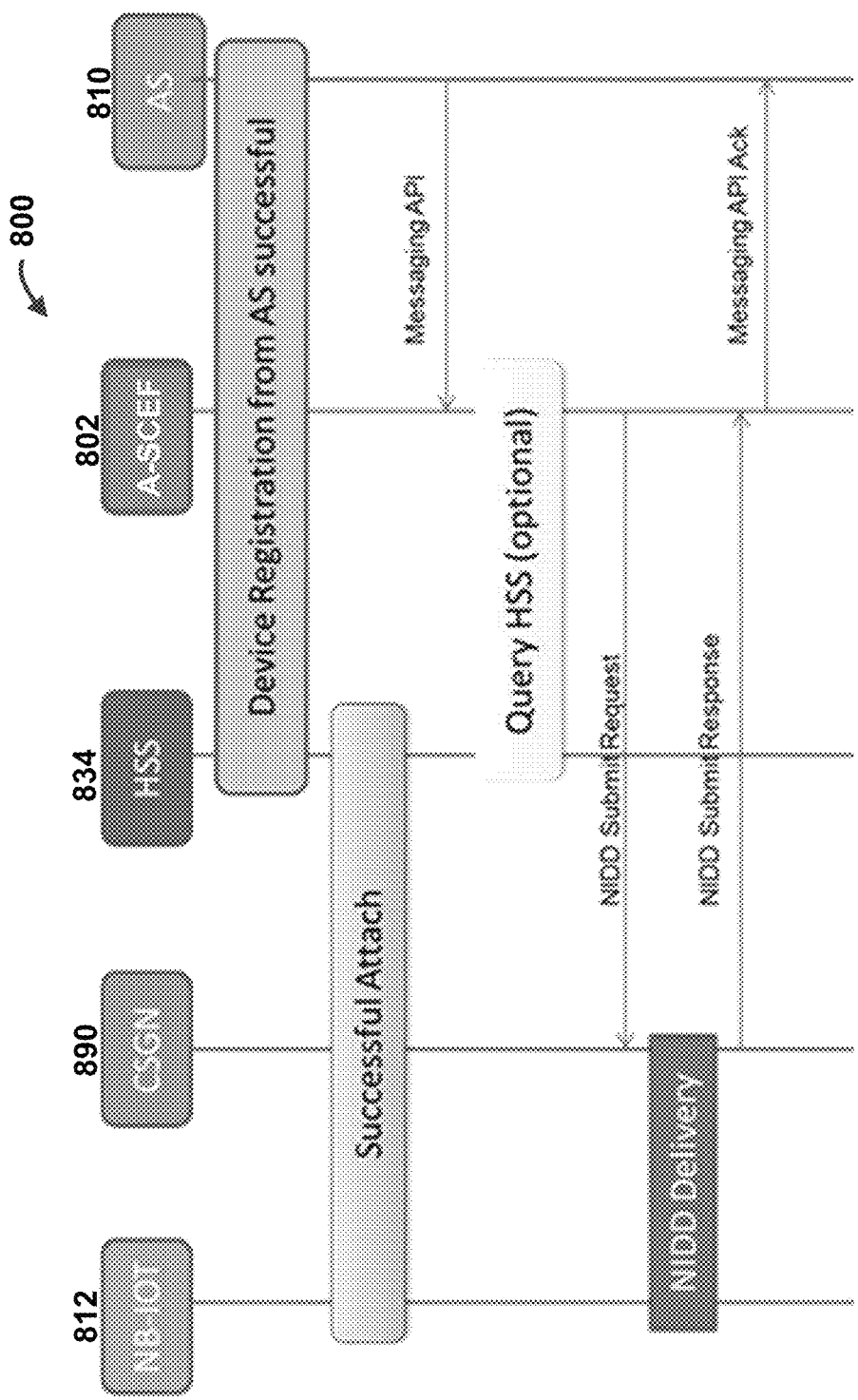
FIG. 8 illustrates the delivery of mobile-terminated message data, in accordance with some embodiments of the disclosed subject matter.

Mobile Terminated Data (AS to Device):

FIG. 8 illustrates the delivery of mobile-terminated message data, in accordance with some embodiments of the disclosed subject matter. As shown in FIG. 8, delivery of a message to the UE/Device (e.g., NB-IoT device) can be achieved by invoking one of the Messaging APIs on the north-bound side and including the message in the payload. Delivery can optionally be acknowledged via the notification API. In FIG. 8, successful registration of the AS 810 with the HSS 834 is assumed, and the NB-IOT device 812 is assumed to have been successfully configured at the HSS 834 and attached to A-SCEF 802. AS 810 sends a Messaging API to A-SCEF 802, which can optionally query HSS 834. A-SCEF 802 then sends an "NIDD Submit Request" to CSGN 890, which delivers the data to NB-IOT 812. CSGN 890 then sends an "NIDD Submit Response" to A-SCEF 802, which can optionally, in turn, send a Messaging API Acknowledgment message to AS 810.

Figure 9:
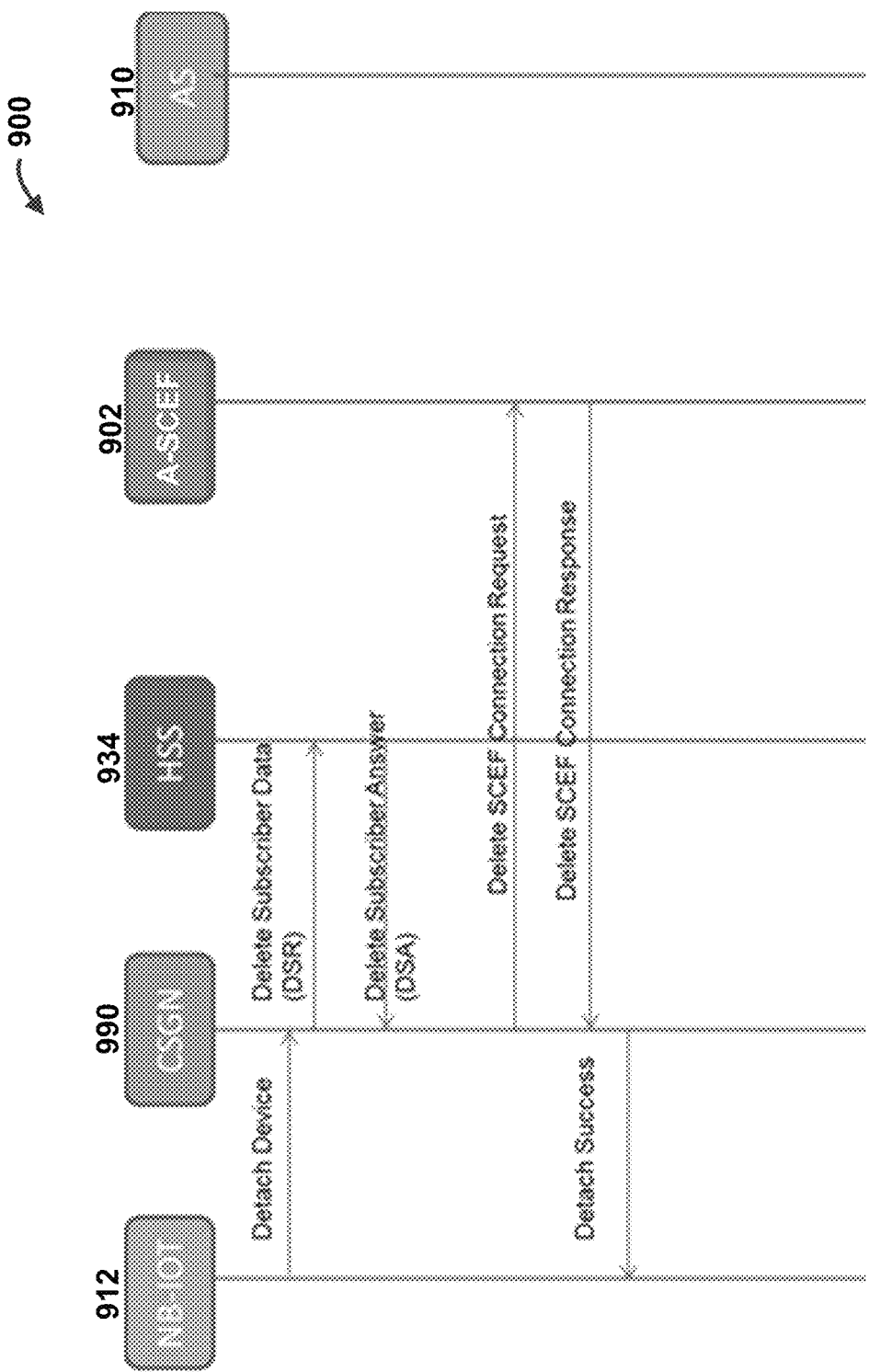
FIG. 9 illustrates a device detachment flow, in accordance with some embodiments of the disclosed subject matter.

NB-IOT Device Detach:

FIG. 9 illustrates a device detachment flow, in accordance with some embodiments of the disclosed subject matter. As shown in FIG. 9, NB-IOT 912 initiates a "Detach Device" procedure to CSGN 990, which in turn sends a "Delete Subscriber Data (DSR)" message to HSS 934. HSS 934 returns a "Delete Subscriber Answer (DSA)" message to CSGN 990, and CSGN 990 sends a "Delete SCEF Connection Request" message to A-SCEF 902. A-SCEF 902 then sends a "Delete SCEF Connection Response" message to CSGN 990, which in turn sends a "Detach Success" message to NB-IOT 912. When an NB-IOT device successfully detaches from the network, the A-SCEF Connection is torn down, however the device registration with HSS continues to be in place.

Functionality of A-SCEF

Deployment Model

In some implementations, the A-SCEF is a virtualized network function deployable in Network Functions Virtualization ("NFV") environments (e.g., Openstack). In other implementations, A-SCEF supports deployment as containers.

The A-SCEF architecture can be highly scalable and support both scale-in and scale-out functions for achieving near-linear incremental scale.

The A-SCEF can support multiple deployment scenarios. As a baseline, a single instance of the A-SCEF can interface with multiple AS's on the north-bound side, and multiple C-SGNs on the South-bound side. If desired, multiple instances of the A-SCEF may be simultaneously deployed and, by doing so, provide options to achieve separate Service Level Agreements ("SLA") for each AS (or grouping of AS's). The multiple instances of A-SCEF can interface with common C-SGNs or dedicated C-SGNs.

In some embodiments, an operator is provided access to provision trusted Enterprises/AS, logging, billing, traffic management, lawful intercept, etc. This can be supported via a Management Portal, discussed in greater detail below. Some such resources are standardized (or, are likely to be standardized) on the 3GPP side, while the same is not true for the north-bound interfaces. Some systems described herein are be designed in such a way that the operator can use the appropriate 3GPP standardized formats and access them as files via north-bound APIs (and/or, via the appropriate 3GPP interface). This approach provides flexibility to the operator either to reuse (as an example) the existing Gy interface, or to use the same format but retrieve the information over a north-bound interface.

Robust Security

Figure 19:
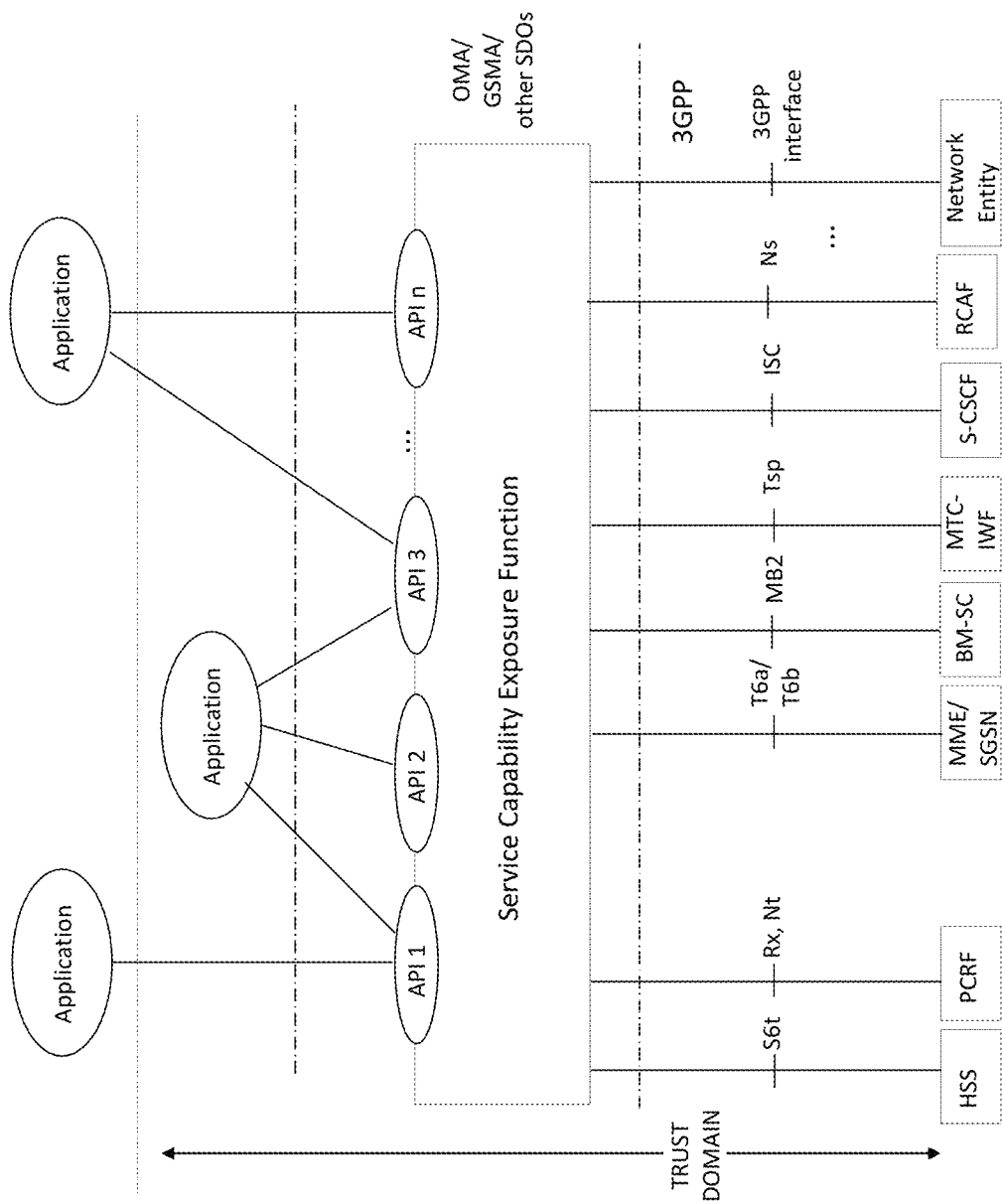
FIG. 19 is a block diagram of the $3^{rd}$ Generation Partnership Project ("3GPP")-defined SCEF function from standards document 23.682, "Architecture Enhancements to Facilitate Communications with Packet Data Networks ("PDNs") and Applications."

As shown in FIG. 19, on the north-bound interfaces, the AS can be located inside the Trust Domain or outside the Trust Domain. For the purposes of this discussion, the AS is presumed to be outside the Trust Domain, as this is the more general deployment scenario. As a result, the SCEF may need to be hardened for secure access. As an example, the A-SCEF can gracefully react to Denial of Service ("DoS") attacks with minimal service degradation. As another example, the A-SCEF can robustly handle "man-in-the-middle" type attacks.

In some embodiments, the north-bound APIs are secured via https using TLS. Certificates for each AS are installed via the Management Portal as part of the Enterprise onboarding process. The implementation of mutual TLS-based authentication of the Enterprise AS and the A-SCEF API Server is highly recommended.

The south-bound interfaces are assumed to be located within the trusted domain. However, if desired, additional IPSec tunnels can be used on the south-bound interfaces. Diameter protocols are secured using TLS.

For the Direct model, the transition from the untrusted to the trusted domain is a critical piece of the architecture. The A-SCEF can implement a secure tunnel with message passing interfaces internally between the API Server and the Tx and Rx Traffic Management modules. This way even if the API Server is breached, an additional layer of security will prevent 3GPP node access.

North-Bound Messaging API

According to an mbodiment, the webpage http://www.o-penmobilealliance.org/wp/ is an exemplary list of standardized APIs defined by the Open Mobile Alliance (in conjunction with GSM OneAPI). From this list, the RESTful Network API for Messaging 1.0 has been identified as an initial target for the SCEF API support. The motivation is that a subset of these APIs can enable the particular use case of interest (API based non-IP delivery for NBIOT devices)—in particular, the APIs: allow AS to send message to a device, allow AS to check delivery status of the outgoing message to a device, allow AS to check for incoming messages (polling mode), allow AS to subscribe to notifications for inbound messages from devices, allow AS to retrieve the inbound message (& delete it)

As used herein, the word "message" includes SMS/MMS/Voicemail, etc., as defined in the 3GPP standard. For the particular use case at hand, the A-SCEF treats the "message" as an opaque payload to be sent to the device of interest via the C-SGN (e.g., using Data-Over-NAS, or "DONAS").

Most call models specified in the 3GPP standards for NBIOT devices require delivery of about 200 byte messages. In some embodiments of the present disclosure, the message size is up to 512 bytes.

Although use of the standardized API has been proposed herein, some customization and extensions are needed to adapt them to the particular use case of interest (and/or to other desirable implementations). The following is an illustrative/exemplary list of such modifications. The standardized messaging API builds on top of 3GPP identifiers for the device (e.g., MSISDN)—however, for the particular use case in mind, this may not be directly applicable. The ID of the device may instead be customized as <Enterprise id, Device id> tuple called Generic ID. Additional APIs are included for device provisioning so that Enterprises (whether viewed as a single AS or a group of AS) can dynamically provision devices. Such an interface will speed up the time taken to operationalize new devices for trusted Enterprises. The API JSON structures can be extended to provide options for control of the Traffic Management, Billing, Legal Intercept, and other behaviors by referencing appropriate policies, as discussed in greater detail below.

South-Bound T6a Interface

In some implementations, the A-SCEF supports diameter-based T6a interface. Illustrative call flows are shown in FIGS. 11-15, as discussed above. Some key aspects of the implementation include: support for simultaneous support for multiple C-SGNs (or, MME), support for C-SGN initiated PDN-Connection setup, support for C-SGN initiated PDN-Connection teardown In some embodiments, AS-initiated PDN-Connection setup and teardown are not needed. In other embodiments, AS-initiated PDN-Connection setup and teardown are performed.

In some embodiments, overload/congestion indications from C-SGN are taken into account by the SCEF's Traffic Management function.

South-Bound S6t Interface: In some embodiments, the A-SCEF supports diameter-based S6t interfaces (details of which are undergoing standardization in Release 13). Some key aspects of the implementation include: support for mapping of the North-bound device identifier to the 3GPP identifier, and support for identifying the right C-SGN for the desired transmission of message to device.

Figure 10:
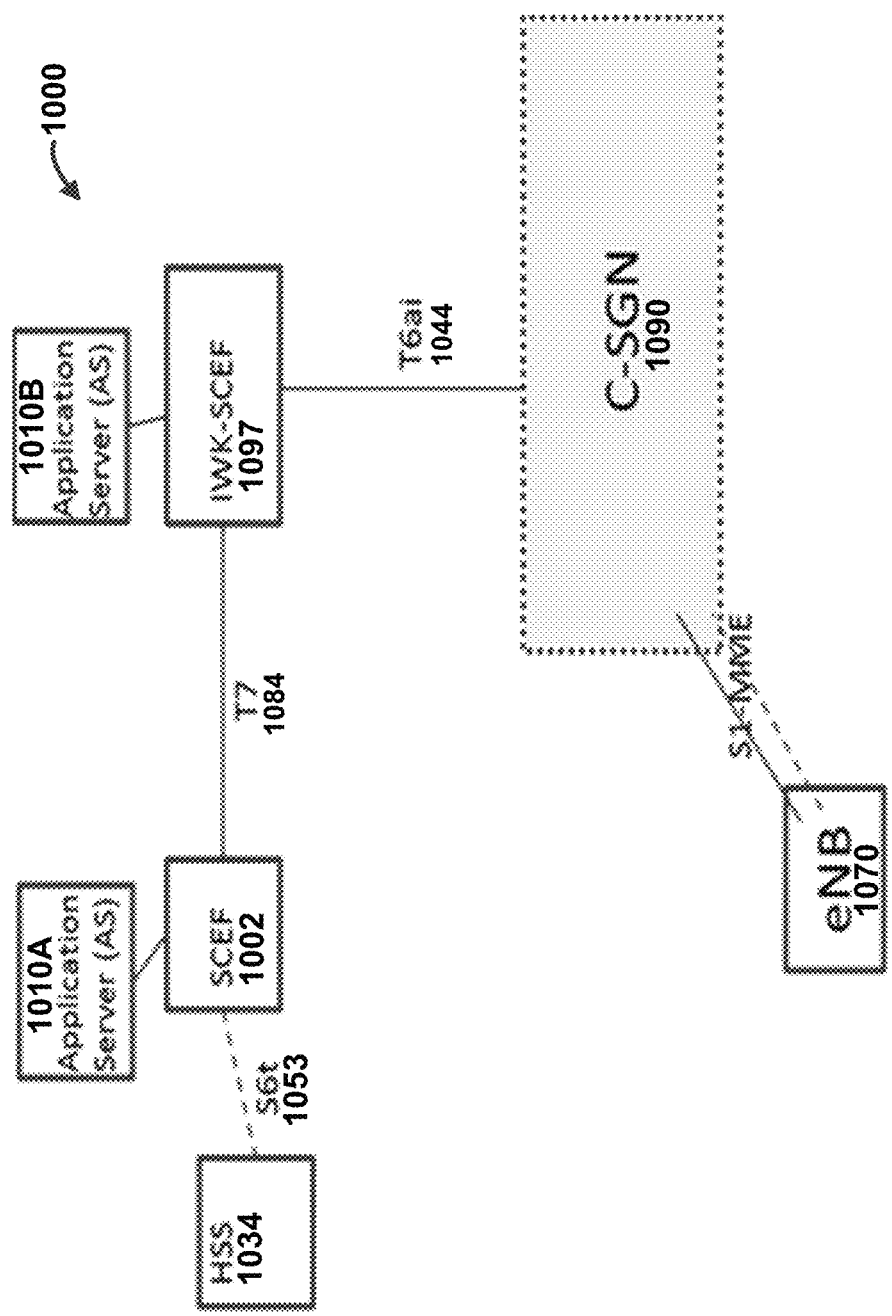
FIG. 10 illustrates a roaming scenario, in accordance with some embodiments of the disclosed subject matter.

Roaming Support:

The Interworking SCEF (IWK-SCEF) has been defined for support of Roaming scenarios. FIG. 10 shows an example roaming scenario for an IOT communications network 1000, in which a (visited) IWK-SCEF (1097) uses a T7 interface (1084) to connect with a home A-SCEF (1002). The IWK-SCEF (1097) in the visited network connects to the SCEF (1002) in a home network and uses the T6ai (1044) interface to send the non-IP data to a device via C-SGN 1090, which is operably coupled to eNB 1070 via an S1-MME interface. From the viewpoint of A-SCEF 1002, incoming traffic (from IWK-SCEF 1097 over T7 interface (1084)) will enter on the south-bound interface and then be treated by the Rx Traffic Management module. Outgoing traffic will be sent out the T7 south-bound interface (1084) towards the IWK-SCEF 1097. Each of A-SCEF 1002 and IWK-SCEF 1097 is connected to an associated AS (1010A and 1010B, respectively), and A-SCEF 1002 can communicate with HSS 1034 via S6t interface 1053.

Figure 11:
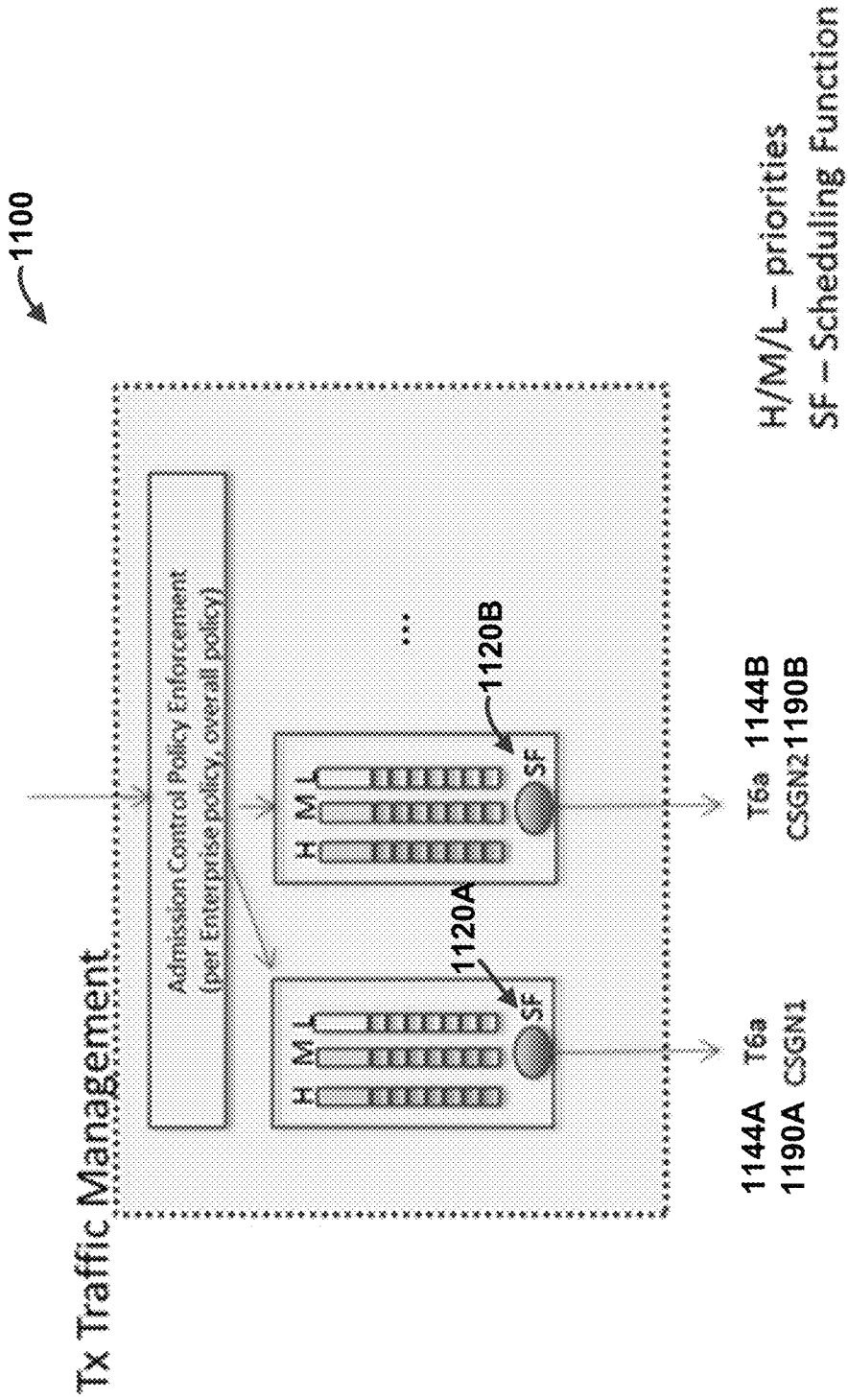
FIG. 11 is a high level block view of a Tx Traffic Management function highlighting an Admission Control function and a per-CSGN interface queueing and scheduling block, in accordance with some embodiments of the disclosed subject matter.

TX Traffic Management:

The A-SCEF can serve as a natural buffering point that matches the north-bound requests to the capacity of the south-bound interfaces using operator-defined traffic management policies (or sets of policies). The operator can specify traffic management policies for each Enterprise, or use the same one for multiple Enterprises, and this can be tuned to the required SLAs. FIG. 11 shows a high-level block view of the Tx Traffic Management function highlighting the Admission Control Policy Enforcement function and the per-CSGN interface queueing and scheduling block. "H," "M" and "L" correspond to high, medium, and low priorities, respectively. The objective of this Tx Traffic Management function is to ensure that the 3GPP network resources are optimally utilized and protected from congestion and overload conditions. Each of CSGN1 (1190A) and CSGN2 (1190B) is coupled to a corresponding SF 1120A, 1120B and set of priority settings via a T6a interface (1144A and 1144B, respectively).

For example: the AS may deposit a burst of messages on the north-bound interface. Appropriate admission control parameters can be configured to ensure that an Enterprise can only submit a specified number of messages. Per Enterprise-level admission control, an overall Admission Control policy will be supported.

For example, if an AS (or, multiple AS's) deposits a burst of messages using the north-bound API destined to a single CSGN, the operator-specified scheduling policies can police the transmission rate on the south-bound interface such that the SCEF-CSGN interface does not become overloaded. Further, prioritized queueing and scheduling ensures that the overload conditions are handled gracefully.

As another example, large bursts are possible on the north-bound APIs if multiple Enterprises send messages to millions of devices through a single A-SCEF at midnight. In such a case, in addition to the Admission Control functionality, the A-SCEF can provide buffering functionality. Further, the A-SCEF can then transmit the messages with appropriate priority treatment and scheduling behavior to ensure that the C-SGN is not overloaded beyond the specified transaction rate.

As yet another example, the AS can deposit messages on the north-bound interface with an optional desired time of transmission. The A-SCEF can buffer these messages and schedule them for transmission at an appropriate time while ensuring the C-SGN is not overloaded beyond the specified transaction rate. Further, as another option, the operator can control the maximum rate made available to a specific Enterprise.

The behaviors of the Tx traffic management function can be automatically controlled or controlled via operator-specified policies. For configuration of these policies, see the Service Provisioning section below.

Rx Traffic Management:

The objective of this Rx Traffic Management function is to ensure that the Service Network resources are optimally utilized and protected from congestion and overload conditions. For example, even if many devices deposit a burst of messages using the T6a interfaces, the operator-specified policies can police the transmission rate on the north-bound interface such that the A-SCEF-AS interface does not become overloaded. Further, prioritized queueing and scheduling ensures that the overload conditions are handled gracefully. The behaviors of the Rx traffic management function can be automatically controlled or controlled via operator-specified policies. For configuration of these policies, see the Service Provisioning section below.

Routing:

In some embodiments, static routing, and routing protocols like Border Gateway Protocol (BGP) and Open Shortest Path First (OSF) on both the north-bound and south-bound interfaces are supported.

Multiple virtual routing domains (network contexts) can be supported on both the north-bound and south-bound interfaces. On the north-bound interface, there might be one network context per Enterprise. On the south-bound interface, a single network context may be enough.

Device Provisioning Support:

In some embodiments, the A-SCEF supports the provisioning (registration and deregistration) of devices via north-bound APIs, allowing the operator's trusted Enterprises to dynamically provision devices. These API calls will be mapped to appropriate calls to the HSS to store the information for future lookups. This interaction can include the specification of the appropriate traffic management profile (e.g., a traffic management profile configured by the operator for the Enterprise).

Service Provisioning Support:

In some embodiments, the north-bound messaging APIs are RESTful HTTP based messages. Due to the Trust Domain considerations, these are being implemented as HTTPS-based messages. Appropriate certificate-based authentication, on a per-AS basis, shall be supported.

In some embodiments, the A-SCEF supports a Management Portal. The Management Portal is an administrative tool that provides the operator with the ability to configure Traffic Management policies, Enterprise identities and corresponding AS (or, group of AS), billing policies, Role Based Access Controls, Lawful Intercept configuration, Logging policies, etc. Yet another activity is the installation of security certificates to ensure secure authentication and authorization. The portal itself can comprise a RESTful HTTP based server. A GUI Client can be provided as well, and if desired, the functionality may be integrated into other GUI-based clients based on these APIs.

Billing:

In some embodiments, the A-SCEF supports the generation of message-based Billing Records per Enterprise. The formats from the Gy/Gz interfaces can be used and modified accordingly. These records can be written to the disk and can be retrieved using one or more north-bound APIs or via the Management Portal.

Logging:

In some embodiments, the A-SCEF supports detailed logging of events using syslog. Log file retrieval can be supported using north-bound API (or, via the Management Portal).

Lawful Intercept:

In some embodiments, the A-SCEF supports replication of data for Lawful Intercept. Retrieval can be supported using north-bound API (or, via the Management Portal).

Analytics:

In some embodiments, the A-SCEF supports the computation and extraction of multiple types of metrics. Raw metrics and calculated analytics for the Network (south-bound) and the Service (north-bound) can be supported. Some candidate metrics include: # of messages received from an Enterprise per hour with daily, weekly, monthly history—to understand bursts and usage patterns; # of messages transmitted to an Enterprise per hour with daily, weekly, monthly history—to understand bursts and usage patterns; # of registered devices per Enterprise on a daily basis; and/or # of total registered devices on a daily basis.

High Availability:

In some embodiments, the A-SCEF supports high availability on the north-bound API side with API server redundancy. Standard database HA techniques can be supported. Similarly, the A-SCEF can support high availability on the south-bound interfaces.

Scale and Performance:

In some embodiments, the scale of a single A-SCEF is specified in terms of at least the following dimensions: primary metric: # Messages sent/received per unit of time; secondary metric: # C-SGNs supported; secondary metric: # Devices supported, secondary metric: # of Application Servers supported; secondary metric: # of network contexts supported; and/or secondary metric: latency of message through the A-SCEF The A-SCEF can be configured to scale linearly, to support increases in each of the dimensions mentioned.

In some embodiments, an Application Server ("AS") wants to communicate with a user equipment ("UE") that isn't on or is in an idle/sleep mode. By using the A-SCEF (DG+3GPP-SCEF-E), the AS can try an IP or a non-IP method of contacting the UE. If said method fails, the A-SCEF can find another way to contact, for example via SMS. Unlike at an AS-PGW interface, the AS-to-DG interface does not need to know the destination IP address—instead, it receives a name/label, uses the API, says "here are the bytes," and the DG can either store and wait for the UE to wake up, or it can page it, or it can send the data via non-IP or SMS if either of those is appropriate. In any of the foregoing scenarios, it's taken out of the AS's control. The DG can also prioritize (e.g., if it's a lower priority, store it until later), with high/medium/low ("H/M/L") priorities, and/or employ a scheduling function ("SF"). Such policies are more commonly implemented by the DG, as shown in FIG. 11. The policies can also apply to the 3GPP-SCEF-E, since it's connected to south-bound traffic.

Figure 18:
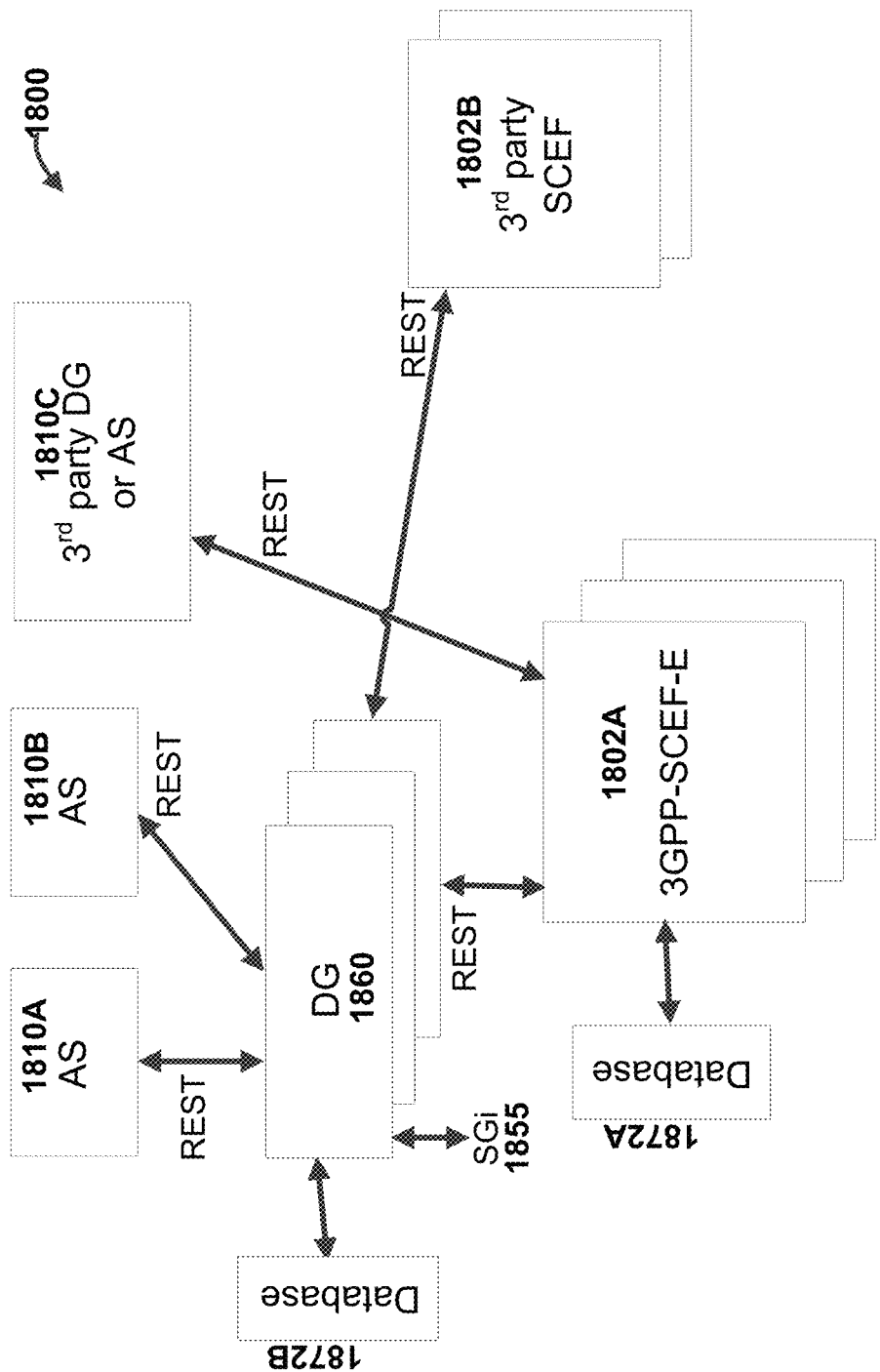
FIG. 18 is a block diagram of a SCEF-based IOT Communications System deployment model, in accordance with some embodiments of the disclosed subject matter.
Figure 20:
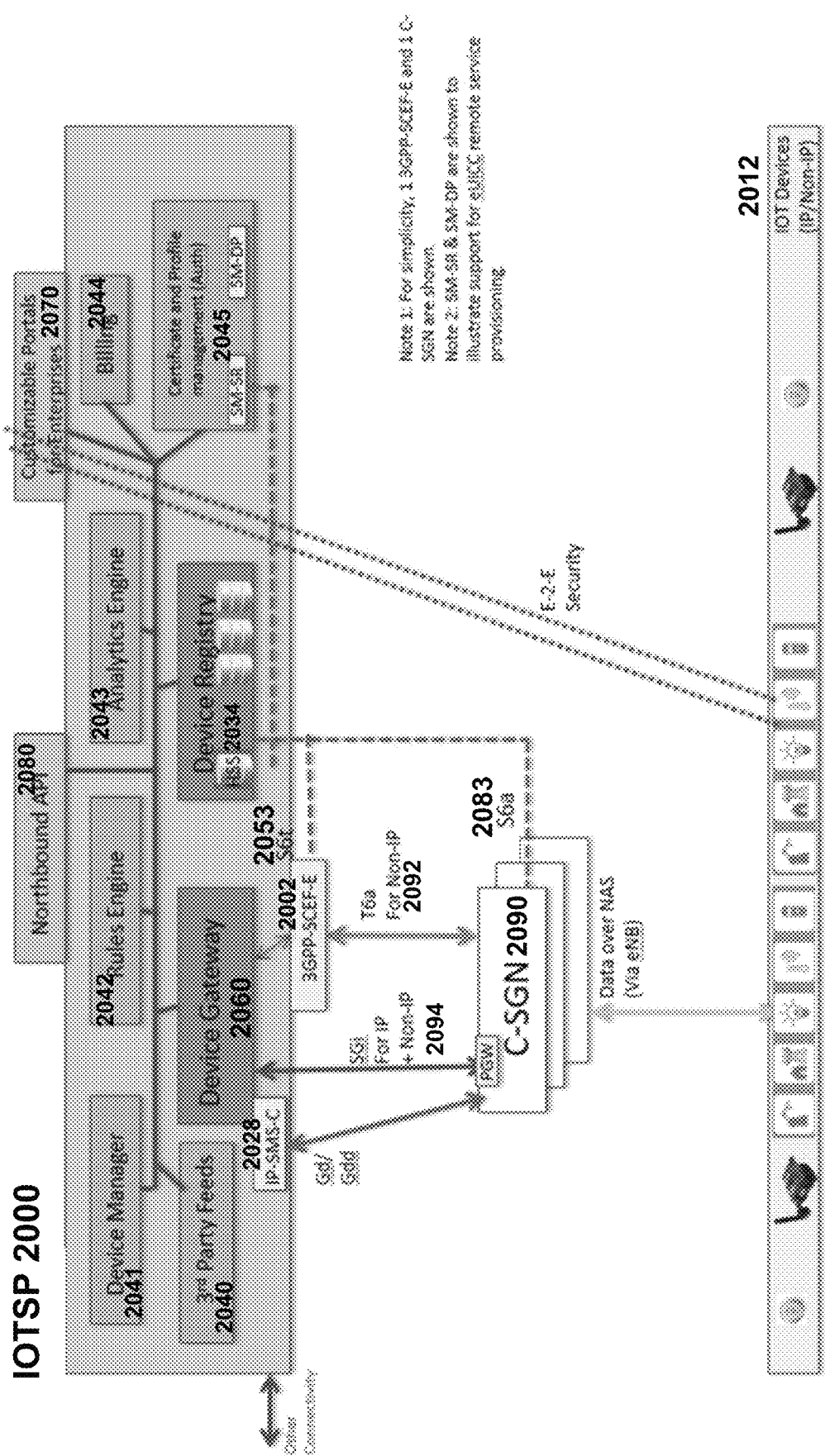
FIG. 20 illustrates a high level view of the functional blocks of an IOT Service Platform ("IOTSP"), in accordance with some embodiments of the disclosed subject matter.

In some embodiments, a request is received at the A-SCEF, but does not include an IP address. The A-SCEF retrieves an address (e.g., an "IMSI" radio identifier) from the HSS and/or (e.g., if the A-SCEF fails to reach the destination UE, the UE is off, etc.) routes the request up to the SMS server for SMS communications (either the SMS server forwards the data, or there's bidirectional communications between the SMS server and the A-SCEF). These processes are illustrated in FIGS. 18-20.

FIG. 12 is a block diagram of a 3GPP Machine-Type Communication ("MTC") reference architecture, in accordance with some embodiments of the disclosed subject matter. As shown in FIG. 12, the A-SCEF exists at element 1299. A-SCEF may receive communications from AS 1210A, 1210B, for example by an SCS 1206. A-SCEF includes the functionalities of an SCEF 1202, an MTC-IWF 1204, and parts of the SCS that interface with SCEF 1202 via APIs 1254. In order to communicate with an MTC UE application/UE 1212, A-SCEF 1299 may communicate via a T6b pathway 1245 to SGSN 1220, and then to UE 1212 via RAN 1214. Alternatively, the SCEF may communicate over the T6a pathway 1244 with NB-MME 1218, and with UE 1212 via RAN 1214. If the A-SCEF 1299 wants to communicate over the T4 pathway 1247, the A-SCEF 1299 communicates with the SMS-SC 1228, and then using one of the E 1241, SGd 1242, or Gd 1243 interfaces to MSC 1216, NB-MME 1218, or SGSN 1220, respectively, and then to UE 1212 via RAN 1214. Data may be delivered over Gi/SGi 1255A/1255B interface is via the GGSN/PGW 1224 function. Starting with Release 13, both Non-IP and IP data can be delivered via the Gi/SGi interfaces 1255A/1255B. For Non-IP over SGi, a UDP tunnel is used to multiplex the traffic for multiple devices each individually addressed via an IP Address—this traffic is then forwarded to MME via S11u for delivery as Data over NAS (DONAS). PGW/GGSN 1224 communicates via SGSN 1220/SGW 1222 to RAN 1214 and then to UE 1212. SCS function 1206 is, for example, a consumer of APIs. The specification of the SCS function is outside the scope of 3GPP. SCS 1206 exposes the AS 1210A to these APIs. The interface from the SCEF 1254 to the AS 1210A may be referred to as the T8 interface and exposes the AS 1210A to APIs. The Short message service—service center 1228 facilitates SMS, and communicates over the E 1241, SGd 1242, Gd 1243, T4 1247, or Tsms 1248 interfaces with MSC 1216, NB-MME 1218, SGSN 1220, SGSN 1220, and short messaging entity (SME) 1230 respectively. Machine type communications (MTC) can take the form of MTC-AAA communications 1208, which may be communicated via a S6n 1250 pathway to home subscriber server (HSS) 1234. Charging Data Function/Charging Gateway Function CDF/CGF 1232 communicate via the Rf/Ga interface with MTC-IFW 1204.

By acting in the location shown in FIG. 12, A-SCEF 1299 can take advantage of control over SCEF 1202 and thus 3GPP functions (e.g., connectivity pathways and optimization opportunities for an operator) while simultaneously simplifying the communication process to AS 1210A and AS 1210B and to the UE 1212.

Figure 13:
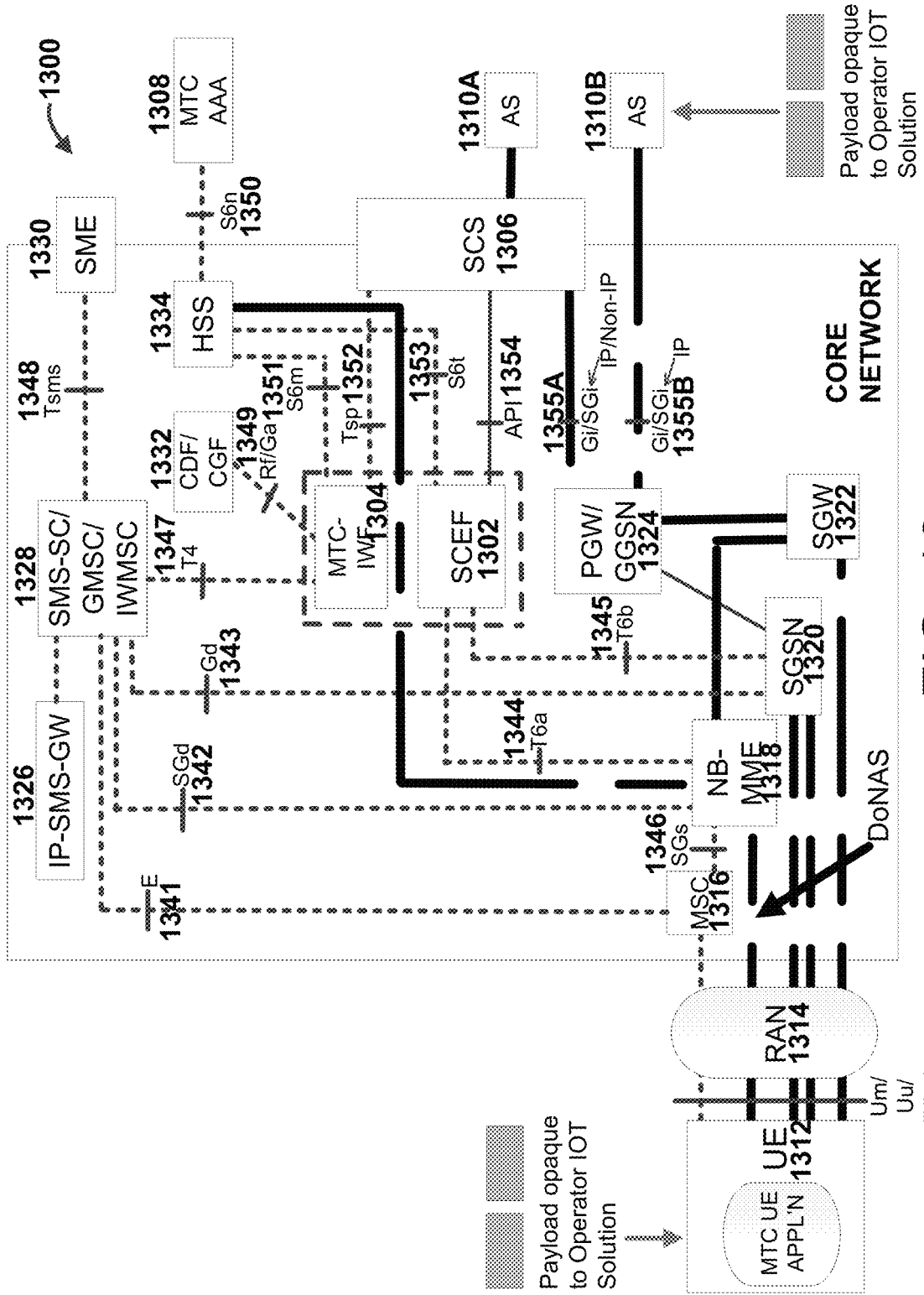
FIG. 13 is a block diagram showing internet protocol ("IP") and non-IP message delivery via (S)Gi, in accordance with some embodiments of the disclosed subject matter.

FIG. 13 is a block diagram showing internet protocol ("IP") and non-IP message delivery via (S)Gi (shown in thicker alternating dashed lines), in accordance with some embodiments of the disclosed subject matter. Similar reference numerals indicate similar items as FIG. 12 unless otherwise noted.

Figure 14:
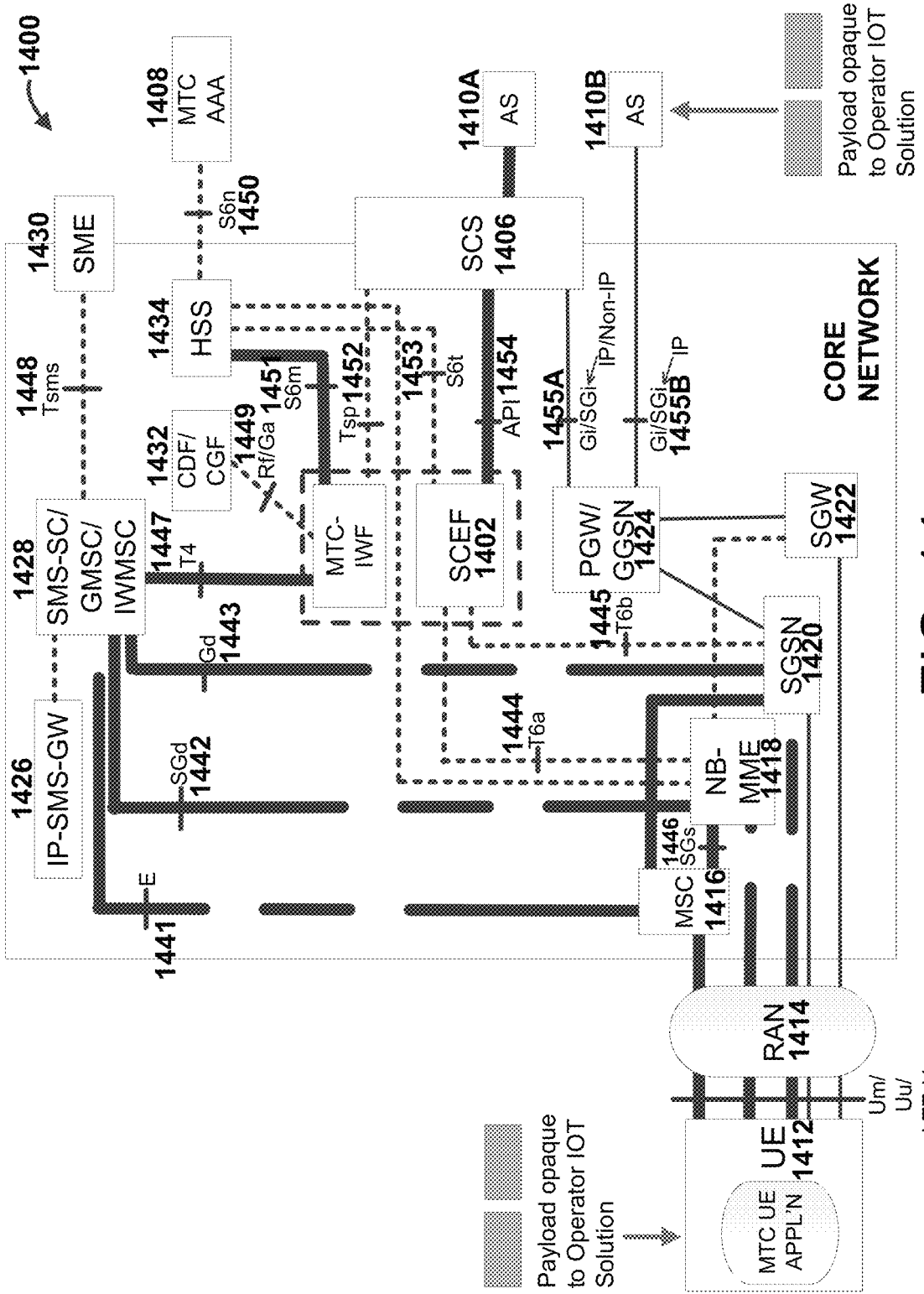
FIG. 14 is a block diagram showing internet protocol short message service ("SMS") message delivery via Machine Type Communication Inter Working Function ("MTC-IWF"), in accordance with some embodiments of the disclosed subject matter.

FIG. 14 is a block diagram showing internet protocol short message service ("SMS") message delivery via Machine Type Communication Inter Working Function ("MTC-IWF") (shown in thicker alternating dashed lines), in accordance with some embodiments of the disclosed subject matter. Similar reference numerals indicate similar items as FIG. 12 unless otherwise noted.

Figure 15:
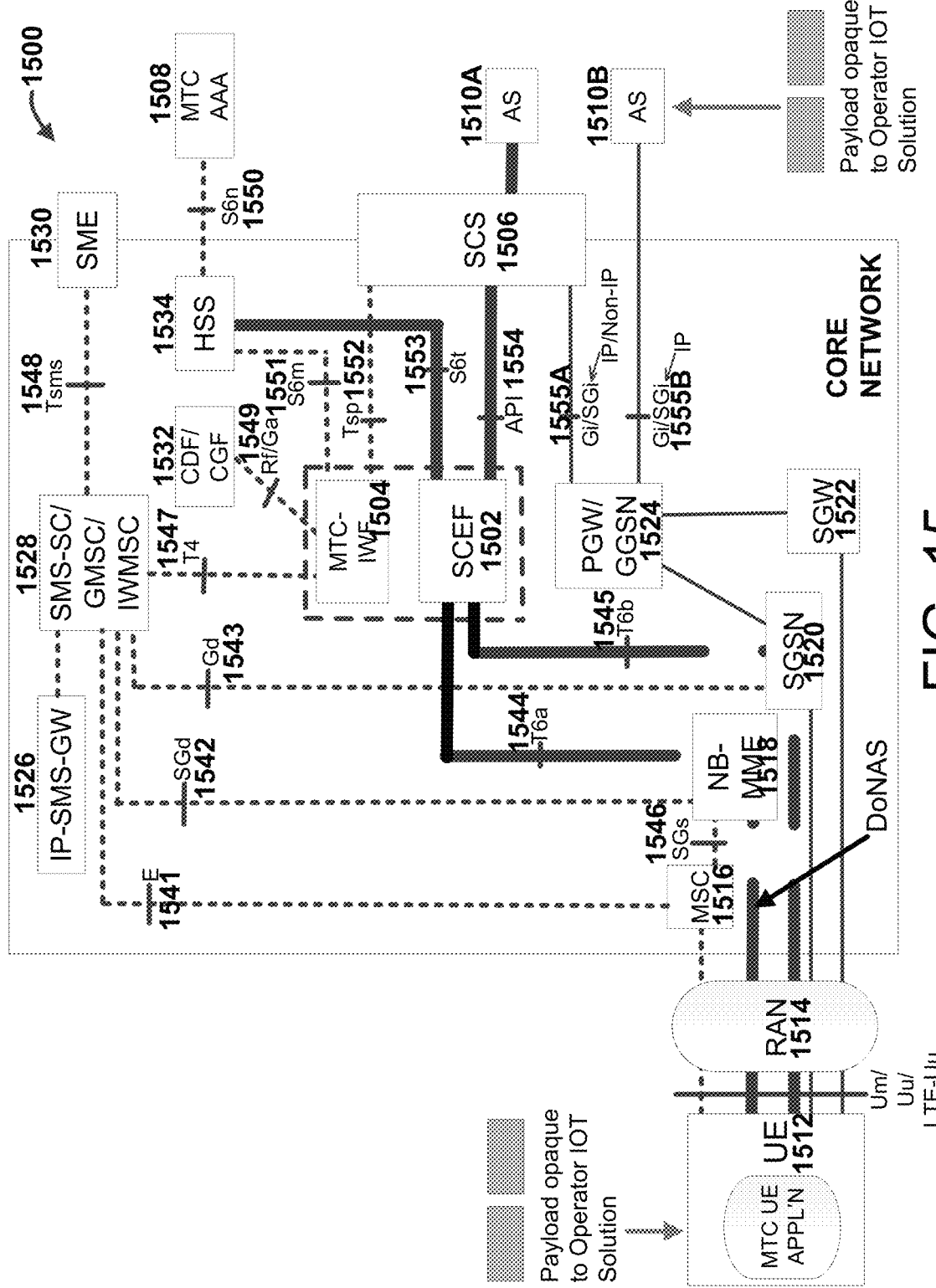
FIG. 15 is a block diagram showing non-IP message delivery via SCEF, in accordance with some embodiments of the disclosed subject matter.

FIG. 15 is a block diagram showing non-IP message delivery via SCEF (shown in thicker alternating dashed lines), in accordance with some embodiments of the disclosed subject matter. Similar reference numerals indicate similar items as FIG. 12 unless otherwise noted.

System Components

Figure 16:
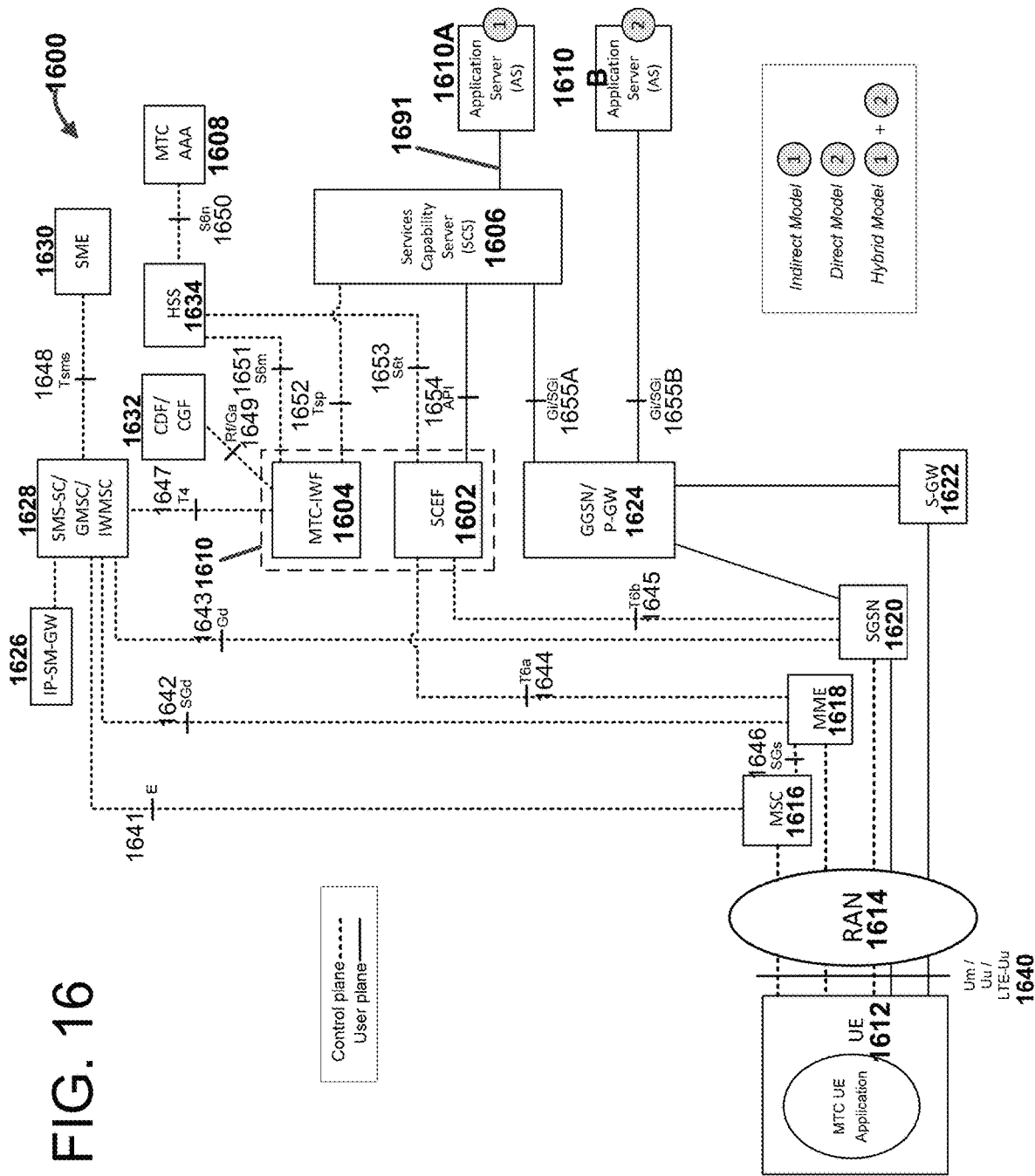
FIG. 16 is a reproduction of a block diagram of a Service Capability Exposure Function ("SCEF") from the 23.682 specification.

FIG. 16 is a reproduction of a block diagram of a Service Capability Exposure Function ("SCEF") from the 23.682 specification. Some embodiments of the present disclosure are mapped onto the block diagram of FIG. 16, for reference. An A-SCEF-based Internet-Of-Things ("IOT") Communications System 1600 includes: (1) an SCEF 1602; (2) an MTC-IWF 1604; (3) an SCS 1606; and (4) a Machine Type Communication-Authentication, Authorization, and Accounting ("MTC-AAA") 1608. In some implementations, the DG comprises an SCS 106 and, optionally, additional functionality as further described herein. In some embodiments, the (SCEF+MTC-IWF) complex (1610) is implemented for non-IP data delivery ("NIDD") support and is referred to herein as a 3GPP SCEF Extension ("3GPP-SCEF-E"). In other embodiments, the SCEF 1602, MTC-IWF 104 and MTC-AAA 108, collectively, comprise the 3GPP-SCEF-E.

Key interfaces can include one or more of: S6m/n (1651, 1650)—supports a Subscriber Information Request message that retrieves all the user-IDs if one is supplied; S6t (1653); API (1654) between a (SCEF+MTC-IWF) complex 1610 and the SCS 1606; "Unlabeled" interface (1691) between SCS (1606) and AS (1610A) (e.g., based on Open Mobile Alliance Device Management ("OMA-DM") standards and/or other APIs that an operator may desire to expose to the Enterprises); and/or T6a (1644).

The label "API" (1654) in FIG. 16 refers to the "protocol between DG/AS and 3GPP-SCEF-E"—which can correspond to the "out-of-scope" messages shown in the call flows in the 23.682 standard (but defined & expanded on according to methods described herein) as a Representational State Transfer ("REST") interface. If/when the Open Mobile Alliance ("OMA") (or other Standards Development Organizations (SDO)) defines the standards for REST-based implementation of such APIs, a selected subset can be implemented on the 3GPP-SCEF-E.

Device Gateway ("DG") Functions

Figure 17:
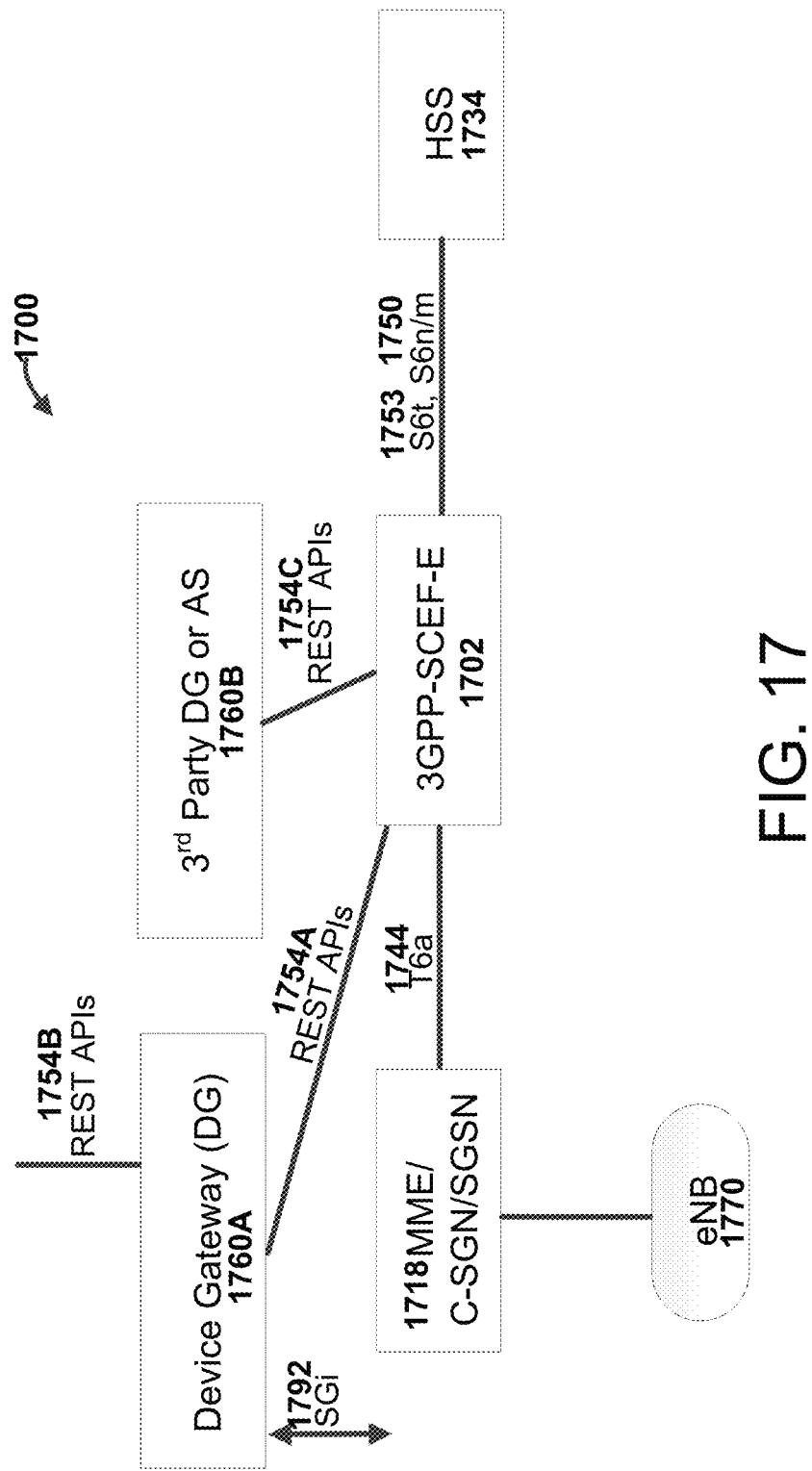
FIG. 17 is a block diagram of a SCEF-based IOT Communications System showing device gateway ("DG") and Service Capabilities Exposure Function ("SCEF") interfaces, in accordance with some embodiments of the disclosed subject matter.

In some embodiments, the DG (e.g., which may include SCS functionality) is implemented to make end-to-end (UE to AS) deployment possible (see, e.g., FIGS. 16-18 and corresponding description). DG functions can include one or more of the following.

According to some embodiments, the DG supports for the provisioning of the following levels:
  Enterprise, which may refer to a particular Enterprise customer to which services are being provided by the operator
  Tenant, which may refer to a particular part of an enterprise for which different access/policies may be designed
  AS level (within an Enterprise or tenant)
  Device Types (within an enterprise or tenant)
  Devices (of a particular Device type for an Enterprise or tenant)

According to some embodiments, the DG may generate the External ID (based on policy settings) as an option. It may optionally interact with HSS to program entries (e.g., the storage of information for future retrieval, e.g., on a per-sub scriber/UE basis). Alternatively, the DG may support (operator-specified standard/customized) interfaces with Operations & Support System ("OSS") & other support systems to retrieve the details above.

According to some embodiments, the DG facilitates device life-cycle, such as Provisioning, Activation, Use, Deactivation, End-of-life. It may further manage an Enterprise life-cycle, including Provisioning, Activation, Use, Deactivation, End-of-Life. It may further facilitate renaming of Enterprises, merging of enterprises, etc. According to some embodiments, the DG may facilitate Role-Based Access Control ("RBAC") provisioning.

According to some embodiments, the DG facilitates user access account provisioning. The DG may interface with one or more AS to provides secure access via RESTful APIs (from OMA, other SDOs or operator-specified). This makes available APIs per operator-configured-policy on a per-Enterprise basis, for example, a shipping first company (e.g., enterprise) can use all 15 published APIs; a second shipping company (e.g., enterprise) can use only 10 of the 15. According to another example, the DG may provide customized API to selected Enterprises.

The DG may also receive and transmit IP messages to/from AS addressed with ExternalID. This provides fragmentation support if "connectivity" constrains the Maximum Transmission Unit ("MTU"), e.g., one large message may be split into multiple payloads for delivery. The DG may also receive and transmit Non-IP payloads (as messages) to/from AS addressed with ExternalID. The DG may also provide grouping constructs for fan out, e.g., send a specified message to all devices of an {Enterprise, device type}, send a specified message to a specified list of devices, etc. The DG may also provide message transport service with many options, including but not limited to guaranteed delivery (store-and-forward with retries), best effort delivery, provide Acknowledgment for message delivery, allow time-shifted message delivery (e.g., send this message @ 4 pm via store-and-forward), and/or per-operator Service Level Agreement ("SLA") with {Enterprise, device type, device} configured as a policy (which prioritizes delivery of messages and enforces capacity usage, e.g., # messages/hour (day), total bytes allowed/hour (day), time-of-day usage control, etc.). Furthermore, the DG may notify the AS of pending message for time-shifted retrieval (store-and-forward).

According to some embodiments, the DG may interfaces with "connectivity" (generically used). For example, it may connect to PGW over SGi for IP; connect to PGW over SGi tunnel for non-IP; connect to a mobility management entity ("MME") for delivery of payload via SMS; and/or other connectivity mechanisms that might in the future be IP based. According to some embodiments, there may be a "Connectivity" option in order to interface with SCEF (3GPP or otherwise). The DG may interface via RESTful API or a proprietary protocol, send & receive non-IP payloads using IMSI/MSISDN, and/or ask for authentication check(s). The DG may also publishes ExtID to IMSI mapping and supports Lookup-Service (ExtID↔DG) if multiple DGs are implemented. The DG could implement, for example, an S6m/S6n interface (Diameter) to HSS alternatively.

According to some embodiments, the DG may also provide billing support. For example, for message and bytes, there may be Per-Priority level view; Time-of-Day view, etc., and/or toll-free/3rd party billing.

According to some embodiments the DG may also supports horizontally scalable DG deployments (optionally many DGs)—across {Enterprises, AS, Device Types, Devices}. According to some embodiments, multiple DGs may be deployed as ships-in-the-night.

3GPP SCEF Extension ("3GPP-SCEF-E") Functions

The 3GPP-SCEF-E functions can include one or more of the following.

According to some embodiments, the 3GPP-SCEF-E interfaces with serving MME via T6a (Diameter) (3GPP specified call flows/messages). The 3GPP-SCEF-E may flexibly support connectivity with multiple MMEs or single MME. The 3GPP-SCEF-E may also interface with HSS via S6t and S6n/m (Diameter) (3GPP specified call flows/messages). The 3GPP-SCEF-E may also interface with one or more DG(s) (e.g., an AS, SCS, or some other Operator platform element, optionally with additional functionality), via a REST API or an operator-specified/customized APIs. The 3GPP-SCEF-E may provide "primitive" APIs that can be invoked by DG(s). A "primitive" API may include an API that can be built on, for example, if "+" and "−" are APIs that can take 2 parameters each and return the result, then a "*" API can be defined as a richer API that takes 2 parameters and invokes the primitive API "+" as needed. In some embodiments, there will not be a one-to-one mapping of DG↔AS APIs to DG↔3GPP-SCEF-E APIs. These REST APIs can be published so that 3rd party DG/AS can implement accordingly.

According to some embodiments, the 3GPP-SCEF-E may transports (via an opaque-payload) non-IP payloads. For example, for Mobile Terminated ("MT"), this may include payloads to MME from DG (received via DG-SCEF interface, transmitted via T6a). In some embodiments, an MT case exists when a 3GPP-SCEF-E northbound API is invoked (by SCS/DG/AS) to send data to a particular UE. The 3GPP-SCEF-E may provide an option to queue (buffer) message if device is unreachable—option controlled by DG/AS/SCS. For Mobile Originated ("MO"). This may include payloads to DG from MME (received via T6a, transmitted via DG-SCEF interface). In some embodiments, an MO case exists when the UE sends data to the 3GPP-SCEF-E (via MME). The 3GPP-SCEF-E's northbound API may be invoked (by SCS/DG/AS) to receive this data or a notification is provided by 3GPP-SCEF-E to the SCS/DG/AS.

According to some embodiments, the 3GPP-SCEF-E may support roaming scenarios. Per-public land mobile network ("PLMN") deployment of SCEF is discussed in 23.682. The roaming scenario describes that the Interworking SCEF ("IWK-SCEF") in Visited PLMN connects to the (or, a) SCEF in Home PLMN. Alternatively, the IWK-SCEF can directly connect to the DG(s) (similar to local breakout). As another alternative, the MME(s) in the Visited Public Land Mobile Network ("VPLMN") can connect directly to an SCEF in the Home Public Land Mobile Network ("Home PLMN"). In other words, the IWK-SCEF is an optional entity in some embodiments. The 3GPP-SCEF-E may interface with IWK-SCEF via T7 (Diameter)=T6a (3GPP specified call flows/messages). For example, the IWK-SCEF can either connect to the home 3GPP-SCEF-E for traffic or connect directly to the same DG that the home 3GPP-SCEF-E connects to. IWK-SCEF may interface with MME via T6ai (Diameter)=T6a (3GPP specified call flows/messages)

According to some embodiments, the 3GPP-SCEF-E may assist with Charging Data Records ("CDRs") including Charging support (packets, bytes) per device view. This may include using Lookup Service for ExtID↔DG (if multiple DGs). This may implement S6m interface (Diameter) to HSS for this query (optionally). The According to some embodiments, the 3GPP-SCEF-E may also support. horizontally scalable 3GPP-SCEF-E deployments—across {#T6a connections}. The 3GPP-SCEF-E may also flexibly support placement of 3GPP-SCEF-Es near MMEs in RANs (for example: in some local data centers instead of a central data center in the Service Provider's network)). Additional 3GPP-specified functionality (Monitoring Event support, Device Trigger, PS-Only Service Provisioning, Reporting Event support, etc.) and interface with functionality other than DG(s) may also be supported.

IOT Service Platform ("IOTSP")

The IOTSP enables Service Providers to rapidly deploy a completely end-to-end solution for 3GPP IOT devices with integrated IP, Non-IP and SMS delivery. IOTSP provides device management, analytics, billing, certificate and profile management and other functionality. In addition, a Service Provider may elect to deploy only certain supported functions of IOTSP and instead integrate with existing functions that may already be deployed.

The ISP solution can be configured to support two primary customer models:

Direct—

In the Direct Model, it may be assumed that the IoT customer has the knowledge and capability to collect, store, and analyze the data extracted from the IoT devices.

Hosted—

In the Hosted Model, the IoT customer may wish to outsource the functions of data collection, storage, and analytics to an operator.

FIG. 17 is a block diagram of a SCEF-based IOT Communications System (1700) showing DG (1760A, 1760B) and 3GPP-SCEF-E (1702) interfaces, in accordance with some embodiments of the disclosed subject matter. Both DG 1760A and one or more optional $3^{rd}$ party DGs/SCS or AS nodes (1760B) interface with the 3GPP-SCEF-E (1702) via REST APIs (1754A and 1754C, respectively). DG 1760A is also configured to interface directly with one or more UEs (e.g., via an eNodeB 1770) via SGi (1792), as well as with one or more AS nodes, via REST APIs 1754B. The 3GPP-SCEF-E 1702 is configured to interface with HSS 1734 via a S6t (1753) and/or S6n/m (1750) interface, and with MME/CIoT Serving Gateway Node ("C-SGN")/Serving GPRS Support Node ("SGSN") (1718) via a T6a interface (1744). The MME/C-SGN/SGSN (1718) is in direct communication with eNB 1770. As shown in FIG. 20, the A-SCEF functionality can be integrated into the IOTSP to optimize support for the Hosted deployment model. When A-SCEF is integrated in such a hosted solution, many optimizations are possible. A few such possibilities are:

Security Optimization:

The A-SCEF does not need to provide extremely robust security functions since the AS (e.g., the IOTSP in this case) is in a trusted domain. Certificate management, for example, can be part of the IOTSP.

Integrated Analytics:

The A-SCEF and the IOTSP Platform can interact to close the loop on deeper analytics. Per-device/Enterprise level insights may incorporate metrics from both the IOTSP and the A-SCEF provided transport. For example, suppose that the IOTSP initiates a data transfer to the UE, and the DG+3GPP-SCEF-E have to buffer the data because the UE is currently unreachable. Then, the data is delivered when the UE becomes available. One metric might be to understand how often this happens on a per device/Enterprise level. For example, if this happens frequently for all UEs, then maybe the UE's parameters should be updated to wake up more often. MTC-IWF function has Tsp based input and uses S6m interface with HSS and T4 interface with SMS-SC to implement Device Trigger functionality. Device Trigger functionality wakes up the device via SMS and asks it to connect to the relevant application. Alternatively or in addition, if such delay occurs frequently for a particular UE, that UE could be examined for faults. By examining the entire path as a single unit, rather than as a string of segments, useful metrics can be obtained.

Optimization of Data Transmission:

As an example, device data transmission schedules at the IOTSP Platform can be updated based on the feedback from A-SCEF analytics about peak usage times. As another example, congestion/overload indications from the 3GPP network functions can be fed back to the IOTSP Platform to optimize data transmission.

Simplified Enterprise Access:

The Enterprise can interact with the IOTSP (via customizable portals or via specified north-bound API) and not be aware of the 3GPP specific parts. Additionally, the device configuration, provisioning, management, etc. can be simplified.

FIG. 18 is a block diagram of a A-SCEF-based IOT Communications System 1800 deployment model, in accordance with some embodiments of the disclosed subject matter. It depicts that the REST APIs exposed by DG and by 3GPP-SCEF-E can be consumed by multiple entities. AS's 1810A and 1810B consume DG's 1860 REST APIs and DG's 1860 consume 3GPP-SCEF-E's 1802A REST APIs and one or more $3^{rd}$ party SCEFs 1802B. At the same time, the 3GPP-SCEF-E 1802A is also configured to interface with one or more $3^{rd}$ party DG's and/or AS's (1810C) via a REST API. Each of 3GPP-SCEF-E 1802A and DG 1860 is operably coupled to a corresponding database (1872A and 1872B, respectively). The A-SCEF functionality can be deployed in such a hosted platform solution or as a stand-alone function.

FIG. 19 is a block diagram of the $3^{rd}$ Generation Partnership Project ("3GPP")-defined SCEF function from standards document 23.682, "Architecture Enhancements to Facilitate Communications with Packet Data Networks ("PDNs") and Applications." The north-bound APIs of FIG. 19 can be standardized in other forums like OMA and GSMA. Embodiments described herein are designed to support any and all APIs necessary for non-IP transport for NarrowBand Internet of Things ("NBIOT") devices and can be modified to support more APIs for newer use cases as they emerge.

FIG. 20 depicts a high level view of the functional blocks of an exemplary IOTSP (2000). As shown, IOTSP 2000 includes a DG 2060, an 3GPP-SCEF-E 2002, and an IP-SMS Center ("IP-SMS-C") 2028. Other functions of the IOTSP 2000 include $3^{rd}$ Party Feeds, Device Manager 2041, Rules Engine 2042, Analytics Engine 2043, Billing services module 2044, Certificate and Profile Management 2045 module (e.g., including authorization) with Subscription Manager Secure Routing ("SM-SR") and Subscription Manager Data Preparation ("SM-DP") components, and Device Registry 2034 (e.g., including HSS 2034). 3GPP-SCEF-E 2002 has an interface S6t (2053) with the SM-SR. Monitoring Events (MONTE) are received via S6t (from HSS) or T6a (from MME) and reported via APIs. One or more C-SGNs 2090 interfaces with IP-SMS-C 2028 via Gd/Gdd, with Device Gateway 2060 via SGi (for IP), with 3GPP-SCEF-E 2002 via T6a (for Non-IP), and with Device Registry via S6a 2083—note that in this depiction, the C-SGN is assumed to implement the MME, SGW, and PGW functions. Non-access-stratum signaling ("NAS") Data can be exchanged between C-SGN 2090 (e.g., via eNM) and one or more IOT Devices 2012 (e.g., a thermostat, cell phone, lamp, etc.). The IOTSP 2000 communicates with one or more Applications (not shown) via one or more Northbound APIs 2080. Customizable Portals for Enterprises 2070 can also be included in an IOT system, for direct, secure communication (e.g., via end-to-end encryption ("E-2-E")) with the IOT Devices 2012. The DG plays a role in the IOTSP to provide connectivity via IP, Non-IP or SMS using the interfaces shown. Policy-based selection among applicable data paths is an important function of the DG, and as a result, the Applications do not need to be aware of how the device is reached (for connectivity). It should be noted that the DG 2060 may take on the functions of many of the other components in the IOTSP 2000.

Returning to FIG. 22, the A-SCEF 2200 may be operated in a variety of ways, either together or separately, thereby implementing provisioning both on the policy and entity level to simplify IOT interaction from the northbound side while adding control and functionality for operators. According to an embodiment, the provisioning and entity levels discussed above are managed via MGMT blocks 2240 and 2245. According to an embodiment, the A-SCEF 2200 may receive a command message from an AS (e.g., an application 2204). The command message may come via pathway 2202, such as by an exposed APIs. The command message may include an external identification tag, an application programming interface (API) instruction associated with the external identification tag, and a security credential. The A-SCEF 2200 may then confirm that the security credential is authorized for the external identification tag, and, in response to the confirming, locating in a first electronically searchable catalog on or connected to the A-SCEF 2200 at least one network identifier associated with the external identification tag. The at least one network identifier may be different from the external identification tag. The A-SCEF 2200 may send a communication to at least one user equipment (UE) (e.g., an IOT device 2260) associated with the at least one network identifier based on the application programmer interface (API) instruction. This may be coordinated via the SCEF 2250 and accomplished on pathway in the 3GPP core, or via the SGi as IP or non-IP data transport.

According to an embodiment, the A-SCEF 2200 may receive a command message from an application server (AS) 2204. The command message may arrive via pathway 2202 or 2242, depending on the type of message. The command message may include an external identification tag, an application programming interface (API) instruction associated with the external identification tag, and a security credential related to an entity associated with the AS. The A-SCEF 2200 may confirm that the security credential is authorized for the external identification tag, and in response to the confirming, send a communication to the AS based on the application programmer interface (API) instruction. By way of a non-limiting example, if the entity is authorized for active pull, the AS 2204 may pull data sent from an IOT device 2260 to A-SCEF 2200 and stored in accordance with policies discussed above.

According to an embodiment, the A-SCEF 2200 may associate a policy profile with at least one application server (AS) 2260. The policy profile may be stored on the A-SCEF 2200, or in a separate database, and may govern at least one of network traffic management (e.g., to A-SCEF 2200 and in the 3GPP core), billing, and notification (either northbound or southbound). The A-SCEF 2200 may then receive a command message from the at least one application server (AS) 2204. The command message may contain an external identification tag and an application programming interface (API) instruction associated with the external identification tag. The A-SCEF 2200 may then locate in an electronically searchable catalog at least one network identifier associated with the external identification tag, and the at least one network identifier is different from the external identification tag. The A-SCEF 2200 may then facilitate sending in accordance with the policy profile a communication to at least one user equipment (UE) 2260 associated with the at least one network identifier based on the application programmer interface (API) instruction (e.g., via the SCEF 2250 through the 3GPP core or via the pathway 2226). The policy profile may be implemented via the DG 2210, A-SCEF 2200, and/or other elements in the 3GPP core as set forth by the operator's policy discussed above.

According to an embodiment, A-SCEF 2200 may associate a policy profile (e.g., as discussed above) with at least one application server (AS) 2204. The policy profile governs at least one of network traffic management, billing, and notifications upstream to applications 2204. The A-SCEF 2200 may then receive a command message from an application server (AS) 2204, including an external identification tag, and an application programming interface (API) instruction associated with the external identification tag. The A-SCEF 2200 may then locate in an electronically searchable catalog at least one network identifier associated with the external identification tag, wherein the at least one network identifier is different from the external identification tag. The A-SCEF 2200 may then send at least one communication to the at least one AS 2204, in accordance with the at least one policy profile. That message may include the external identification tag and information based on the API instruction. By way of a non-limiting example, if the entity is authorized for active pull, the AS 2204 may pull data sent from an IOT device 2260 to A-SCEF 2200 and stored in accordance with policies discussed above. According to an embodiment, the policy profile may dictate that the AS 2204 is only authorized for push notification. Accordingly the communication to the AS 2204 may be data pushed to the AS 2204 at a later time when received via an IOT device 2260 associated with the external ID. AS 2204 need not deal with the intricacies of the 3GPP network in this process. According to an embodiment, the communication to the AS 2204 may indicate a denial of the request based on a lack of authorization in the policy profile.

According to an embodiment, A-SCEF 2200 may associate a policy profile with at least one application server (AS) 2204. The policy profile may govern at least one of billing and notifications. The A-SCEF 2200 may then receive a communication from a user equipment (UE) 2260 (e.g., via SGi pathway 226 or the SCEF 2250) comprising a network identifier of the UE and data. The A-SCEF 2200 may then locate in a first electronically searchable catalog (e.g., in the DG 2210 or accessible to the DG 2210) at least one external identification tag associated with the network identifier, where the at least one network identifier is different from the external identification tag. The A-SCEF 2200 may then locate in a second electronically searchable catalog, at least one policy profile associated with at least one of the network identifier, the external identification tag, or the data. The A-SCEF 2200 may then identify at least one application server (AS) 2204 based on at least one of the external identification tag or the data and then send at least one message to the identified at least one AS 2204, in accordance with the at least one policy profile (e.g., such as those discussed above), the message comprising the external identification tag and information based on the data.

According to an embodiment, A-SCEF 2200 may associate a security credential with at least one user equipment (UE) 2260, the security credential authorizing the at least one UE 2260 to send data (e.g., via the SGi or 3GPP pathways) to at least one of an application server (AS), a tenant associated with at least one AS, or an enterprise associated with at least one tenant (e.g., applications 2204). The A-SCEF 2200 may also receive a communication from the UE 2260 comprising a network identifier of the UE 2260 and data. The A-SCEF 2200 may then identify, in a database (e.g., on or accessible to the DG 2210), an API instruction to send the data to at least one of the AS, the tenant, or the enterprise. The A-SCEF 2200 may then confirm that the security credential associated with the UE 2260 is authorized for the at least one of the AS, the tenant, or the enterprise 2204. In response to the confirming, the A-SCEF 2200 may send a communication to the AS, an AS associated with the tenant, or an AS associated with a tenant associated with the enterprise (e.g., an application 2204) based on the application programmer interface (API) instruction.

Steps in the abovementioned embodiments may be combined or replaced in order to perform the various tasks and methods described herein. They may be implemented with the various deployments discussed above in relation to FIGS. 23A-D, including with varying ratios of DGs to SCEFs, and further with various levels of georedundancy. The various policy and tenancy levels discussed above may be implemented in order to offer control to operators while simplifying the communication process between the upstream entities and IOT devices. Furthermore, the abovementioned embodiments may also include the following aspects.

According to an embodiment, confirming steps may include locating an association between the external identification tag and the security credential in a second electronically searchable catalog (e.g., at or accessible to the DG 2210) of a plurality of external identification tags and associated security credentials.

According to an embodiment, the external identification tag is an external group identification tag (e.g., based on group entities discussed above), and the at least one network identifier associated with the group external identification tag comprises a plurality of associated network identifiers, each one of the plurality of associated network identifiers identifying a respective UE 2260, and the sending the communication includes sending to each of the UEs 2260 associated with the plurality of network identifiers respective communications.

According to an embodiment, the API instruction is a forward data instruction, and wherein the method further includes identifying, in a policy profile associated with at least one of the UE 2260 or the AS 2204, a forward data policy setting, wherein the forward data policy setting is at least one of an active push setting, a store-and-forward setting, a data rate setting, a memory allocation setting, or a priority setting. The sending the communication to the at least one user equipment (UE) 2260 comprises at least one of sending the communication at least one of at a time interval, at a rate, or after other communications, based on the data policy setting and independent of the API instruction. According to an embodiment, the command message may also include a reply interval, the A-SCEF 2200 may receive the update messages, including data, from the UE 2260 associated with the network identifier, locate in the electronically searchable catalog, the external identification tag associated with the network identifier; and send accordance with the reply interval, a reply message to the AS 2204, such as a message including the external identification tag and the data received from the UE associated with the network identifier.

According to an embodiment, the command message is a send data command message including data, and the method further includes sending the data in the communication to the at least one UE 2260. For example, the data may be sent via pathway 2226 or via one of the pathways 2262 in accordance with the policies set forth above.

According to an embodiment, the communication is a short message service (SMS), and the API instruction is a device trigger that instructs the at least one UE 2260 to transition from a sleep state wherein power consumption is reduced to a non-sleep state and to connect to an application, such as an application 2204.

According to an embodiment, the A-SCEF 2200 selects a data connectivity pathway to the at least one UE 2260 from at least two data connectivity pathways, and wherein the sending the communication to the at least one UE associated with the at least one network identifier based on the API instruction further comprises sending the communication to the at least one UE 2260 associated with the at least one network identifier over the selected data connectivity pathway, such as the pathway 2226 or the pathways 2262 in accordance with the policies described above. According to an embodiment, the selecting a data connectivity pathway is done independently of the type of API instruction. According to an embodiment, the selecting, by the A-SCEF 2200, the data connectivity pathway to the at least one UE 2260 from the at least two data connectivity pathways includes determining whether more than one of the at least two data connectivity pathways is open. If more than one of the at least two data connectivity pathways are open, the selecting, by the A-SCEF 2200, the data connectivity pathway to the UE 2260 from at least two data connectivity pathways may include determining a preferred data connectivity pathway based on a selection hierarchy and selecting the preferred data connectivity pathway. This may be based on operator defined policies. Furthermore, if only one of the at least two data connectivity pathways is open the A-SCEF 2200 may select the open pathway. According to an embodiment, the A-SCEF may select a pathway by locating, in a UE 2260 capabilities database (e.g., at the A-SCEF 2200 or accessible thereto), a device capabilities list associated with the UE 2260. According to an embodiment, the selected data connectivity pathway may include, for example, at least one of a non-IP-via-SGi connectivity pathway, an IP-via-SGi connectivity pathway, an NIDD-via-T6a connectivity pathway, an MT-SMS-via-T4 connectivity pathway, an SMS-via-SGd connectivity pathway, or an SMS-via-Gd connectivity pathway. According to an embodiment, the connectivity pathway may be selected based traffic data associated with at least one of the at least two data connectivity pathways. Furthermore, the traffic data associated with the 3GPP network may include a variety of types of data, such as, but not limited to network latency across at least one connectivity pathway, historical network latency across at least one connectivity pathway, load information on at least part of the 3GPP network, historical load information on at least part of the 3GPP network, or priority information.

According to an embodiment, the A-SCEF 2200 includes a DG function 2210 and a plurality of service capability exposure functions 2250. Furthermore, the locating the at least one network identifier is by the DG 2210. The sending the communication to the at least one UE 2260 may include the DG 2210 selecting an active SCEF 2250 associated with the UE 2260 from among the plurality of SCEFs, and the DG 2210 sending the network identifier and information based on the API instruction to the selected SCEF 2250. The receiving may be by the DG and may include receiving via a fully qualified domain name (FQDN).

According to an embodiment, the A-SCEF 2200 includes a device gateway function 2210 and a service capability exposure function 2250. The locating the at least one network identifier is by the DG 2210 and the sending the communication to the at least one UE 2260 may include the DG 2210 sending the network identifier and information based on the API instruction to the SCEF 2250. The receiving may be by the DG and the receiving include receiving via a fully qualified domain name (FQDN).

According to an embodiment, the sending the communication to the at least one UE comprises: selecting an SGi pathway 2260 and sending the network identifier and information based on the API instruction to a PGW via the selected SGI pathway 2260.

According to some embodiments, two A-SCEFs are included, like in the embodiments of FIGS. 23B and 23D, each A-SCEF having at least one DG. Such A-SCEFs may support MQTT that operates in accordance with the policies discussed above.

According to some embodiments, the AS may be part of an entity system discussed in relation to FIG. 21. For example, an AS may be associated with at least one tenant of a plurality of tenants and at least one enterprise of a plurality of enterprises. Each enterprise may be associated with at least one tenant, each enterprise having a subset of policy profile definitions governing at least one of network traffic management, billing, or notification for all tenants associated with the enterprise. Each tenant may be associated with at least one AS, each tenant having a subset of policy profile definitions governing at least one of network traffic management, billing, or notification for each AS associated with the tenant. Each AS may be associated with a subset of policy profile definitions governing at least one of network traffic management, billing, or notification. Each enterprise or tenant may be associated with at least one Device and at least one Group. Each Device may be associated with a subset of policy profile definitions governing at least one of network traffic management, billing or notification. Each Group may be associated with a subset of policy profile definitions governing at least one of network traffic management, billing or notification. The sending in accordance with the policy profile may include sending in accordance with at least one of the associated subset of policy profile definitions for the device, the group, the AS, the associated tenant, or the associated enterprise.

According to an embodiment, the associating a policy profile with the at least one AS may include associating the AS with the at least one UE having an associated policy profile. Thus, the sending in accordance with the policy profile may include sending in accordance with the policy profile associated with the at least one UE. According to an embodiment, the UE is part of a group of UEs. The group may have a policy profile that is associated with the UE, and thus sending may be accomplished in accordance with the group policy profile.

The policy profile may define a number of characteristics, such as those discussed herein. For example, according to an embodiment, the policy profile governs network traffic management, and the sending in accordance with the policy profile governs the rate at which the communication is sent to the at least one UE.

According to an embodiment, the policy profile governs network traffic management, and the sending in accordance with the policy profile governs the priority of the communication sent to the at least one UE.

According to an embodiment, the policy profile governs network traffic management, and the sending in accordance with the policy profile governs the amount of memory allocated to the communication sent to the at least one UE. According to an embodiment, the memory allocated to the communication includes at least one of a number of communications that may be stored pending the sending, an amount of memory available for communications stored pending the sending, and a time limit beyond which communications may not be stored pending the sending.

According to an embodiment, the policy profile governs network traffic management, and the sending in accordance with the policy profile governs scheduling of the communication sent to the at least one UE.

According to some embodiments, the API instruction is an MQTT instruction subscribing to at least one user equipment (UE) or group of UEs associated with the external identification tag. Thus, the associated policy profile may be at least one of a policy profile associated with the AS, a policy profile associated with the UE, a policy profile associated with the group of UEs, or the policy profile of a UE in the group of UEs. The sending at least one communication to the AS based on the API instruction may include sending data from the UE or at least one UE in the group of UEs to the AS in accordance with the at least one policy profile.

The techniques and systems disclosed herein may be implemented as a computer program product for use with a network, computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a network, computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In the foregoing description, certain steps or processes can be performed on particular servers or as part of a particular engine. These descriptions are merely illustrative, as the specific steps can be performed on various hardware devices, including, but not limited to, server systems and/or mobile devices. Alternatively or in addition, any or all of the steps described herein can be performed on a virtualized machine that runs on a physical server itself. Similarly, the division of where the particular steps are performed can vary, it being understood that no division or a different division is within the scope of the invention. Moreover, the use of "module" and/or other terms used to describe computer system processing is intended to be interchangeable and to represent logic or circuitry in which the functionality can be executed.

The invention claimed is:

1. A method, comprising:
   receiving, by an augmented service capability exposure function (A-SCEF), a command message from an application server (AS) comprising an external identification tag, an application programming interface (API) instruction associated with the external identification tag, and a security credential;
   confirming that the security credential is authorized for the external identification tag;
   in response to the confirming, locating in a first electronically searchable catalog, by the A-SCEF, at least one network identifier associated with the external identification tag, wherein the at least one network identifier is different from the external identification tag;
   selecting, by the A-SCEF, a data connectivity pathway to at least one user equipment (UE) from at least two data connectivity pathways based at least in part on a selection hierarchy; and
   sending, by the A-SCEF, a communication to the at least one UE associated with the at least one network identifier based on the API instruction, the communication being sent over the data connectivity pathway that is selected.

2. The method of claim 1, wherein the confirming includes locating an association between the external identification tag and the security credential in a second electronically searchable catalog of a plurality of external identification tags and associated security credentials.

3. The method of claim 1, wherein the external identification tag is an external group identification tag, and the at least one network identifier associated with the group external identification tag comprises a plurality of associated network identifiers, each one of the plurality of associated network identifiers identifying a respective UE, and wherein the communication is sent to each of the UEs associated with the plurality of associated network identifiers.

4. The method of claim 1, wherein the API instruction is a forward data instruction, and wherein:
   the method further includes identifying, in response to the forward data instruction, in a policy profile associated with at least one of the AS or the UE, a forward data policy setting, wherein the forward data policy setting is at least one of:
      an active pull setting,
      a store-and-forward setting,
      a data rate setting,
      a memory allocation setting, or
      a priority setting; and
   the sending, by the A-SCEF, the communication to the at least one UE comprises at least one of sending, by the A-SCEF, the communication at least one of at a time interval, at a rate, or after other communications between the UE and the A-SCEF or the AS and the A-SCEF, based on the forward data policy setting.

5. The method of claim 4, wherein the sending, by the A-SCEF, the communication based on the forward data policy setting is sent independent of the API instruction.

6. The method of claim 4, wherein the command message further comprises a reply interval, and the method further comprising:
   receiving by the A-SCEF at least one update message, comprising data, from the UE associated with the network identifier;
   locating in the first electronically searchable catalog, by the A-SCEF, the external identification tag associated with the network identifier; and
   sending, by the A-SCEF in accordance with the reply interval, a reply message to the AS, the reply message comprising:
      the external identification tag, and
      the data received from the UE associated with the network identifier.

7. The method of claim 1, wherein the command message is a send data command message further comprising data, and the method further comprises sending, by the A-SCEF, the data in the communication to the at least one UE.

8. The method of claim 1, wherein the communication comprises a short message service (SMS), and wherein the API instruction is a device trigger that instructs the at least one UE to transition from a sleep state wherein power consumption is reduced to a non-sleep state and to connect to an application.

9. The method of claim 1, wherein the sending, by the A-SCEF, the communication to the at least one UE associated with the at least one network identifier based on the API instruction further comprises sending, by the A-SCEF, the communication to the at least one UE associated with the at least one network identifier over a selected data connectivity pathway.

10. The method of claim 9, wherein the selecting, by the A-SCEF, the data connectivity pathway to the at least one UE from the at least two data connectivity pathways comprises:
determining that more than one of the at least two data connectivity pathways is open;
determining a preferred data connectivity pathway based on the selection hierarchy; and
selecting the preferred data connectivity pathway.

11. The method of claim 9, wherein the selecting, by the A-SCEF, the data connectivity pathway to the UE from the at least two data connectivity pathways comprises locating, in a UE capabilities database, a device capabilities list associated with the UE.

12. The method of claim 9, wherein the selected data connectivity pathway comprises at least one of:
a non-IP-via-SGi connectivity pathway;
an IP-via-SGi connectivity pathway;
an NIDD-via-T6a connectivity pathway;
an MT-SMS-via-T4 connectivity pathway;
an SMS-via-SGd connectivity pathway; or
an SMS-via-Gd connectivity pathway.

13. The method of claim 9, wherein the selected data connectivity pathway is selected based on traffic data associated with at least one of the at least two data connectivity pathways.

14. The method of claim 13, wherein the traffic data is associated with a 3GPP network and comprises at least one of:
network latency across at least one connectivity pathway;
historical network latency across at least one connectivity pathway;
load information on at least part of the 3GPP network;
historical load information on at least part of the 3GPP network; or
priority information.

15. The method of claim 1, wherein the A-SCEF includes a device gateway function (DG) and a plurality of service capability exposure functions (SCEFs);
wherein the locating the at least one network identifier is by the DG; and
wherein the sending, by the A-SCEF, the communication to the at least one UE comprises:
the DG selecting an active SCEF associated with the UE from among the plurality of SCEFs; and
the DG sending the network identifier and information based on the API instruction to the selected SCEF.

16. The method of claim 1, wherein:
the A-SCEF includes a device gateway function (DG) and a service capability exposure function (SCEF);
the locating the at least one network identifier is by the DG; and
the sending, by the A-SCEF, the communication to the at least one UE comprises the DG sending the network identifier and information based on the API instruction to the SCEF.

17. The method of claim 16, wherein the receiving is by the DG and the receiving comprises receiving via a fully qualified domain name (FQDN).

18. The method of claim 1, wherein the sending, by the A-SCEF, the communication to the at least one UE comprises:
selecting an SGi pathway; and
sending, by the A-SCEF, at least the network identifier to a PGW via the selected SGI pathway.

19. A method, comprising:
receiving, by an augmented service capability exposure function (A-SCEF), a command message from an application server (AS) comprising an external identification tag, a security credential, an application programming interface (API) instruction that comprises a forward data instruction;
identifying, in response to the forward data instruction, a forward data policy setting in a policy profile associated with at least one of the AS or the UE;
confirming that the security credential is authorized for the external identification tag;
in response to the confirming, locating in a first electronically searchable catalog, by the A-SCEF, at least one network identifier associated with the external identification tag, wherein the at least one network identifier is different from the external identification tag;
sending, by the A-SCEF, a communication to at least one user equipment (UE) associated with the at least one network identifier based on the forward data policy setting;
receiving by the A-SCEF at least one update message, comprising data, from a UE associated with a network identifier from among the at least one network identifier; and
sending, by the A-SCEF, a reply message to the AS, the reply message comprising the external identification tag and the data received from the UE associated with the network identifier.

20. A system, comprising:
one or more processors;
memory in electronic communication with the one or more processors; and
instructions stored in the memory, the instructions being executable by the one or more processors to:
receive, by at least one augmented service capability exposure function (A-SCEF), a command message from an application server (AS) comprising an external identification tag, an application programming interface (API) instruction associated with the external identification tag, and a security credential;
confirm that the security credential is authorized for the external identification tag;
locate in a first electronically searchable catalog, by the at least one A-SCEF, at least one network identifier associated with the external identification tag, wherein the at least one network identifier is different from the external identification tag;
select, by the A-SCEF, a data connectivity pathway to at least one UE from at least two data connectivity pathways based at least in part on a selection hierarchy; and
send, by the A-SCEF, a communication to at least one user equipment (UE) associated with the at least one network identifier based on the API instruction, the communication being sent over the data connectivity pathway that is selected.

* * * * *